United States Patent
Katsu et al.

(10) Patent No.: US 11,638,855 B2
(45) Date of Patent: May 2, 2023

(54) INFORMATION PROCESSING APPARATUS AND INFORMATION PROCESSING METHOD

(71) Applicant: SONY CORPORATION, Tokyo (JP)

(72) Inventors: Masanori Katsu, Tokyo (JP); Yasutaka Fukumoto, Tokyo (JP); Kiminobu Nishimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 646 days.

(21) Appl. No.: 16/626,156

(22) PCT Filed: Jun. 21, 2018

(86) PCT No.: PCT/JP2018/023556
§ 371 (c)(1),
(2) Date: Dec. 23, 2019

(87) PCT Pub. No.: WO2019/009084
PCT Pub. Date: Jan. 10, 2019

(65) Prior Publication Data
US 2020/0222759 A1    Jul. 16, 2020

(30) Foreign Application Priority Data
Jul. 5, 2017 (JP) .............................. JP2017-131855

(51) Int. Cl.
A63B 24/00     (2006.01)
G06N 20/00     (2019.01)
A63B 71/06     (2006.01)

(52) U.S. Cl.
CPC ...... *A63B 24/0062* (2013.01); *A63B 24/0059* (2013.01); *A63B 24/0075* (2013.01);
(Continued)

(58) Field of Classification Search
CPC ............ A63B 24/0062; A63B 24/0059; A63B 24/0075; A63B 71/0622;
(Continued)

(56) References Cited

U.S. PATENT DOCUMENTS 8,708,918 B1     4/2014  Rulkov et al.
8,868,377 B2 *  10/2014  Yuen ....................... G06F 15/00
                                                           702/160

(Continued)

FOREIGN PATENT DOCUMENTS

EP         2603296 A2      6/2013
EP         2612595 A2      7/2013
(Continued)

OTHER PUBLICATIONS

International Search Report and Written Opinion of PCT Application No. PCT/JP2018/023556, dated Sep. 4, 2018, 12 pages of ISRWO.

*Primary Examiner* — Andrew S Lo
*Assistant Examiner* — Andrew M Kobylarz
(74) *Attorney, Agent, or Firm* — Chip Law Group

(57) ABSTRACT

The present technology relates to an information processing apparatus, information processing method, and program that make it possible to encourage a user to consume energy. The information processing apparatus includes a presentation control unit that controls presentation of energy consumption of a user in a time period from detection of a first trigger to detection of a second trigger. The first trigger causes energy consumption to be presented. The second trigger causes energy consumption to be presented. The present technology is applicable, for example, to a mobile information terminal such as a wearable device or a smartphone.

19 Claims, 38 Drawing Sheets

(52) U.S. Cl.
CPC ......... *A63B 71/0622* (2013.01); *G06N 20/00* (2019.01); *A63B 2024/0068* (2013.01); *A63B 2071/068* (2013.01); *A63B 2071/0625* (2013.01); *A63B 2071/0655* (2013.01); *A63B 2071/0663* (2013.01); *A63B 2071/0666* (2013.01); *A63B 2071/0694* (2013.01); *A63B 2220/40* (2013.01); *A63B 2220/836* (2013.01); *A63B 2225/50* (2013.01); *A63B 2225/74* (2020.08); *A63B 2230/06* (2013.01); *A63B 2230/50* (2013.01); *A63B 2230/75* (2013.01)

(58) Field of Classification Search
CPC .... A63B 2024/0068; A63B 2071/0625; A63B 2071/0655; A63B 2071/0663; A63B 2071/0666; A63B 2071/068; A63B 2071/0694; A63B 2220/40; A63B 2220/836; A63B 2225/50; A63B 2225/74; A63B 2230/06; A63B 2230/50; A63B 2230/75
USPC ......................................................... 434/247
See application file for complete search history.

(56) References Cited

U.S. PATENT DOCUMENTS

| | | | |
|---|---|---|---|
| 9,778,280 B2 * | 10/2017 | Yuen | A61B 5/0022 |
| 9,817,481 B2 * | 11/2017 | Pantelopoulos | A61B 5/6824 |
| 9,875,400 B2 * | 1/2018 | Uchida | G06V 40/23 |
| 9,961,969 B2 * | 5/2018 | Kawabata | A44C 5/20 |
| 10,004,406 B2 * | 6/2018 | Yuen | A61B 5/0205 |
| 10,674,942 B2 * | 6/2020 | Williams | G06F 3/016 |
| 10,918,907 B2 * | 2/2021 | Niehaus | G06K 9/00496 |
| 10,978,195 B2 * | 4/2021 | Blahnik | G16H 20/40 |
| 11,051,706 B1 * | 7/2021 | Nadeau | A61B 5/1455 |
| 11,216,119 B2 * | 1/2022 | De Vries | G06F 3/044 |
| 11,250,385 B2 * | 2/2022 | Chaudhri | G06F 3/0414 |
| 11,259,707 B2 * | 3/2022 | Yuen | A61B 5/0075 |
| 11,277,485 B2 * | 3/2022 | Arney | A61B 5/742 |
| 11,314,395 B2 * | 4/2022 | Chang | G06Q 20/363 |
| 11,317,833 B2 * | 5/2022 | Williams | A61B 5/681 |
| 2010/0331145 A1 * | 12/2010 | Lakovic | G04G 21/02 482/8 |
| 2012/0041767 A1 * | 2/2012 | Hoffman | G07C 1/22 482/8 |
| 2012/0274508 A1 | 11/2012 | Brown et al. | |
| 2016/0106360 A1 * | 4/2016 | Choi | A61B 5/742 434/247 |
| 2020/0388190 A1 * | 12/2020 | Mochizuki | G09B 19/0038 |

FOREIGN PATENT DOCUMENTS

| | | |
|---|---|---|
| EP | 3009947 A1 | 4/2016 |
| JP | 07-295957 A | 11/1995 |
| JP | 2013-003048 A | 1/2013 |
| JP | 2013-112143 A | 6/2013 |
| JP | 2013-140158 A | 7/2013 |
| JP | 2013-536507 A | 9/2013 |
| JP | 2016-077878 A | 5/2016 |
| JP | 2017-023449 A | 2/2017 |
| WO | 2006/036911 A1 | 4/2006 |

* cited by examiner

[FIG. 1]
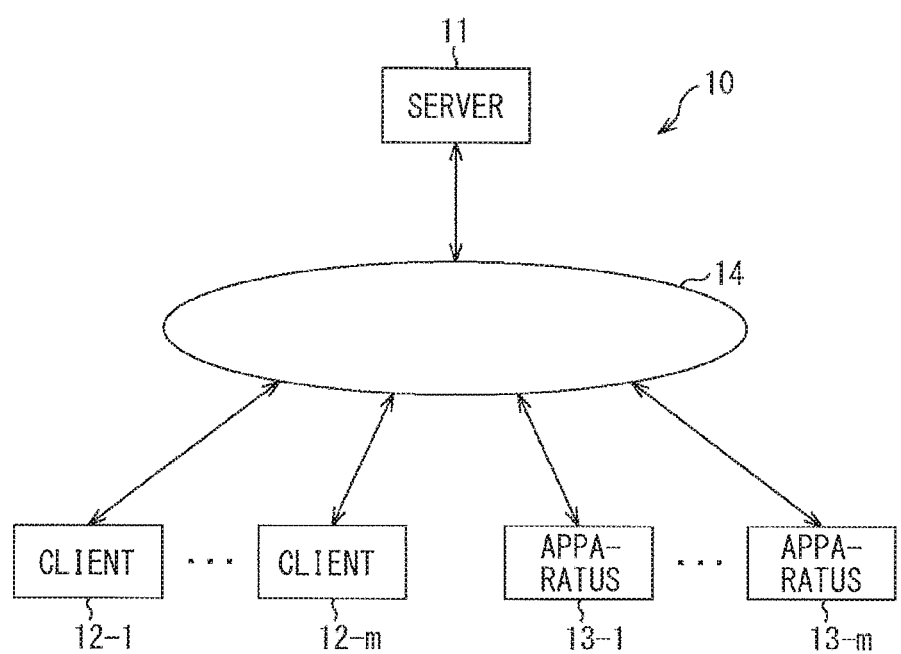

[FIG. 2]
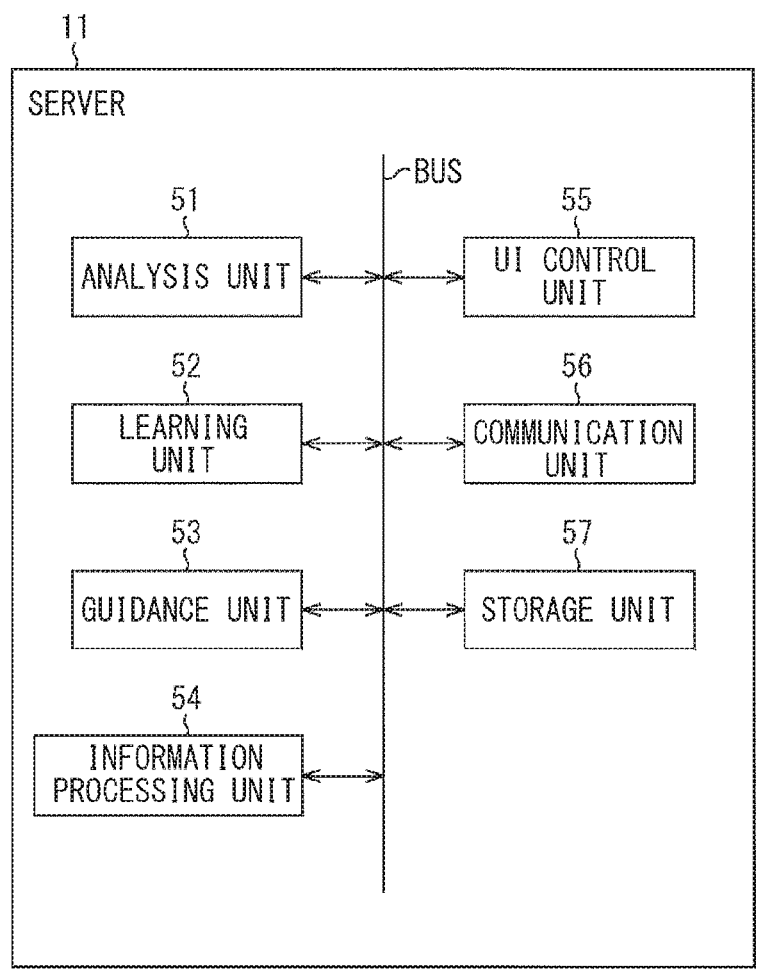

[FIG. 3]
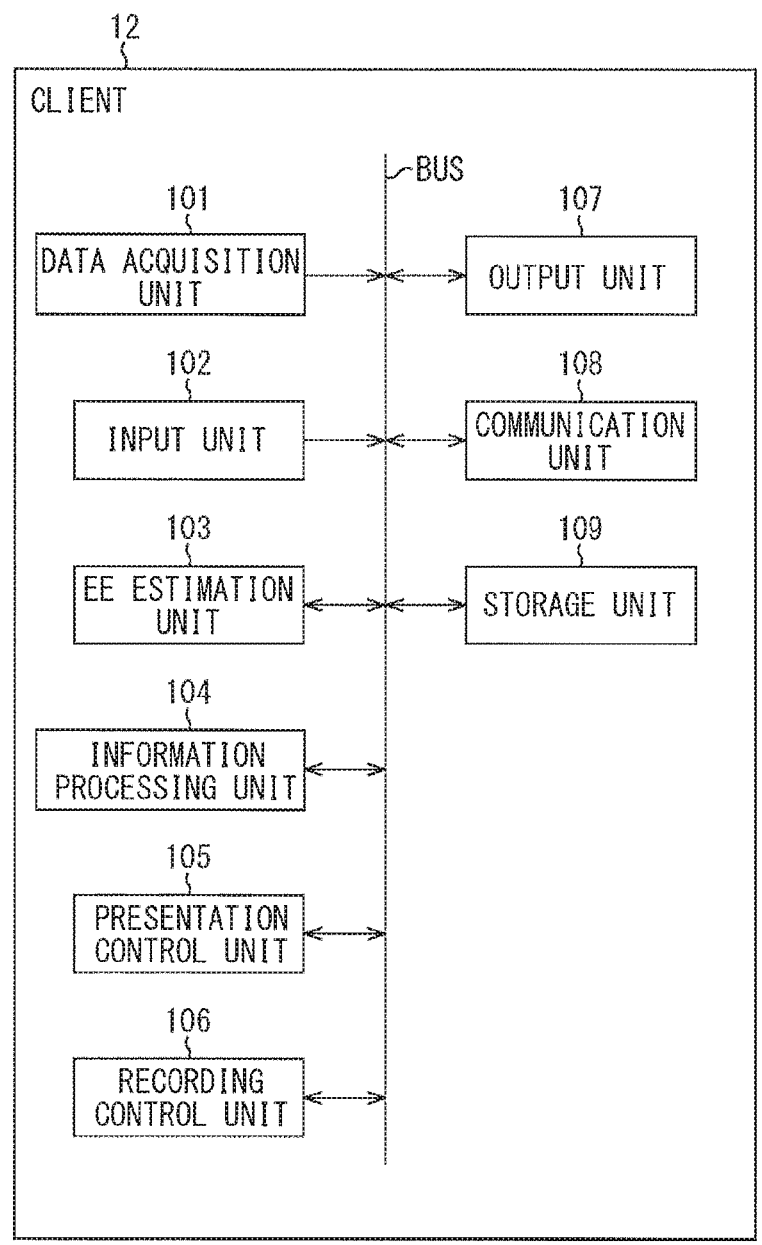

[FIG. 4]
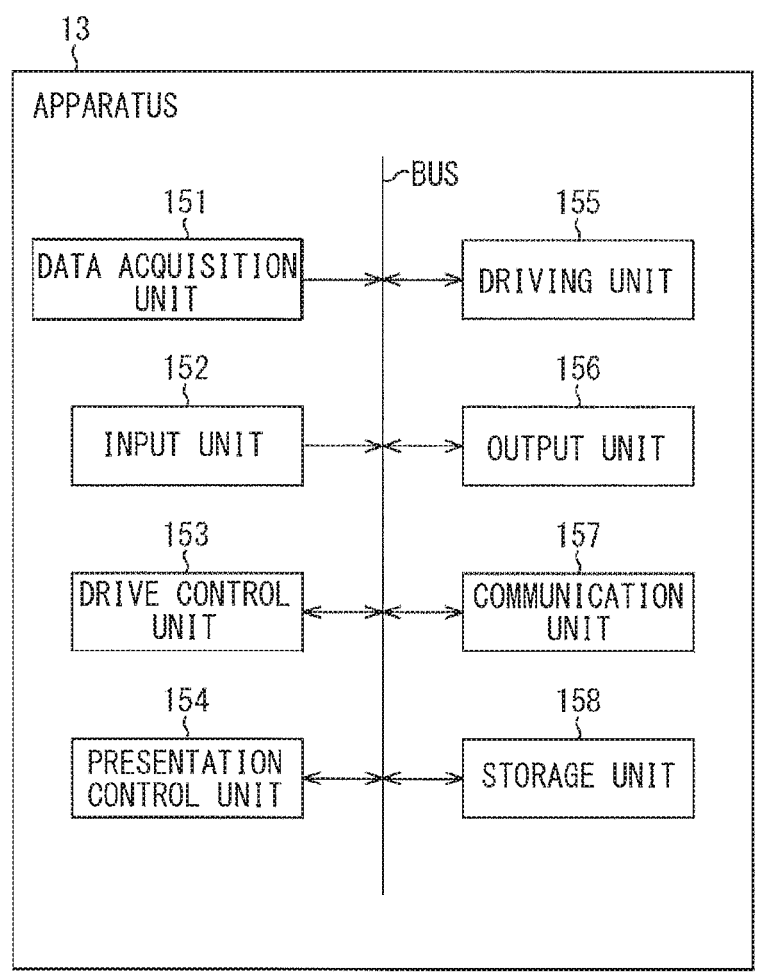

[FIG. 5]
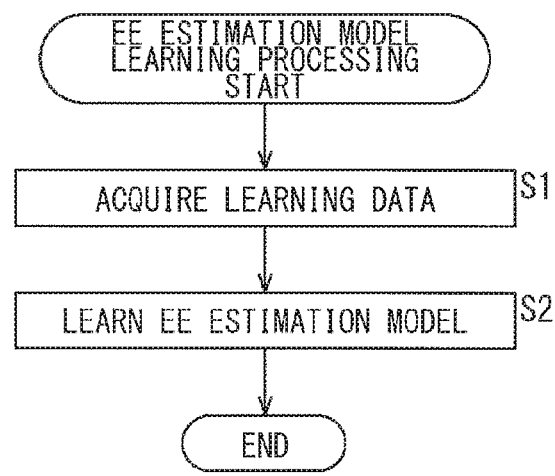
[FIG. 6]
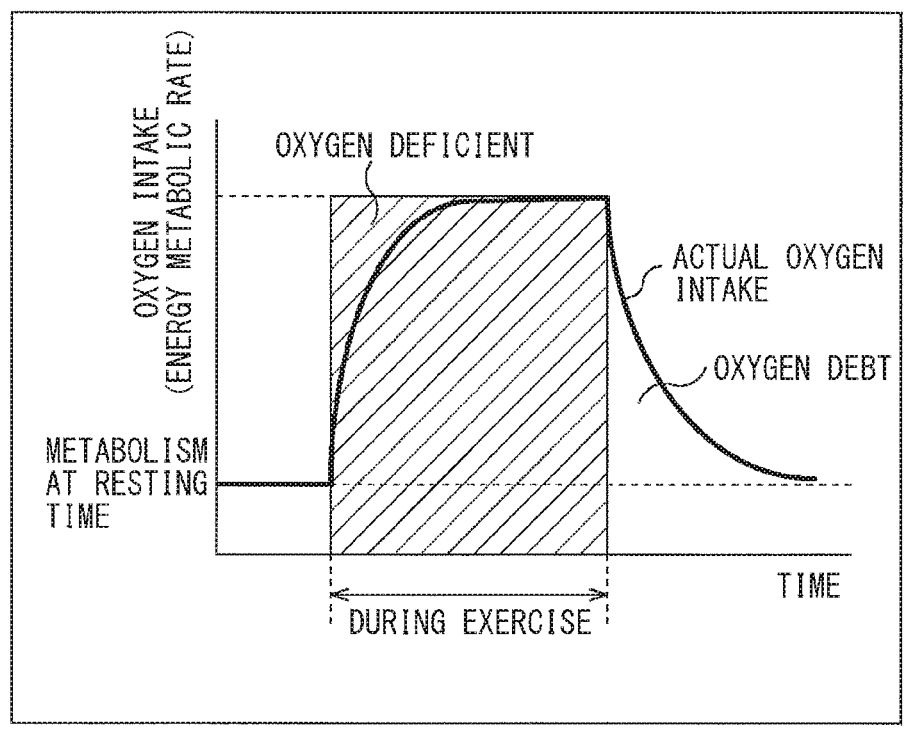

[FIG. 7]
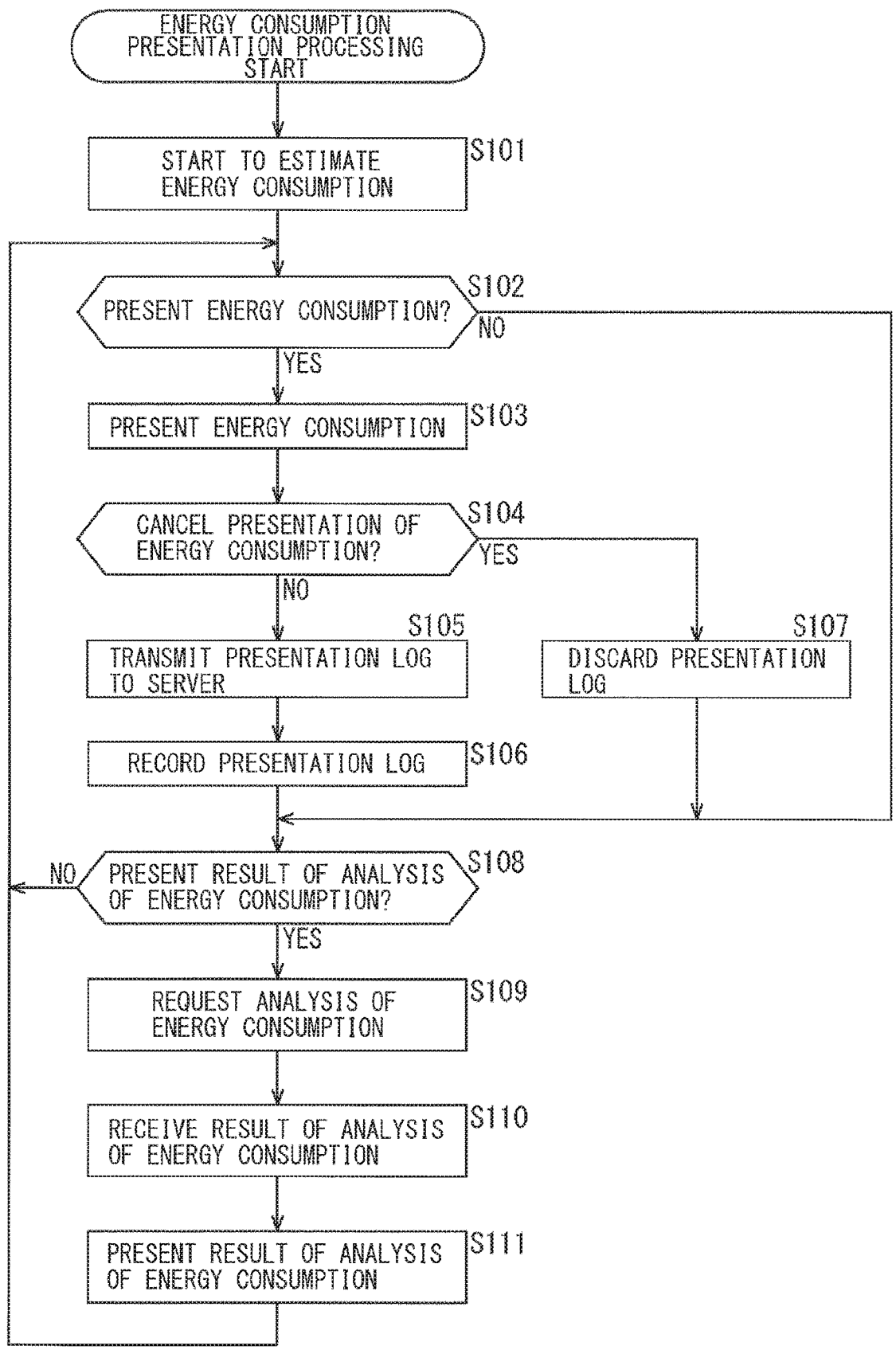

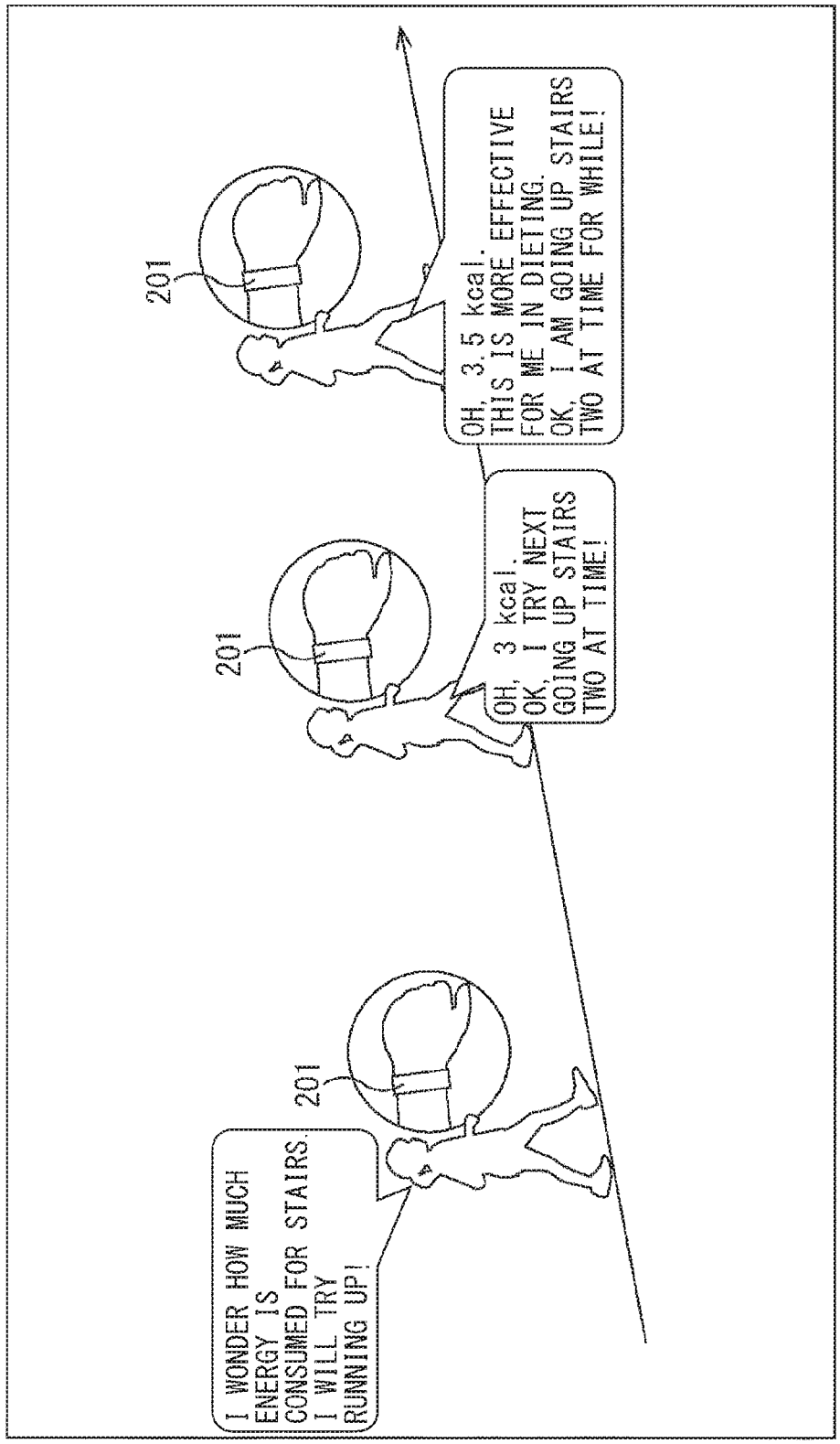
[FIG. 8]

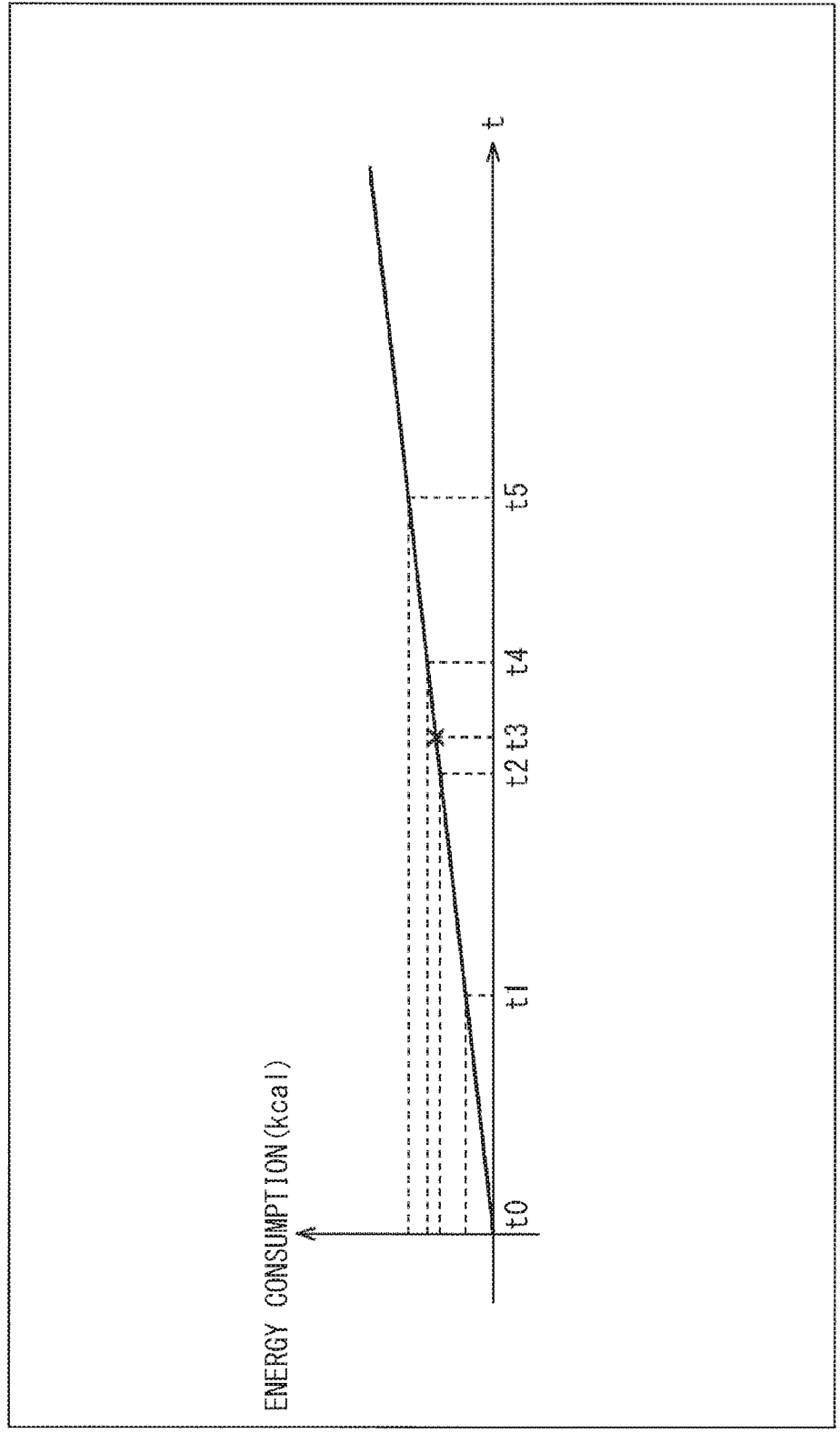

[FIG. 10]
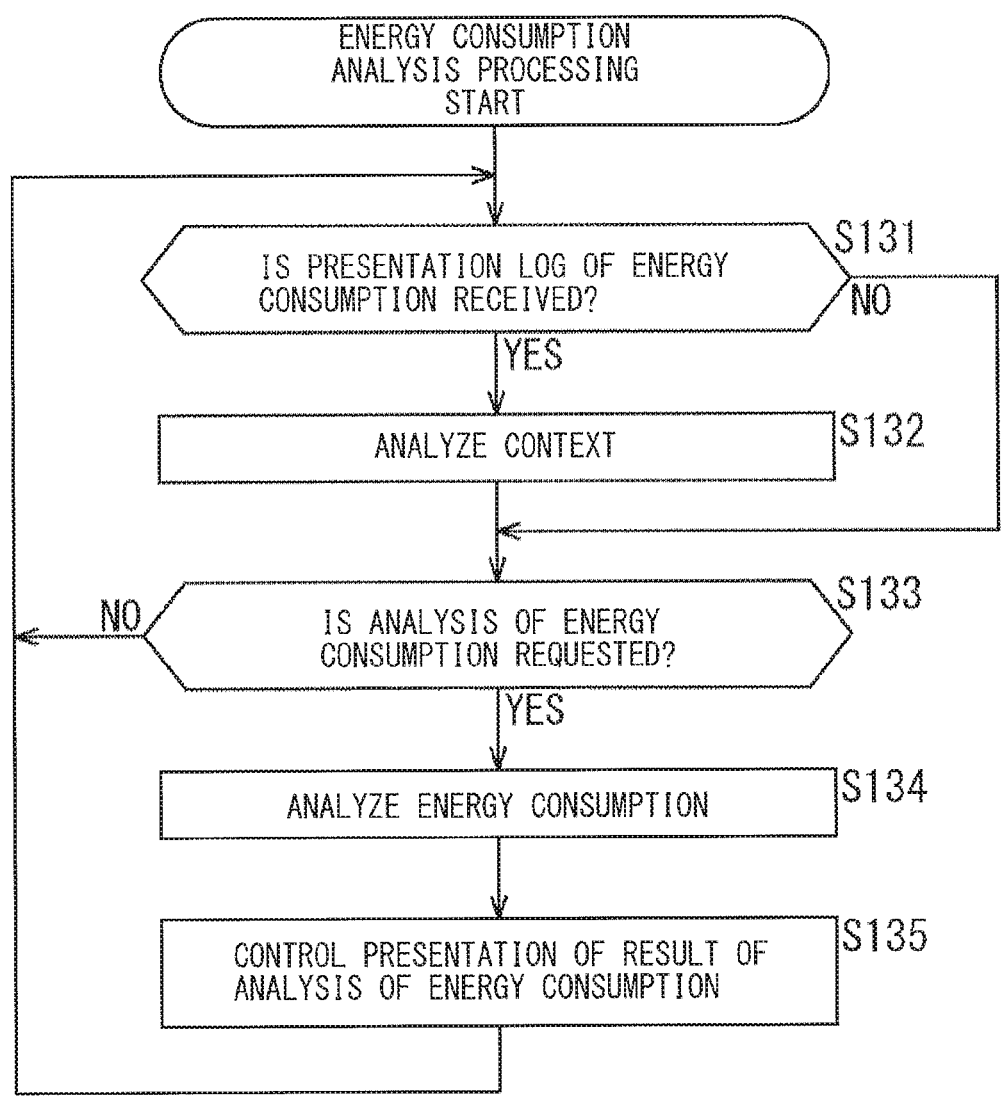

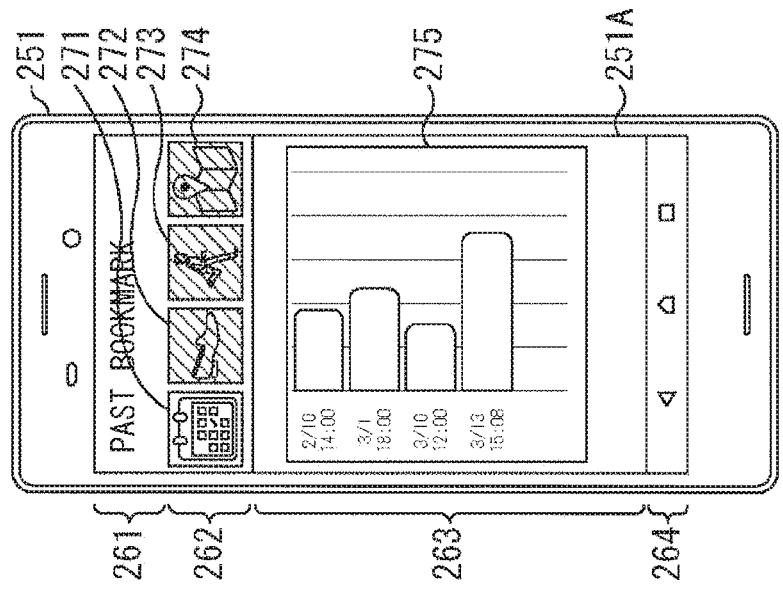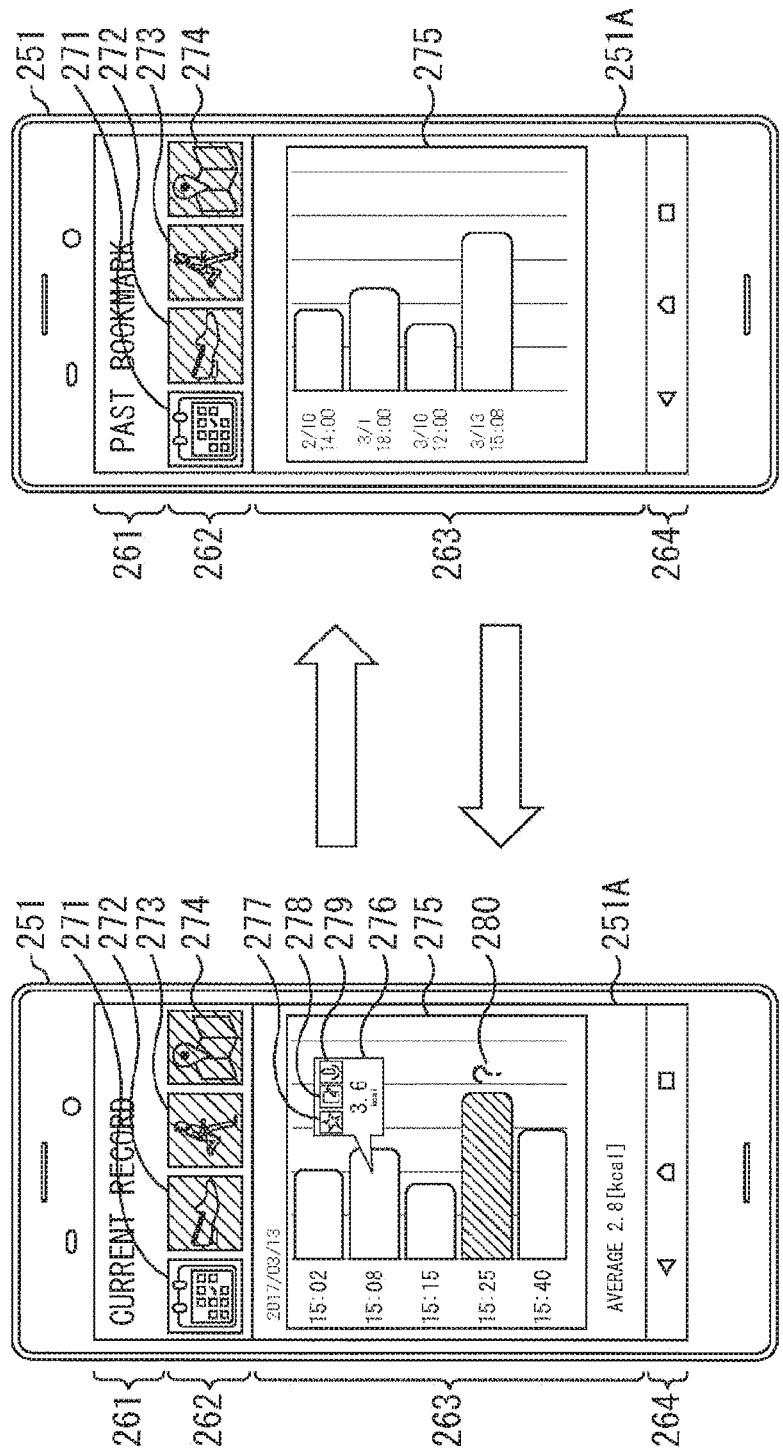

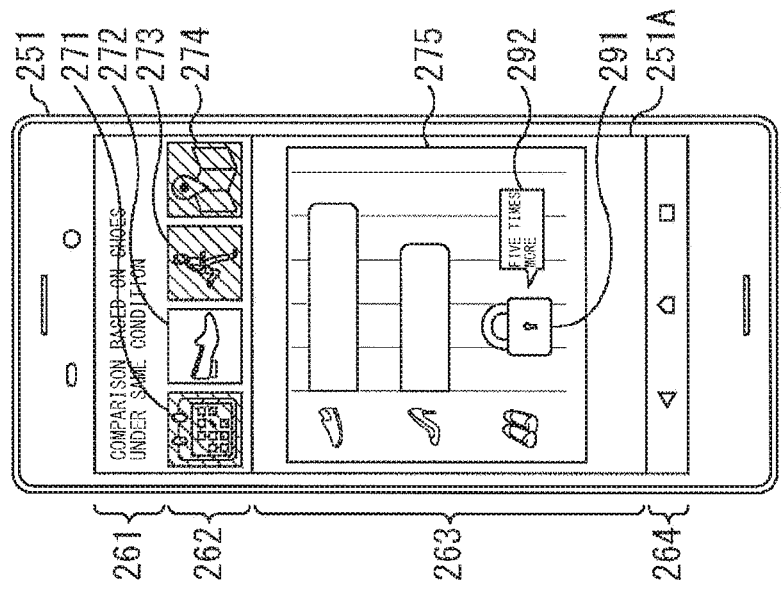
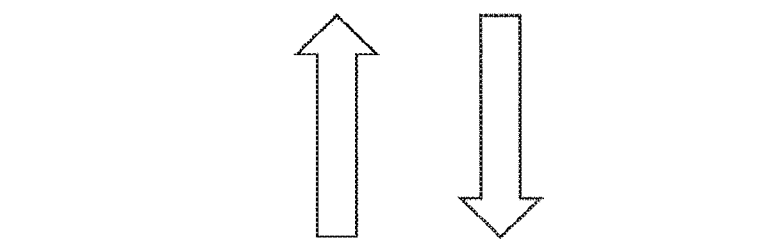
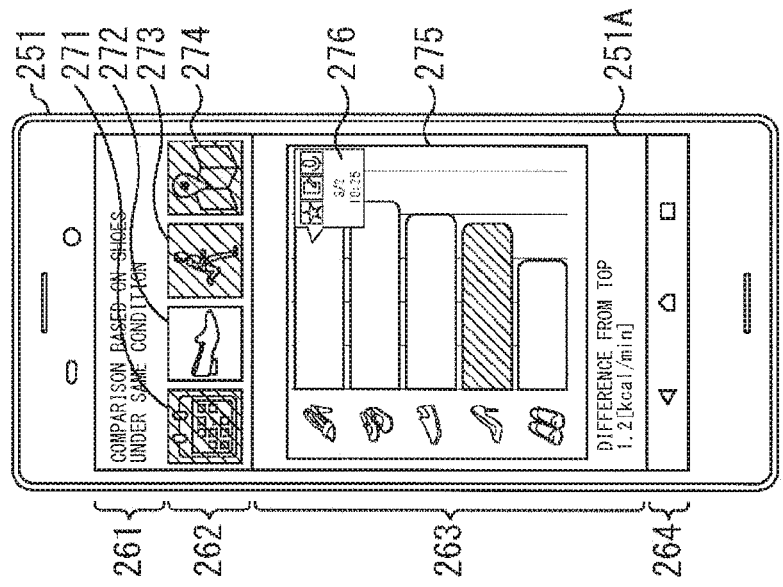

[FIG. 13]
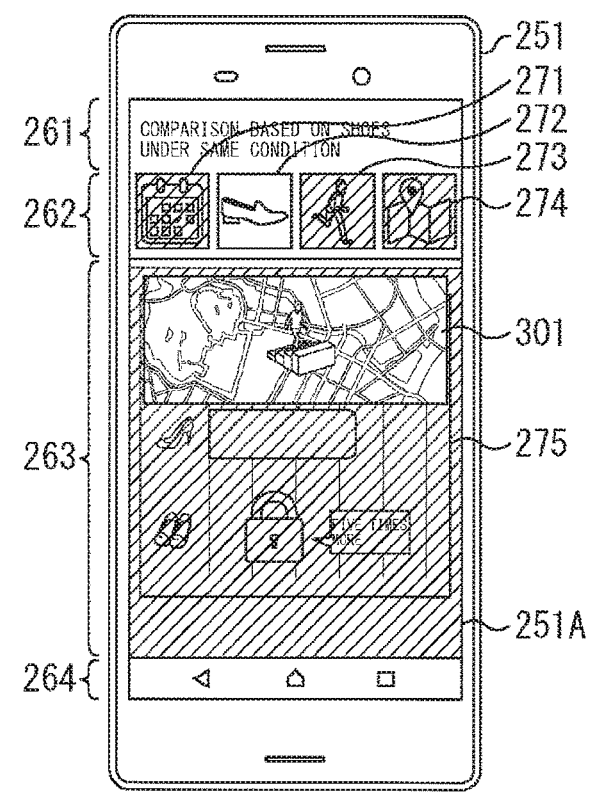

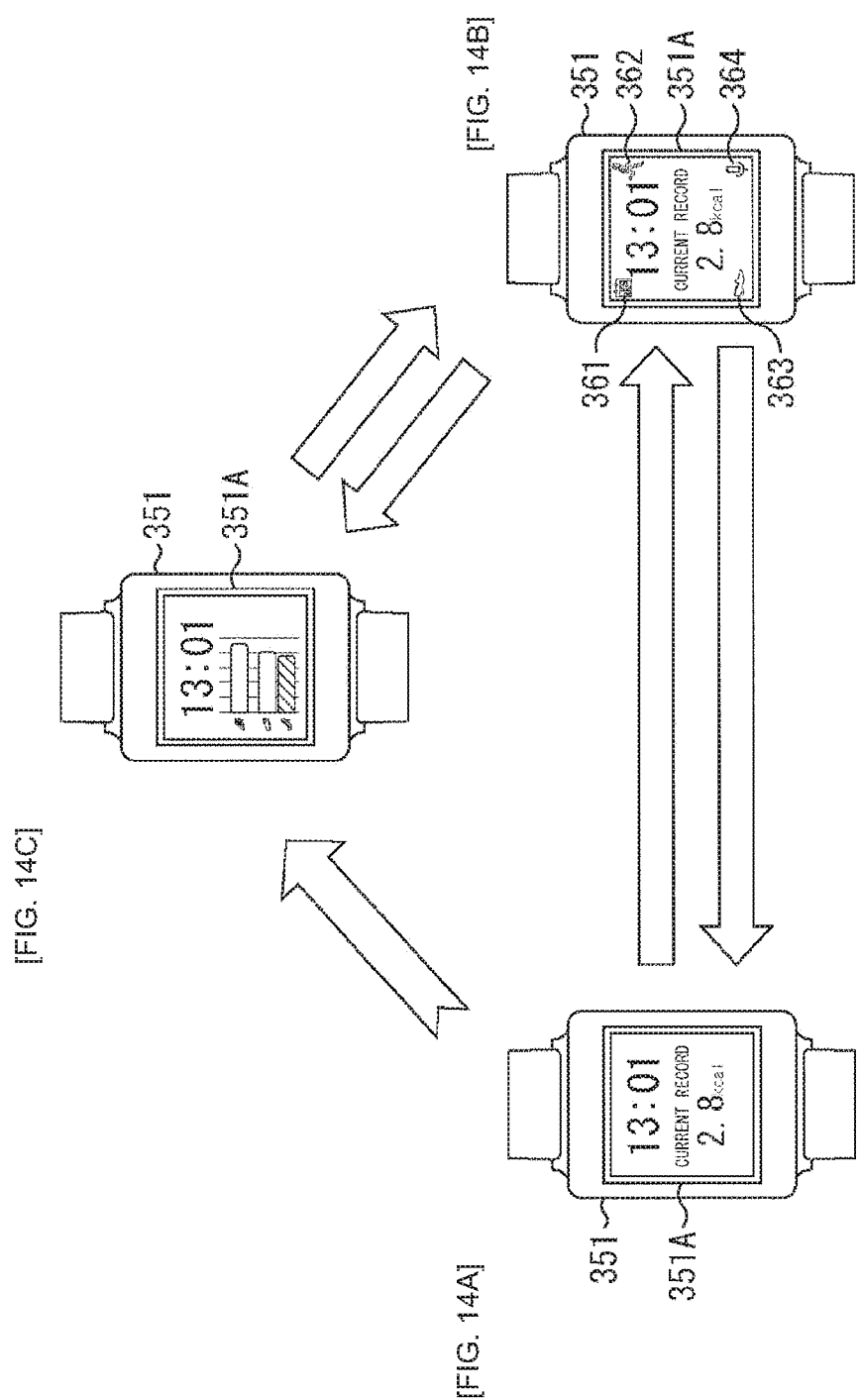

[FIG. 15]
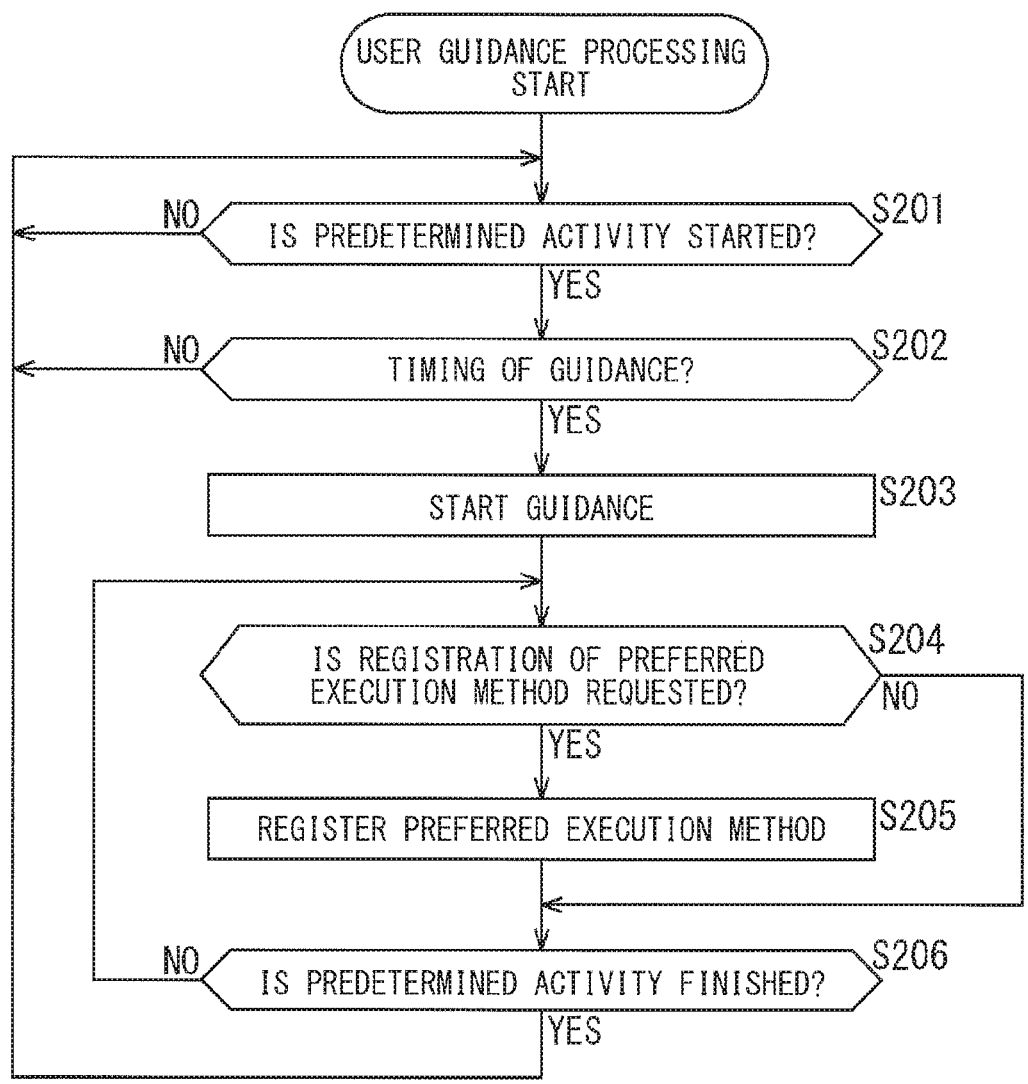

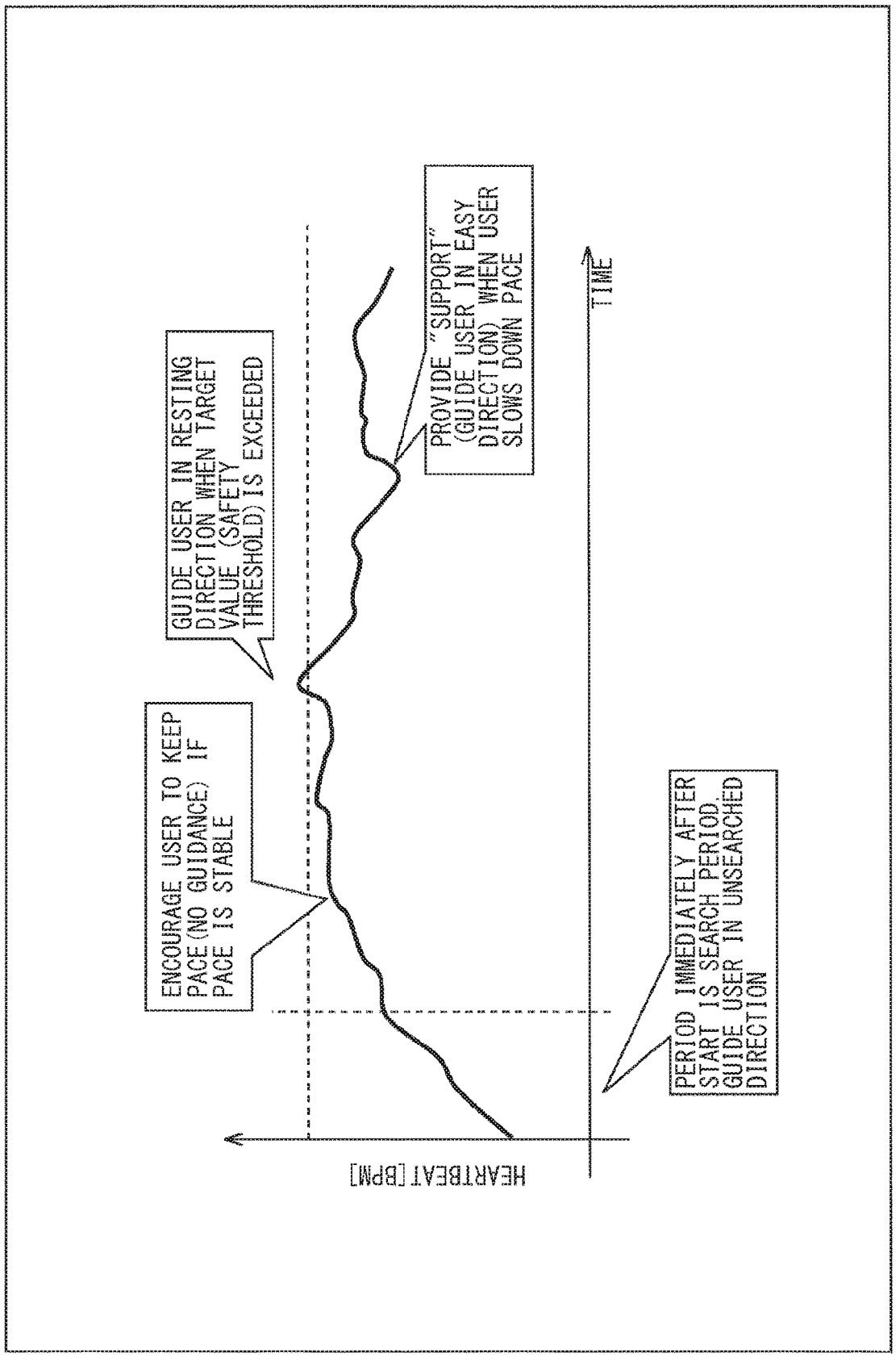

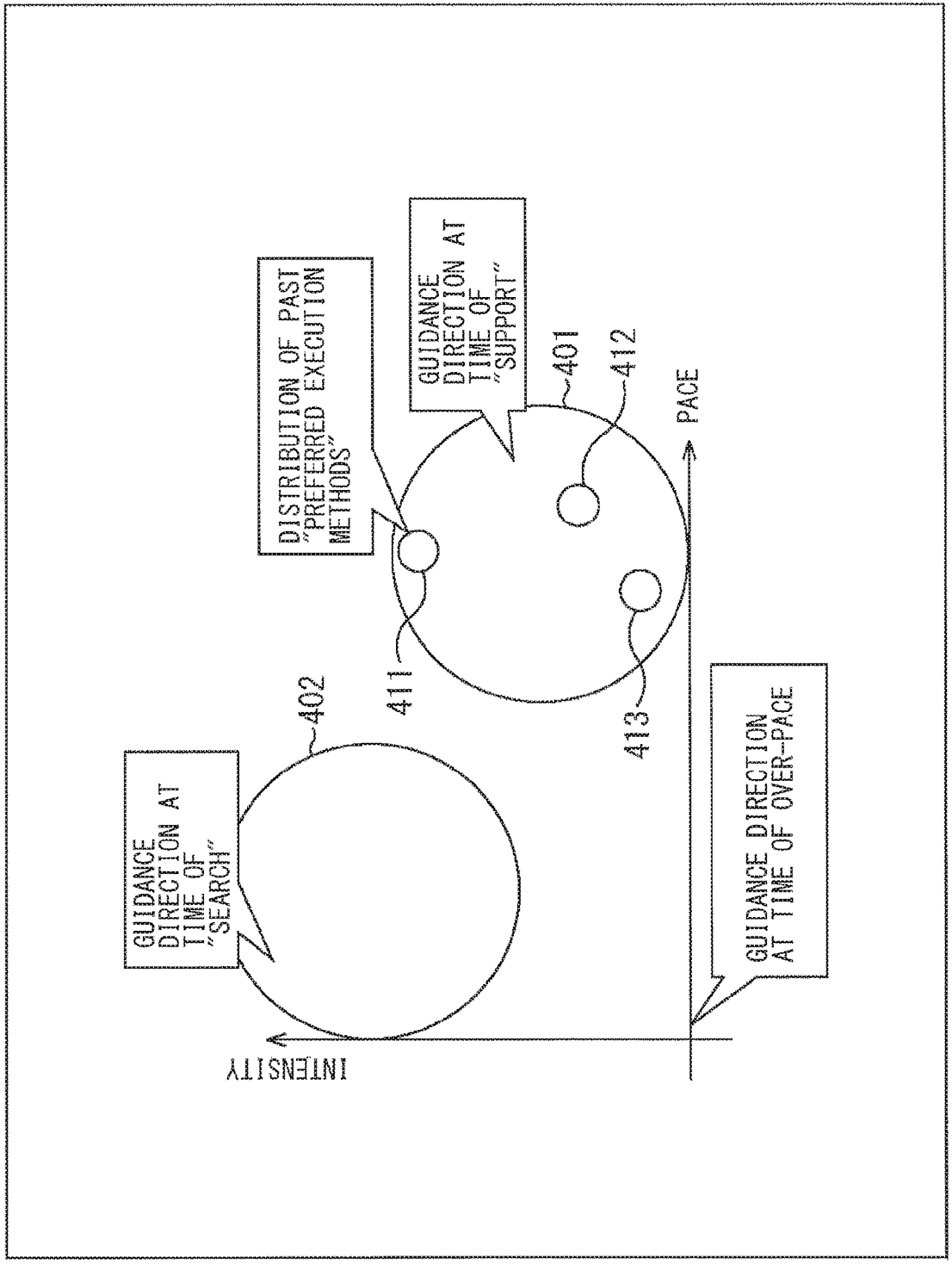

[FIG. 18]
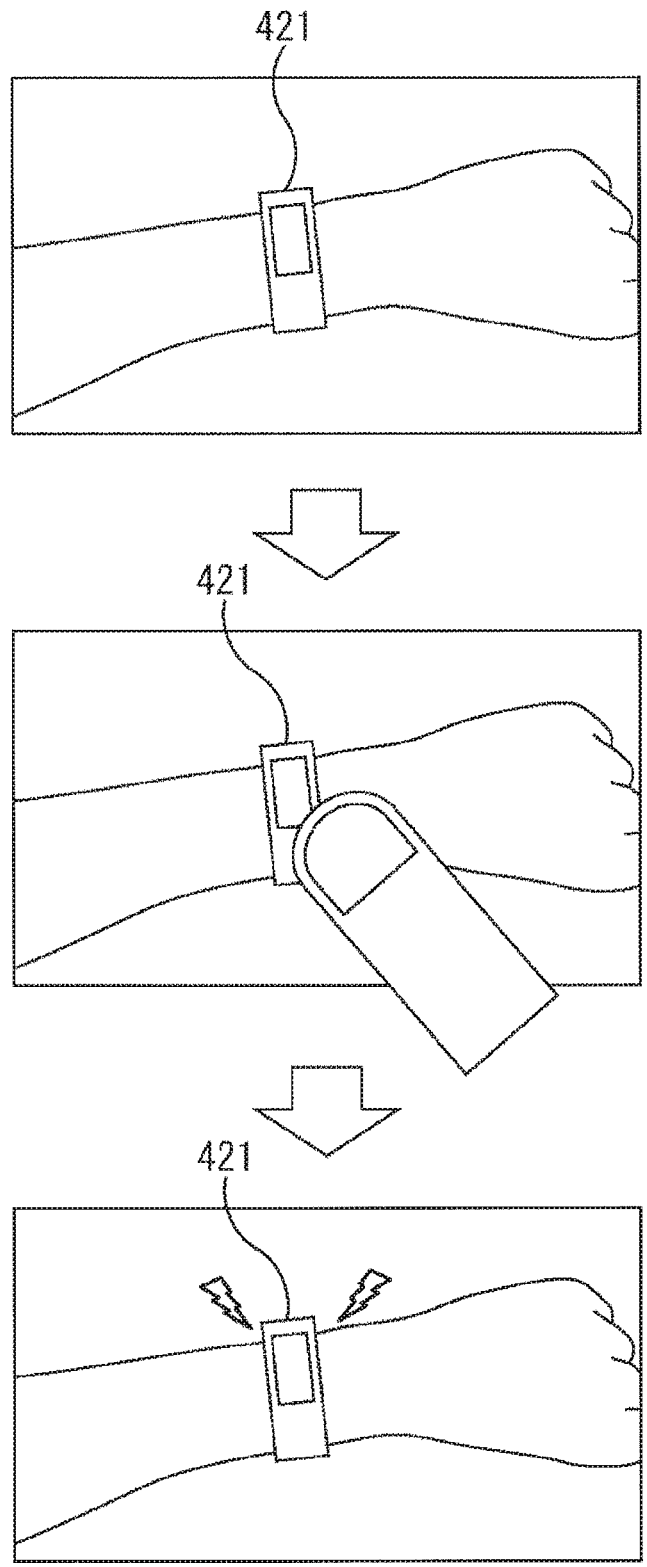

[FIG. 19]
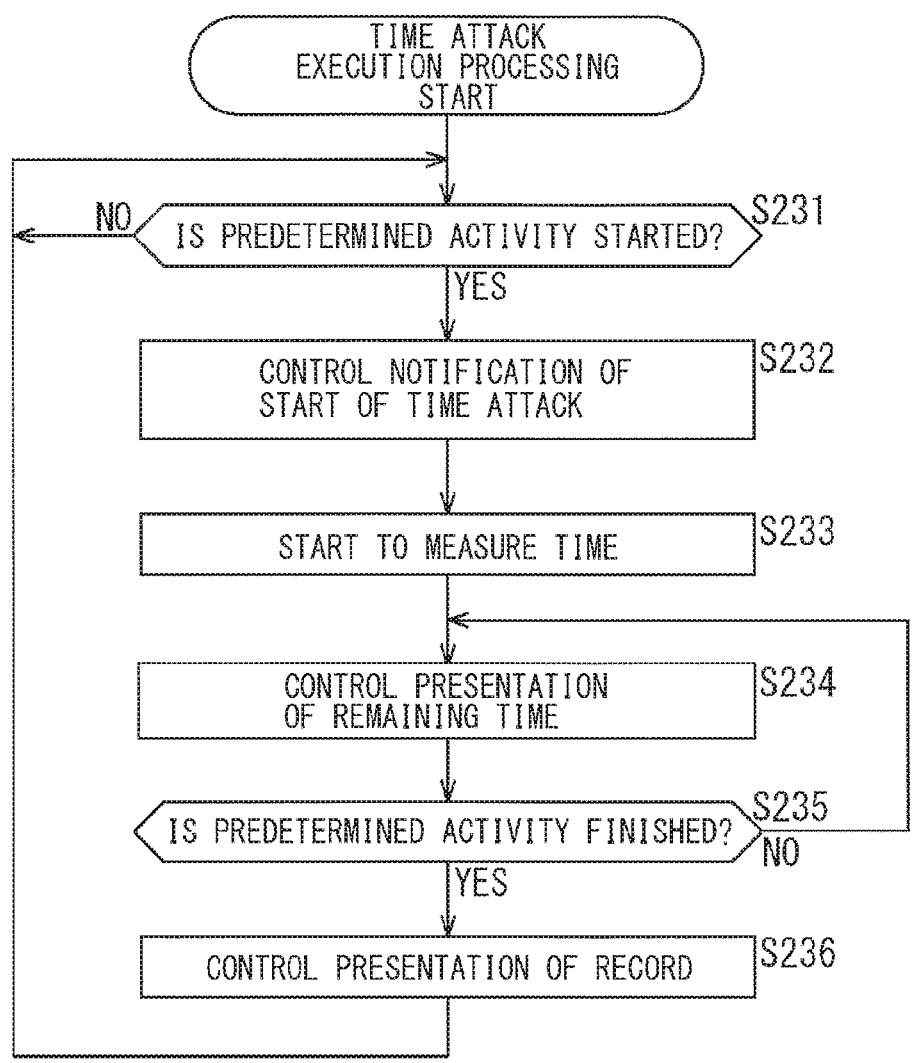

[FIG. 20A] 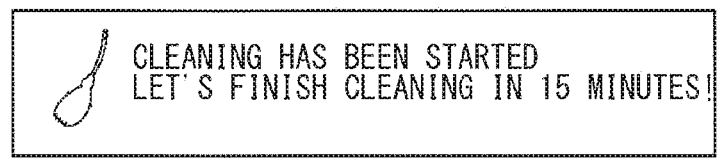
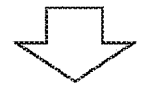
[FIG. 20B] 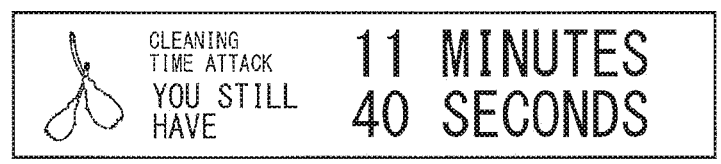
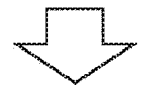
[FIG. 20C] 
[FIG. 20D] 

[FIG. 21]
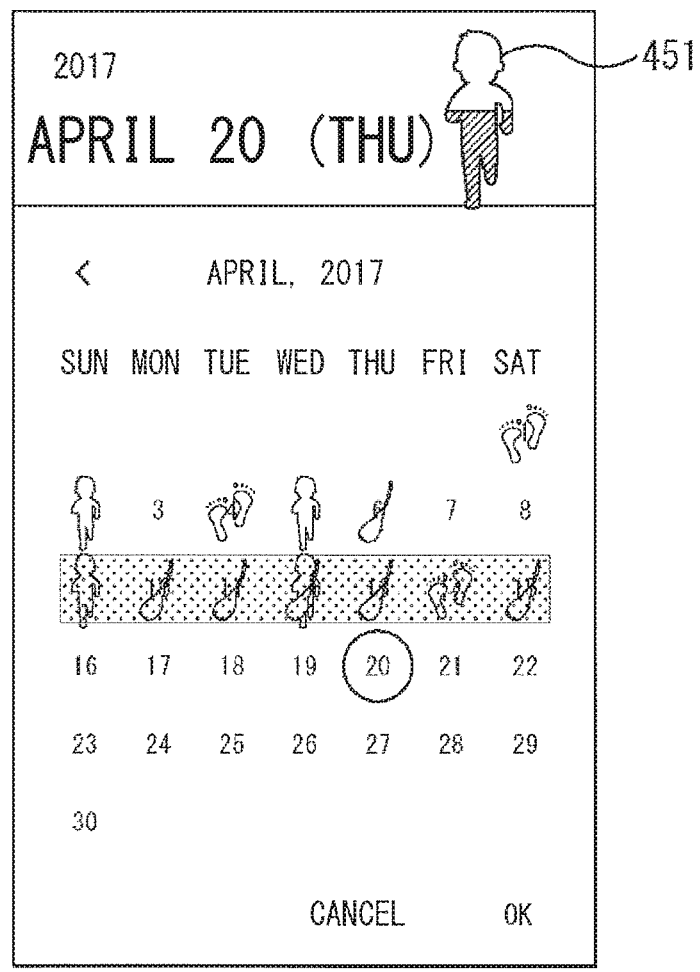

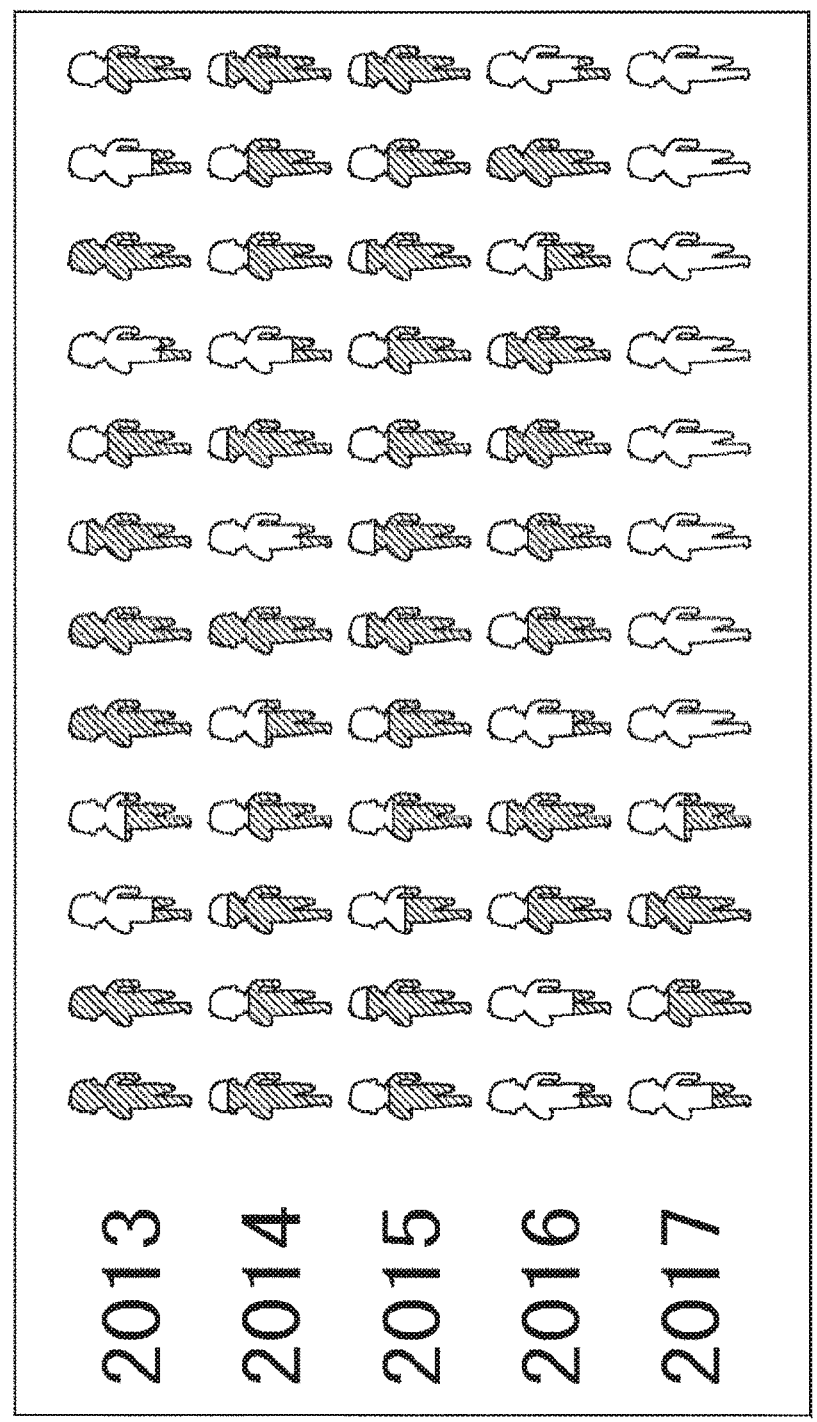
[FIG. 22]

[FIG. 23]
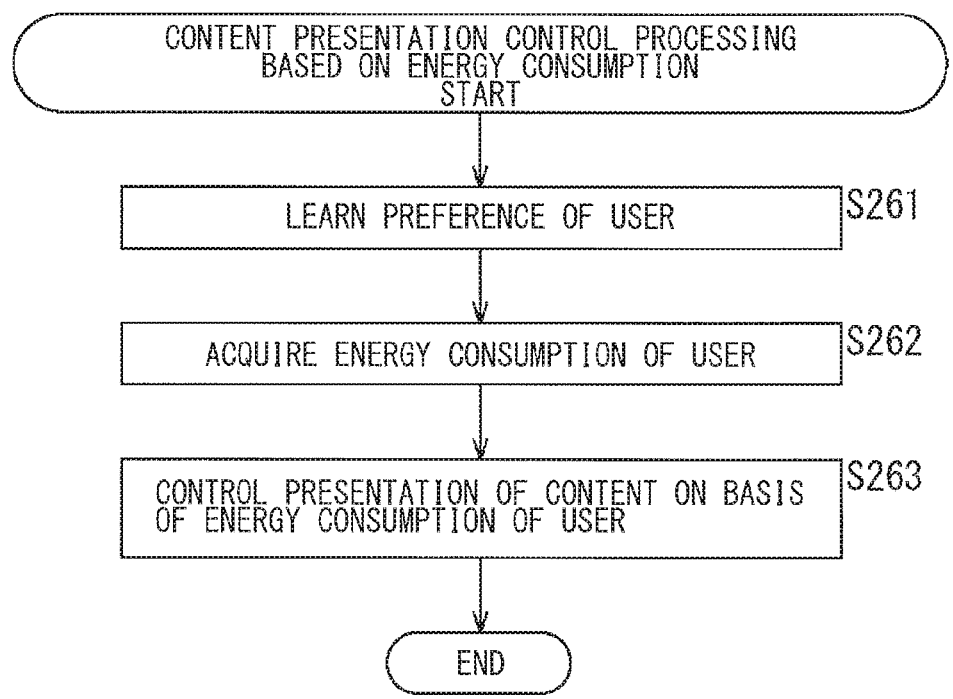

[FIG. 24A]

SELECT PREFERRED ARTIST
✓ ARTIST 1
ARTIST 2
ARTIST 3
✓ ARTIST 4
ARTIST 5
✓ ARTIST 6
ARTIST 7
ARTIST 8
✓ ARTIST 9

[FIG. 24B]

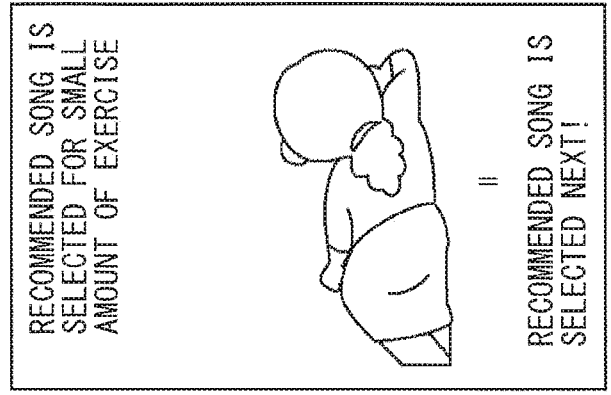

LET'S SAVE UP AMOUNT OF EXERCISE FOR BEST SONG SELECTION

STAIRS FOR TEN FLOORS
WALK FOR 30 MINUTES
RUN FOR 10 MINUTES

= INCREASE IN PROBABILITY OF SELECTION OF PREFERRED SONG AS NEXT TRACK!

[FIG. 24C]

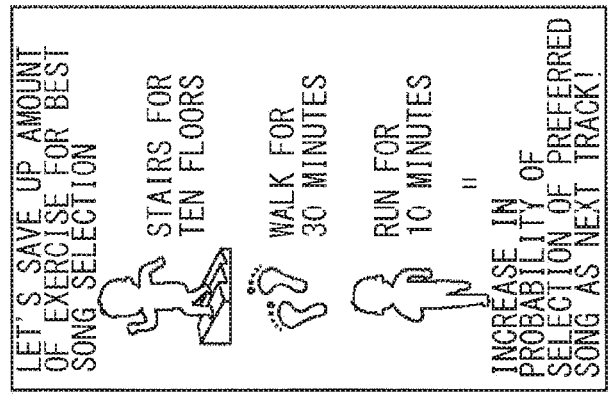

RECOMMENDED SONG IS SELECTED FOR SMALL AMOUNT OF EXERCISE

= RECOMMENDED SONG IS SELECTED NEXT!

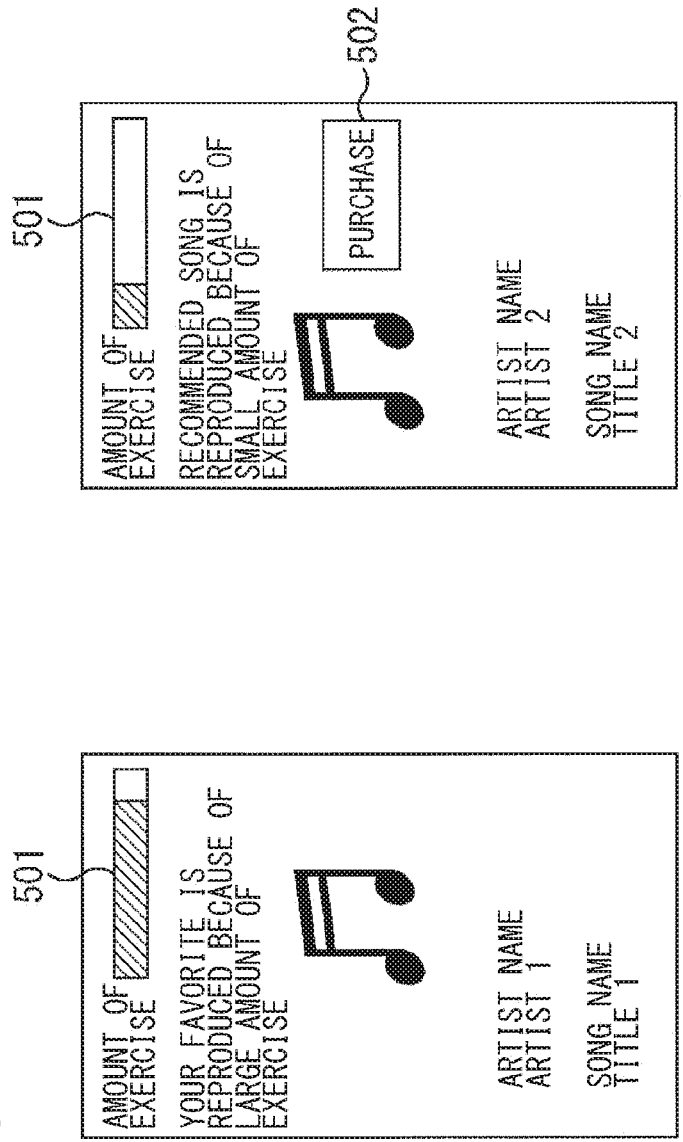

[FIG. 26]
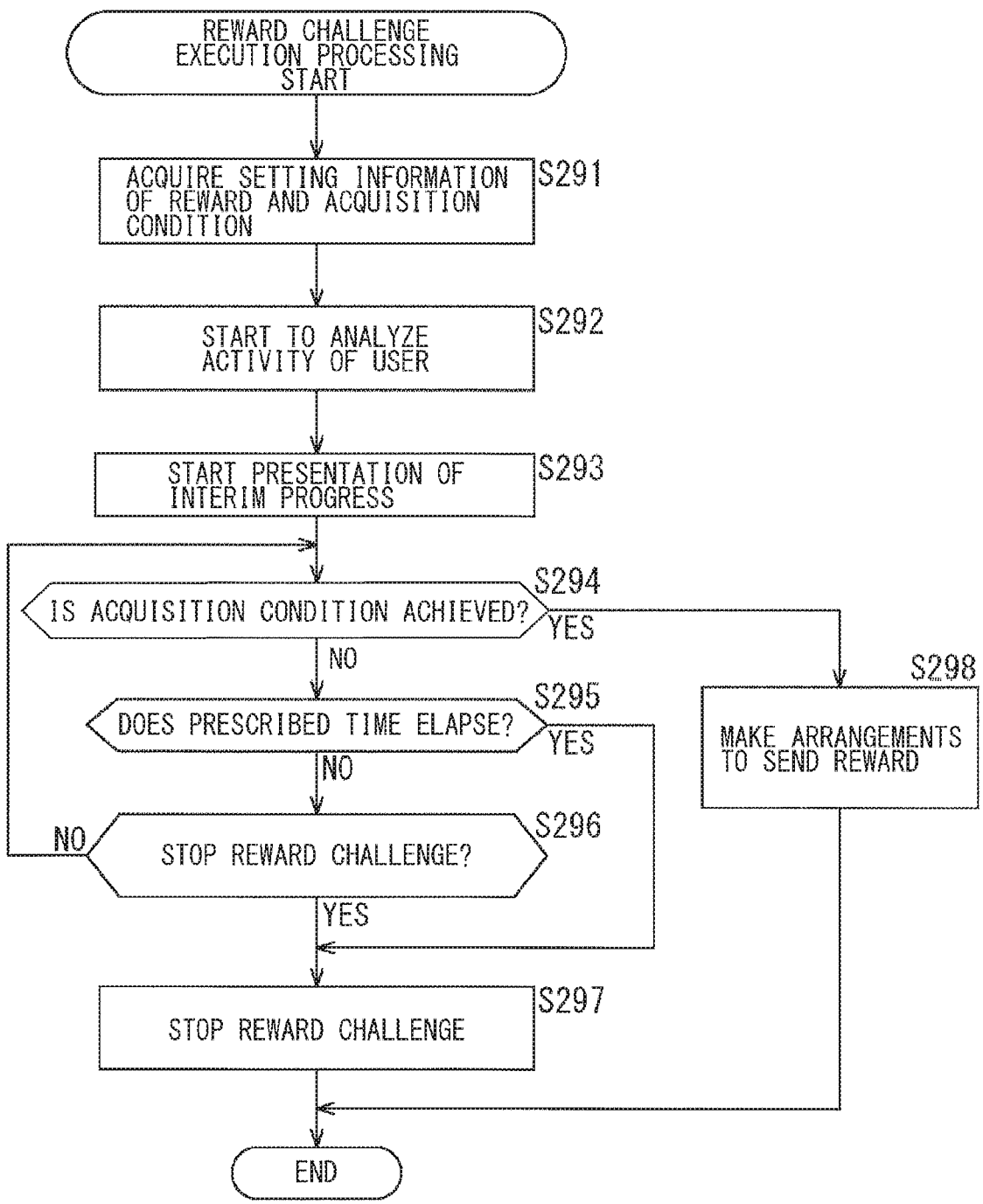

[FIG. 27A]

WHAT DO YOU WANT? — 551
CAMERA 🔍

Maker1
ModelA
$300

Maker2
ModelB
$200

Maker3
ModelC
$600

[FIG. 27B]

SET REWARD ACQUISITION CONDITION

CHANGE BY TAPPING
STA-IRS [10] FLOORS — 552
[30] MINUTES WALK — 553
[10] RUNNING — 554

= POINT FOR $1 ACQUIRED

[FIG. 27C]

REWARD CHALLENGE CONFIRMATION
CONTENTS OF REWARD
Maker2
ModelB
$200

REWARD ACQUISITION CONDITION
STAIRS FOR 10 FLOORS $1
WALK FOR 30 MINUTES $1
RUN FOR 10 MINUTES $1
22,000 kcal CONSUMED IN TOTAL

START CHALLENGE!! — 555

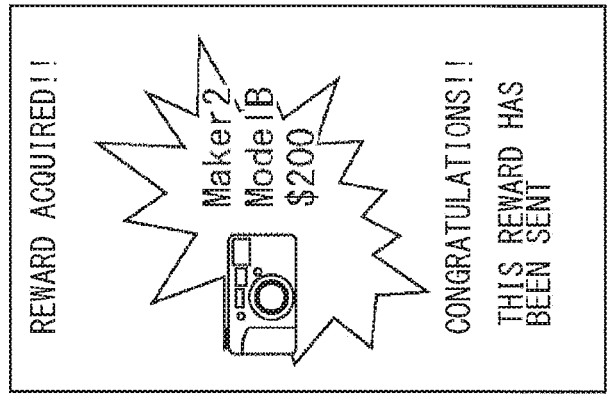
[FIG. 28B]
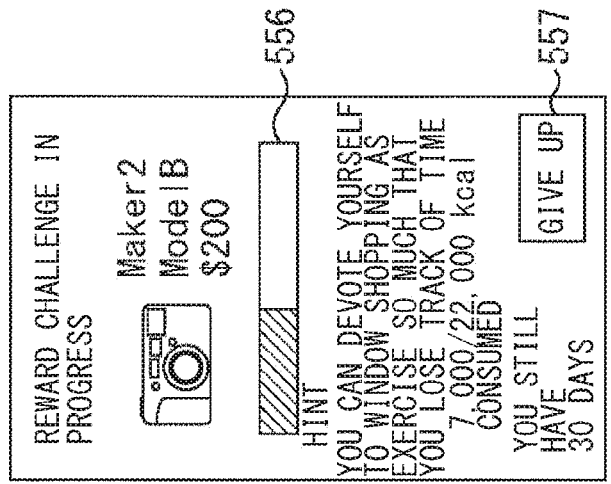
[FIG. 28A]

[FIG. 29]
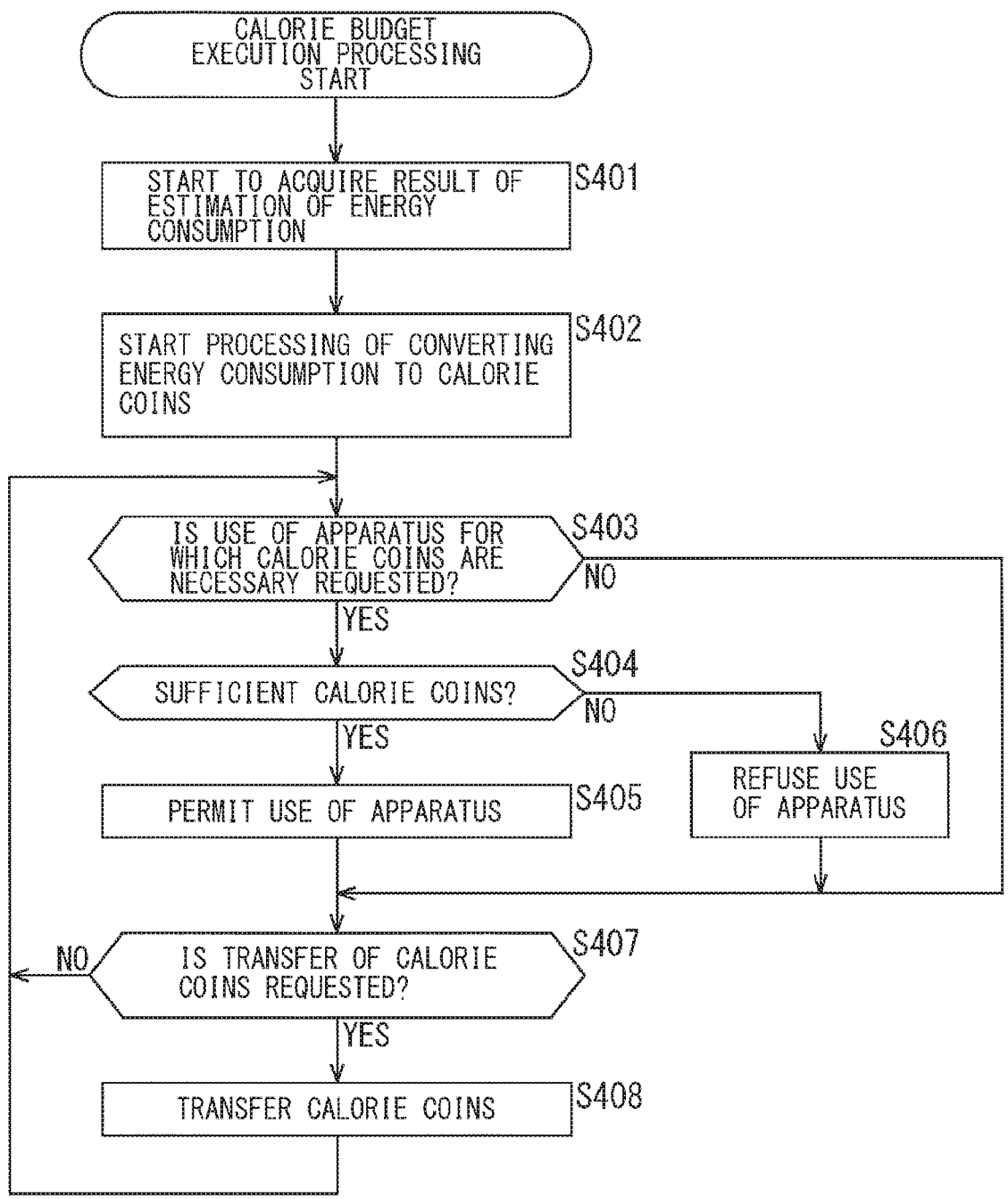

[FIG. 30]
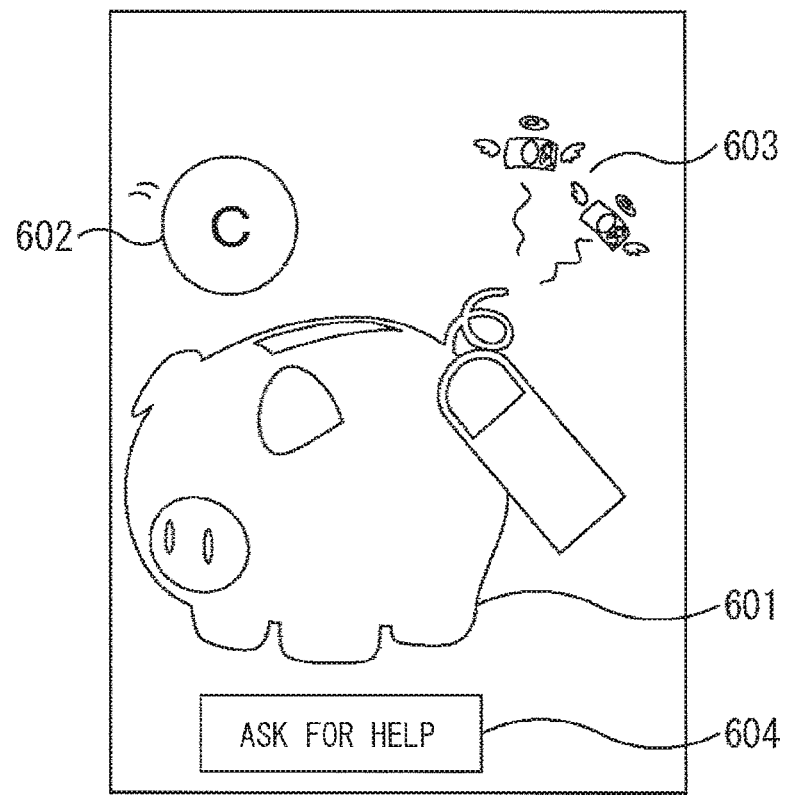

[FIG. 31]
[FIG. 32]
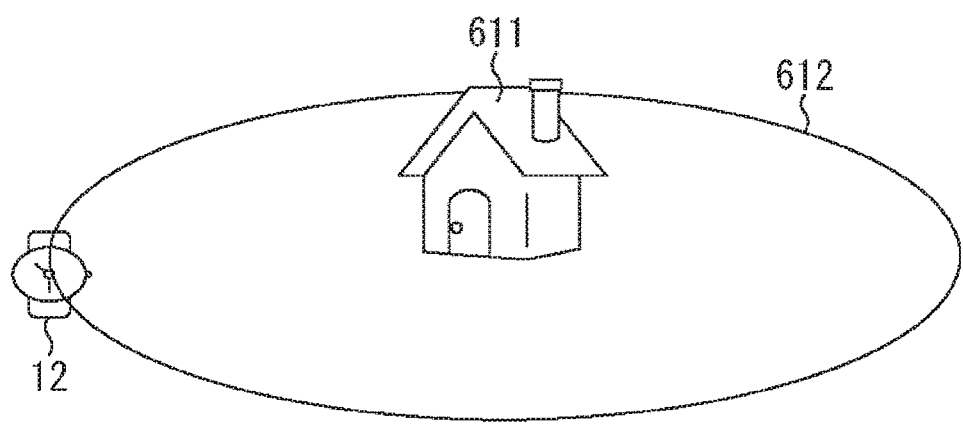

[FIG. 33]
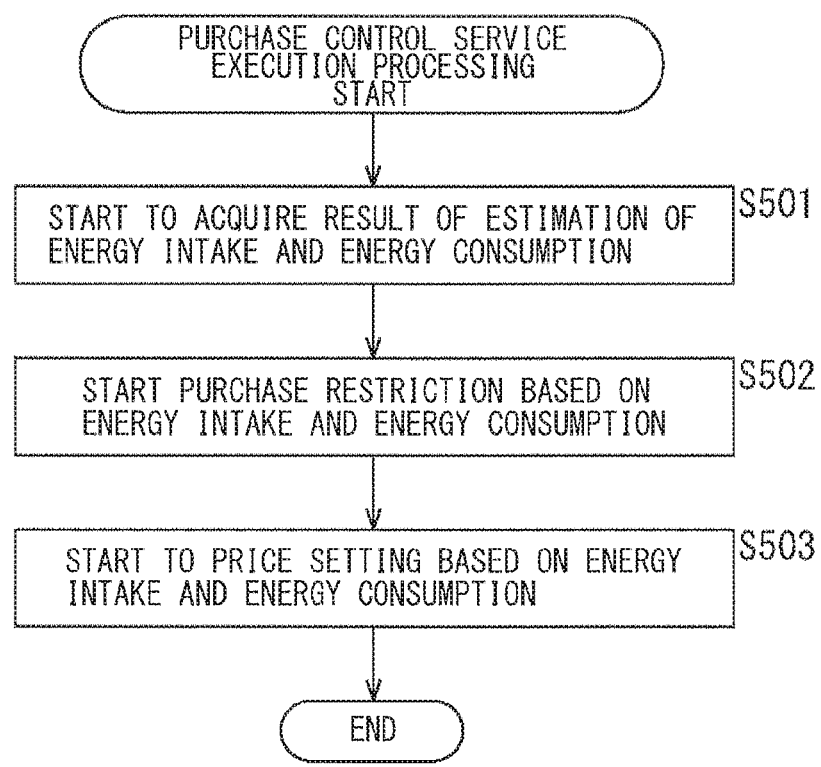

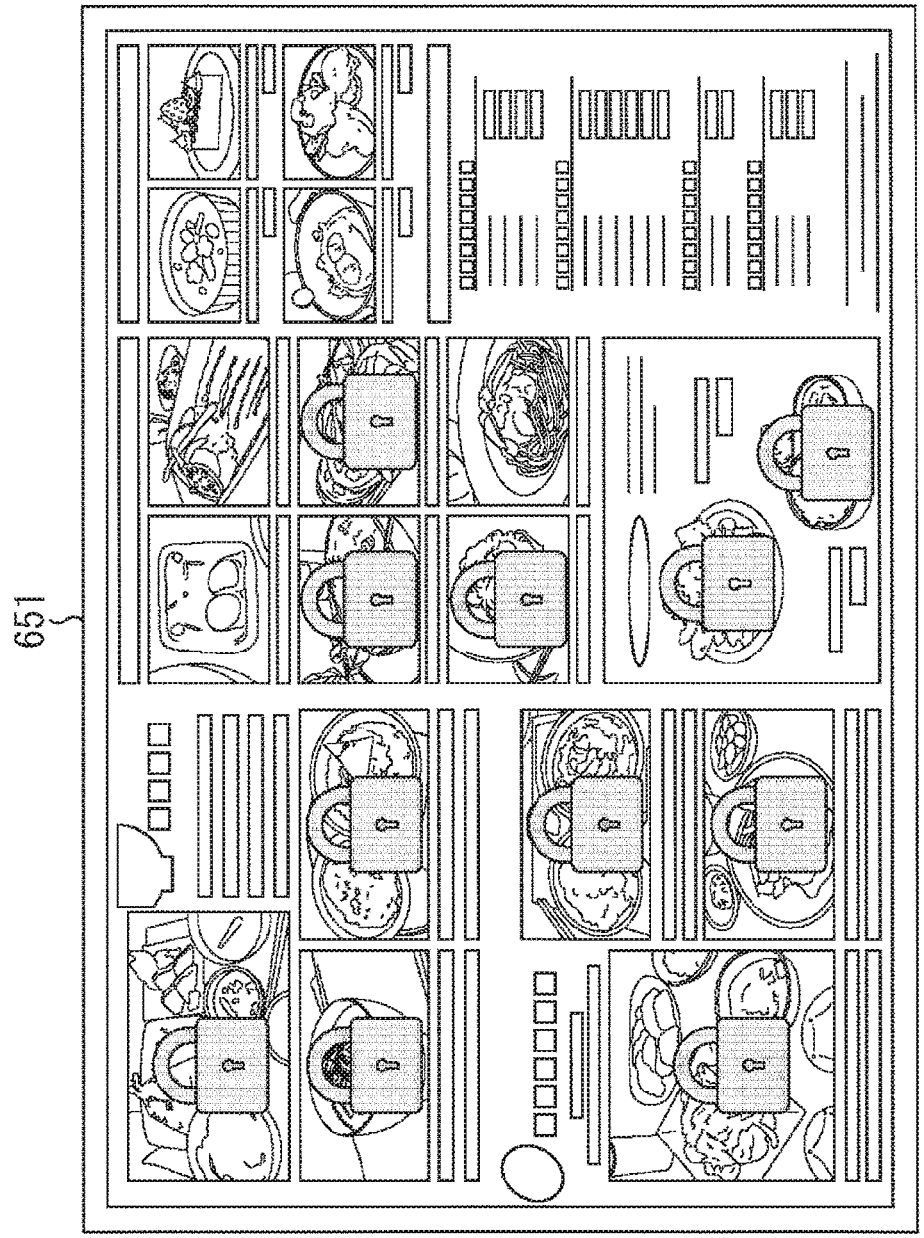
[FIG. 34]

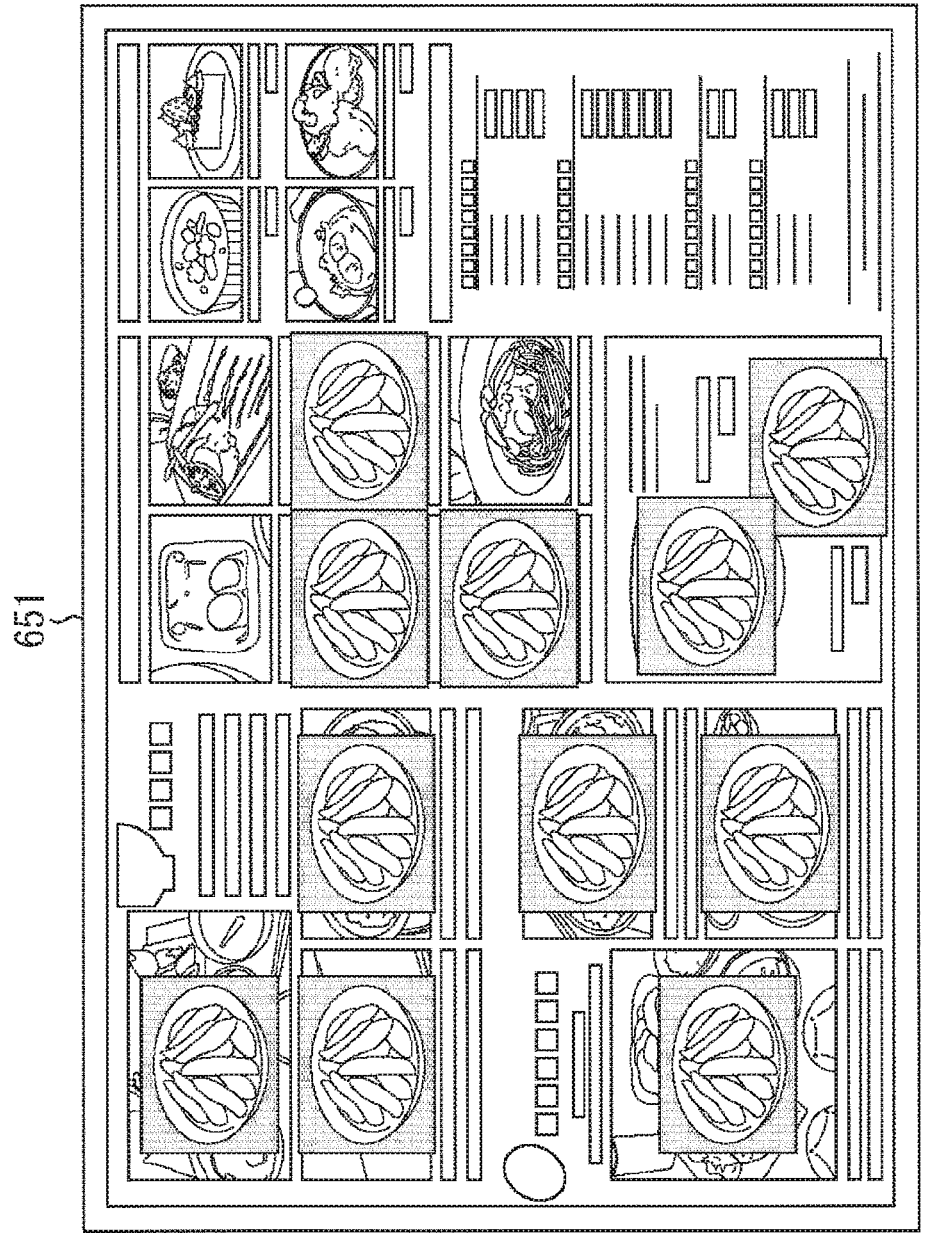
[FIG. 35]

[FIG. 36]
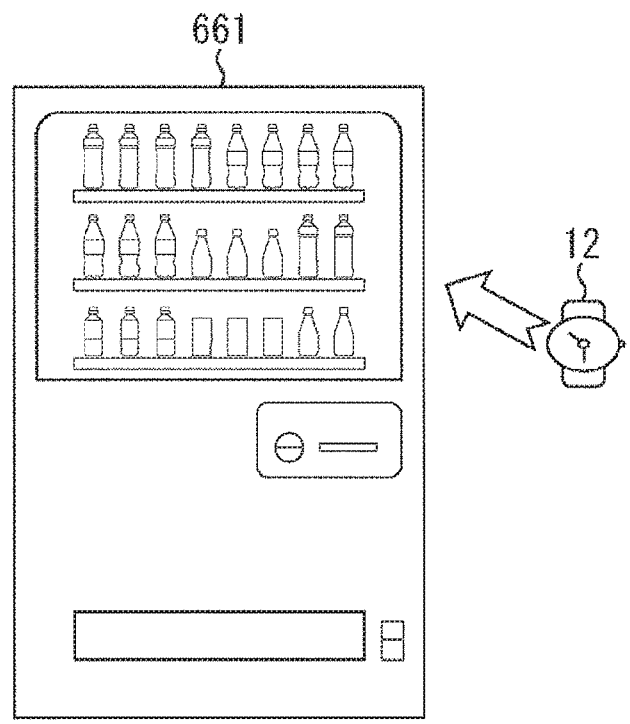

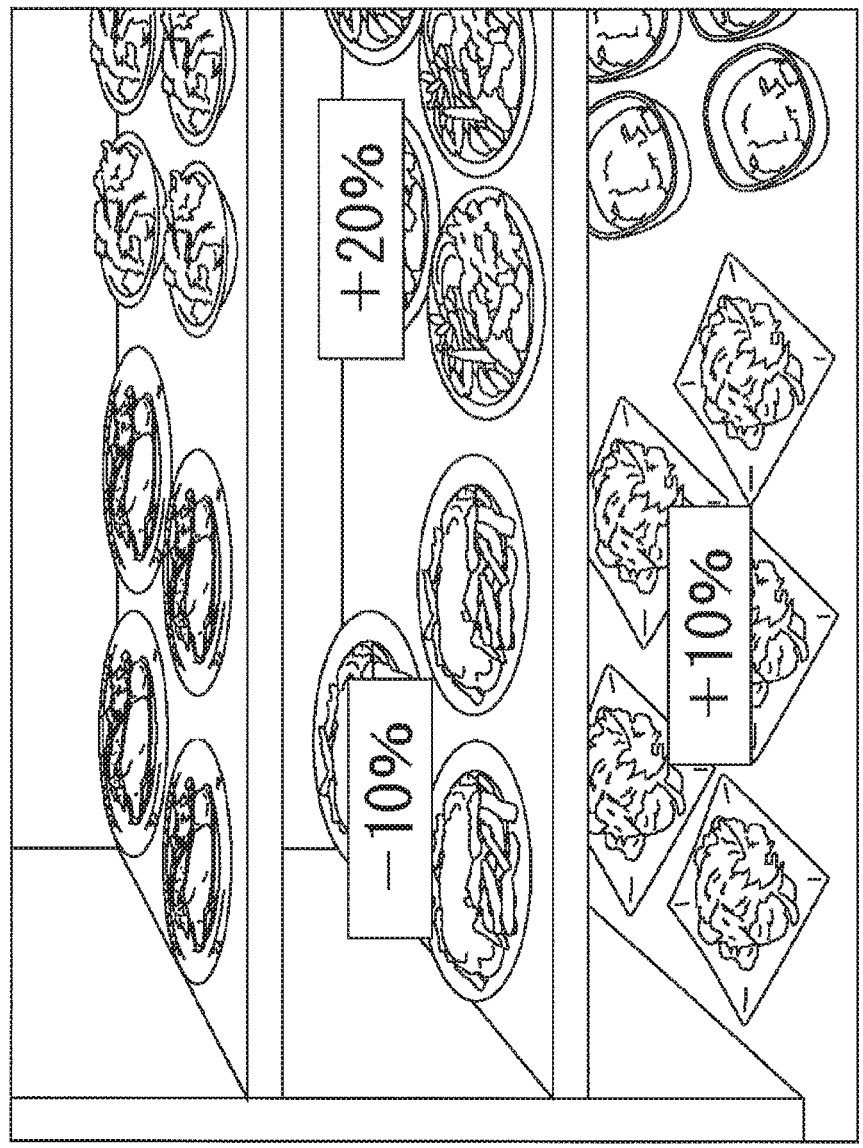
[FIG. 37]

[FIG. 38]
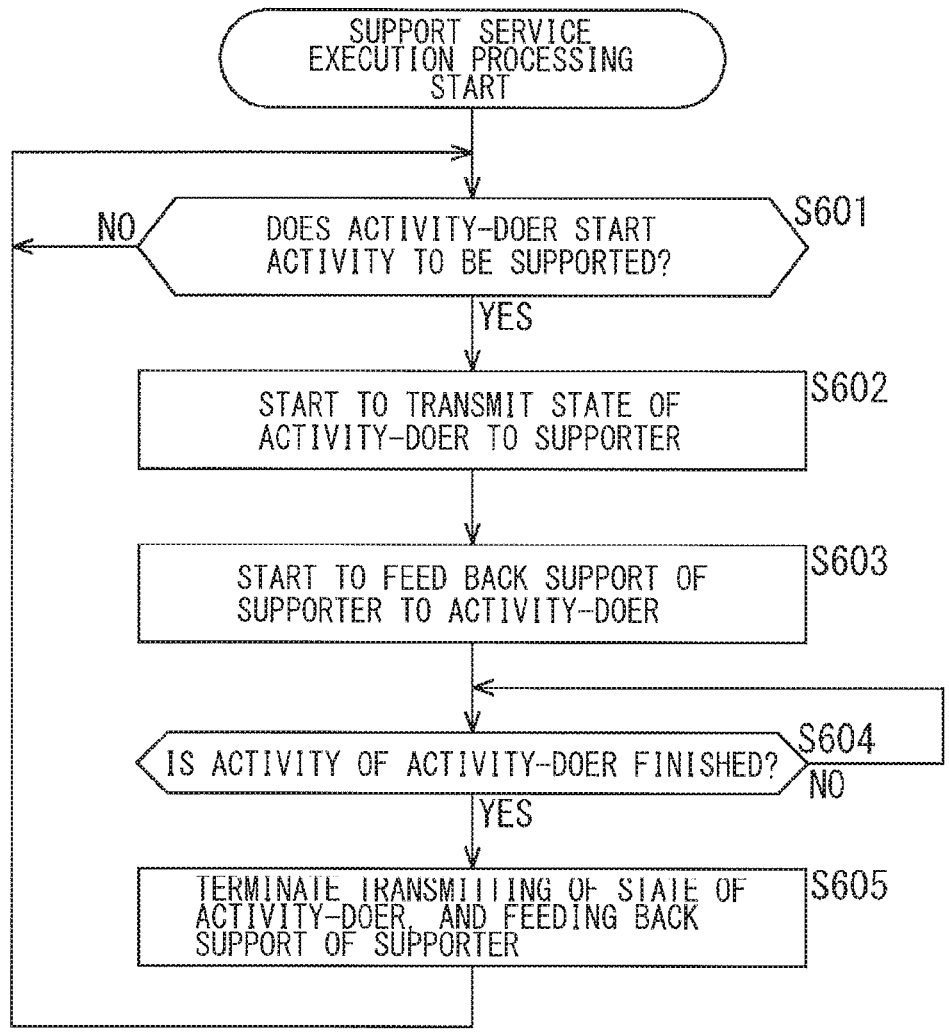

[FIG. 39]
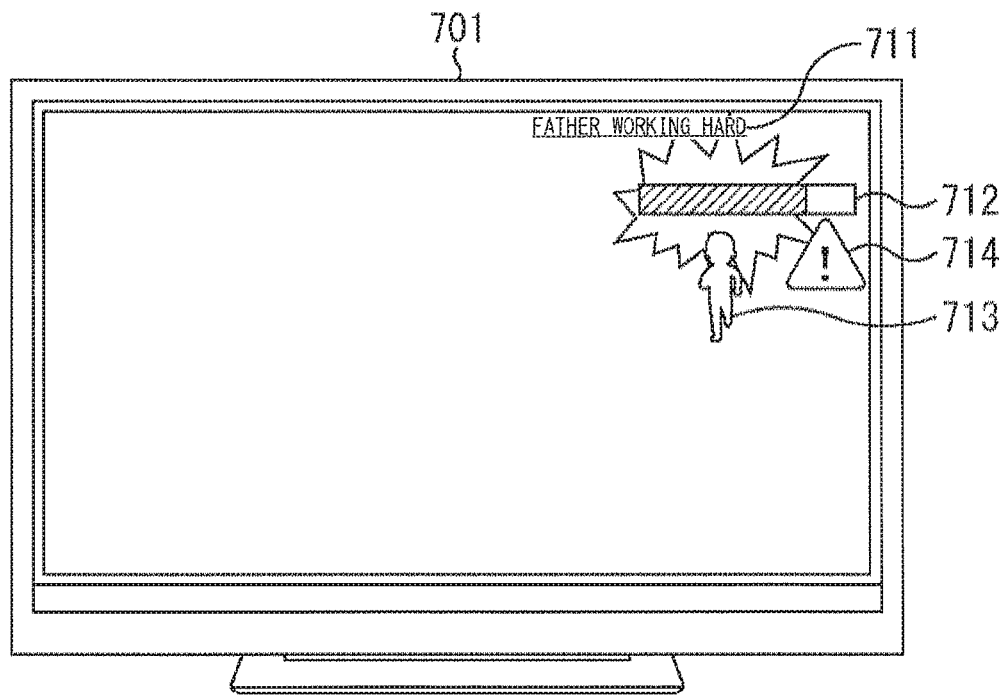

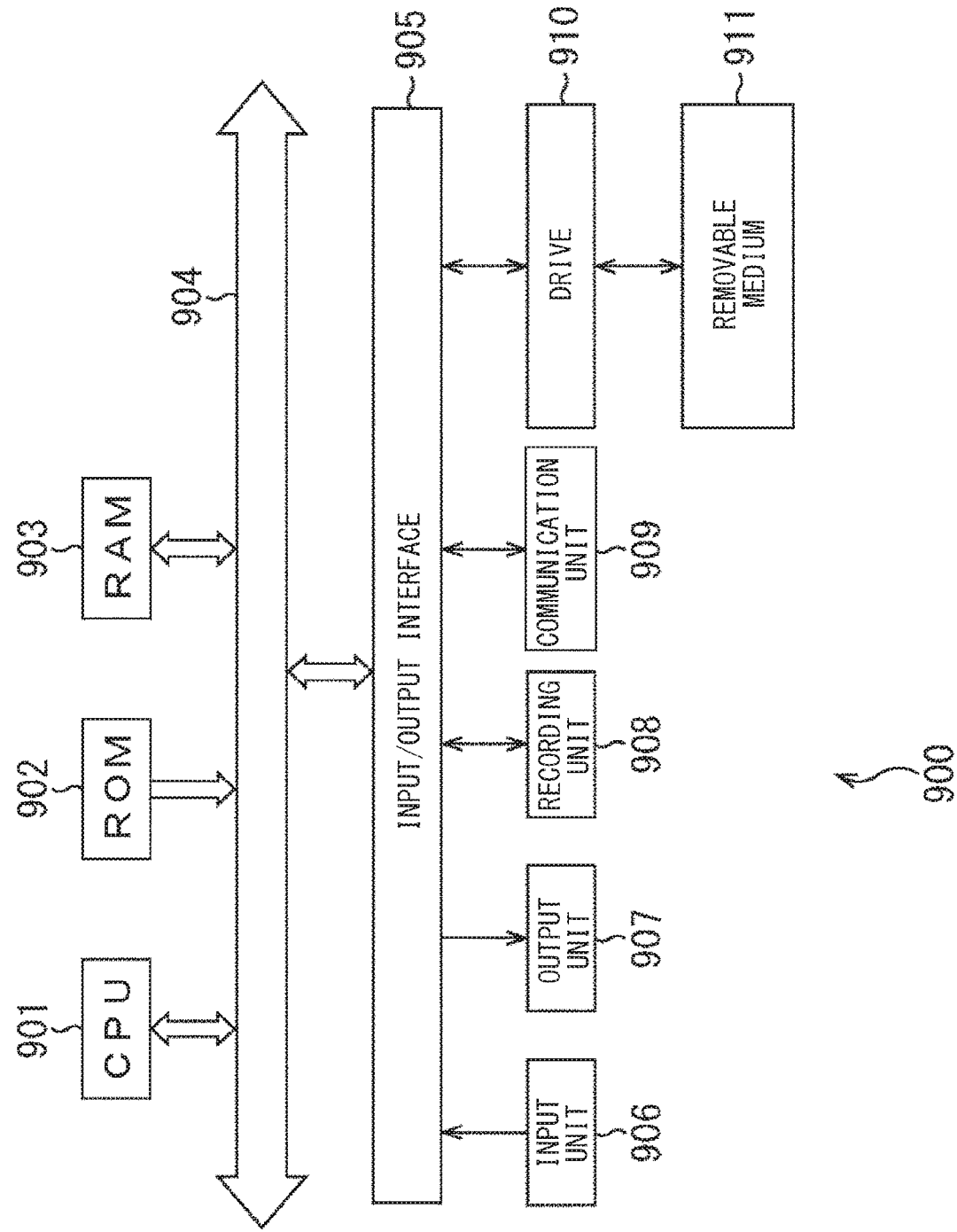

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/023556 filed on Jun. 21, 2018, which claims priority benefit of Japanese Patent Application No. JP 2017-131855 filed in the Japan Patent Office on Jul. 5, 2017. Each of the above-referenced applications is hereby incorporated herein by reference in its entirety.

TECHNICAL COLUMN

The present technology relates to an information processing apparatus, an information processing method, and a program. In particular, the present technology relates to a preferable information processing apparatus, information processing method, and program that are used in a case where a user is encouraged to consume energy.

BACKGROUND ART

Conventionally, devices and services for encouraging exercise for health and diet have gained widespread use. For example, there has been proposed technology of measuring energy consumption for an outbound route, searching for a return route for which energy consumption is higher than for the outbound route, and displaying the return route (see, for example, PTL 1).

CITATION LIST

Patent Literature

PTL 1: Japanese Unexamined Patent Application Publication No. 2013-3048

SUMMARY OF THE INVENTION

Problems to be Solved by the Invention

However, for many users, the effects of such devices and services are temporary. Daily energy consumption often decreases over time.

The present technology has been devised in view of such circumstances, and encourages a user to consume energy.

Means for Solving the Problems

An information processing apparatus according to an aspect of the present technology includes a presentation control unit that controls presentation of energy consumption of a user in a first time period from detection of a first trigger to detection of a second trigger. The first trigger causes energy consumption to be presented. The second trigger causes energy consumption to be presented.

An information processing method according to an aspect of the present technology includes a presentation control step of controlling presentation of energy consumption of a user in a time period from detection of a first trigger to detection of a second trigger. The first trigger causes energy consumption to be presented. The second trigger causes energy consumption to be presented.

A program according to an aspect of the present technology causes a computer to execute processing including a presentation control step of controlling presentation of energy consumption of a user in a time period from detection of a first trigger to detection of a second trigger. The first trigger causes energy consumption to be presented. The second trigger causes energy consumption to be presented.

According to an aspect of the present technology, energy consumption of a user in a time period from detection of a first trigger to detection of a second trigger is presented. The first trigger causes energy consumption to be presented. The second trigger causes energy consumption to be presented.

Effects of the Invention

According to an aspect of the present technology, it is possible to encourage a user to consume energy.

It should be noted that the effects described here are not necessarily limited, but any of the effects described in the present disclosure may also be included.

BRIEF DESCRIPTION OF DRAWING

FIG. 1 is a block diagram illustrating an embodiment of an information processing system to which the present technology is applied.

FIG. 2 is a block diagram illustrating a configuration example of a server of FIG. 1.

FIG. 3 is a block diagram illustrating a configuration example of a client of FIG. 1.

FIG. 4 is a block diagram illustrating a configuration example of an apparatus of FIG. 1.

FIG. 5 is a flowchart for describing EE estimation model learning processing.

FIG. 6 is a graph illustrating an example of a characteristic of oxygen intake during exercise.

FIG. 7 is a flowchart for describing energy consumption presentation processing.

FIG. 8 is a diagram illustrating an example of a trigger that causes energy consumption to be presented.

FIG. 9 is a diagram for describing an example of a method of presenting energy consumption.

FIG. 10 is a flowchart for describing energy consumption analysis processing.

FIGS. 11A and 11B are diagrams illustrating an example of the method of presenting energy consumption.

FIGS. 12A and 12B are diagrams illustrating an example of the method of presenting energy consumption.

FIG. 13 is a diagram illustrating an example of the method of presenting energy consumption.

FIGS. 14A, 14B, and 14C is a are diagrams illustrating an example of the method of presenting energy consumption.

FIG. 15 is a flowchart for describing user guidance processing.

FIG. 16 is a diagram for describing an example of a guidance method of a user.

FIG. 17 is a diagram for describing an example of the guidance method of a user.

FIG. 18 is a diagram illustrating an example of a method of registering a preferred execution method.

FIG. 19 is a flowchart for describing time attack execution processing.

FIGS. 20A, 20B, 20C, and 20D are diagrams illustrating a screen example of a time attack.

FIG. 21 is a diagram illustrating a screen example of a time attack.

FIG. 22 is a diagram illustrating a screen example of a time attack.

FIG. 23 is a flowchart for describing content presentation control processing based on energy consumption.

FIGS. 24A, 24B, and 24C are diagrams illustrating a screen example in a case where content is presented on the basis of energy consumption.

FIGS. 25A and 25B are diagrams illustrating a screen example in a case where content is presented on the basis of energy consumption.

FIG. 26 is a flowchart for describing reward challenge execution processing.

FIGS. 27A, 27B, and 27C are diagrams illustrating a screen example of a reward challenge.

FIGS. 28A and 28B are diagrams illustrating a screen example of a reward challenge.

MODES FOR CARRYING OUT THE INVENTION

The following describes a mode for carrying out the present technology. Description is given in the following order.
1. Embodiment
2. Modification
3. Others 1. Embodiment <1-1. Configuration Example of Information Processing System>

FIG. 1 is a block diagram illustrating an embodiment of an information processing system to which the present technology is applied.

An information processing system 10 is a system that provides various services for encouraging a user to consume energy (consume calories).

The information processing system 10 includes a server 11, clients 12-1 to 12-*m*, and apparatuses 13-1 to 13-*n*. The server 11, the clients 12-1 to 12-*m*, and the apparatuses 13-1 to 13-*n* are coupled to each other via a network 14.

It should be noted that the following refers to the clients 12-1 to 12-*m* simply as client(s) 12 in a case where it is not necessary to distinguish the clients 12-1 to 12-*m* from each other. In addition, the following refers to the apparatuses 13-1 to 13-*n* simply as apparatus(es) 13 in a case where it is not necessary to distinguish the apparatuses 13-1 to 13-*n* from each other.

The server 11 provides various services to a user who uses the information processing system 10 via each client 12 or each apparatus 13. The various services encourage the user to consume energy (calories).

It should be noted that FIG. 1 illustrates the only one server 11, but two or more servers may be provided.

Each client 12 includes, for example, a mobile information terminal such as a wearable device, a smartphone, a tablet, or a mobile phone that a user is able to wear or carry at all times, a personal computer, a game console, a video player, a music player, and the like. In addition, examples of the wearable device include various wearable devices of a glasses type, a wristwatch type, a bracelet type, a necklace type, a neckband type, an earphone type, a headset type, a head mounted type, and the like.

It should be noted that each client 12 may include a plurality of devices. In addition, each client 12 includes at least one mobile information terminal.

Each apparatus 13 includes various apparatuses used by each user. The type of the apparatus 13 is not particularly limited as long as the apparatus 13 is available to a user and a service provided by the server 11 is applicable thereto. It should be noted that a specific example of the apparatus 13 is described below.

Each user then uses various services provided by the information processing system 10 via the client 12 or the apparatus 13.

It should be noted that the following omits the description of the network 14 as appropriate. For example, communication of the server 11 and the client 12 with each other via the network 14 is referred to simply as communication of the server 11 and the client 12 with each other.

<Configuration Example of Server>

FIG. 2 is a block diagram illustrating a configuration example of the server 11. The server 11 includes an analysis unit 51, a learning unit 52, a guidance unit 53, an information processing unit 54, a UI (user interface) control unit 55, a communication unit 56, and a storage unit 57. The analysis unit 51, the learning unit 52, the guidance unit 53, the information processing unit 54, the UI control unit 55, the communication unit 56, and the storage unit 57 are coupled to each other via a bus.

It should be noted that the following omits the description of the bus of the server 11 as appropriate. For example, communication of the analysis unit 51 and the learning unit 52 with each other via the bus is referred to simply as communication of the analysis unit 51 and the learning unit 52 with each other.

The analysis unit 51 analyzes the energy consumption of each user, a preference of each user, and a context such as the condition of each user or the surrounding situation of each user on the basis of data received from each client 12 and each apparatus 13 via the communication unit 56. The analysis unit 51 supplies a result of the analysis to each unit of the server 11, and transmits a result of the analysis to each client 12 and each apparatus 13 via the communication unit 56 as necessary.

The learning unit 52 learns a model for estimating the energy consumption of a user (that is referred to as EE estimation model below), a model for estimating a preference of a user, and the like on the basis of data acquired from each client 12 and each apparatus 13, learning data provided from the outside, and the like via the communication unit 56. The learning unit 52 supplies a result of the learning to each unit of the server 11, and transmits a result of the learning to each client 12 and each apparatus 13 via the communication unit 56 as necessary.

The guidance unit 53 guides a user via the communication unit 56, and each client 12 or each apparatus 13, for example, to encourage the user to consume energy or suppress energy intake.

The information processing unit 54 performs various kinds of information processing. For example, the information processing unit 54 transmits and receives various kinds of data to and from each client 12 and each apparatus 13 via the communication unit 56 to control the execution of various services in each client 12 and each apparatus 13 and execute processing necessary for the execution of a service.

The UI control unit 55 transmits and receives various kinds of data to and from each client 12 and each apparatus 13 via the communication unit 56 to control a user interface (e.g., presentation of various kinds of information) in each client 12 and each apparatus 13.

The communication unit 56 performs communication in accordance with a predetermined communication scheme.

For example, the communication unit 56 communicates with each client 12 and each apparatus 13 via the network 14. It should be noted that it is possible to adopt any wireless or wired communication scheme as the communication scheme of the communication unit 56. In addition, the communication unit 56 is also compatible with a plurality of communication schemes.

The storage unit 57 stores various kinds of data necessary for the processing of the server 11.

<Configuration Example of Client>

FIG. 3 is a block diagram illustrating a configuration example of the client 12. The client 12 includes a data acquisition unit 101, an input unit 102, an EE (Energy Expenditure or energy consumption) estimation unit 103, an information processing unit 104, a presentation control unit 105, a recording control unit 106, an output unit 107, a communication unit 108, and a storage unit 109. The data acquisition unit 101, the input unit 102, the EE estimation unit 103, the information processing unit 104, the presentation control unit 105, the recording control unit 106, the output unit 107, the communication unit 108, and the storage unit 109 are coupled to each other via a bus.

It should be noted that the following omits the description of the bus of the client 12 as appropriate. For example, communication of the EE estimation unit 103 and the information processing unit 104 with each other via the bus is referred to simply as communication of the EE estimation unit 103 and the information processing unit 104 with each other.

The data acquisition unit 101 includes, for example, various sensors that acquire data regarding a user and the surroundings of the user. For example, the data acquisition unit 101 includes one or more of an image sensor, an acceleration sensor, a gyro sensor, a heartbeat sensor, a breath sensor, a perspiration sensor, a sole sensor, or the like. The data acquisition unit 101 supplies the acquired data to each unit of the client 12 or transmits the acquired data to the server 11, the other client 12, and each apparatus 13 via the communication unit 108 as necessary.

The input unit 102 includes various input devices for inputting data to the client 12. For example, the input unit 102 includes one or more of input devices such as a button, a switch, a keyboard, a touch panel, a mouse, and a microphone. The input unit 102 supplies the acquired data to each unit of the client 12 or transmits the acquired data to the server 11, the other client 12, and each apparatus 13 via the communication unit 108 as necessary.

The EE estimation unit 103 uses an EE estimation model supplied from the server 11 to estimate the energy consumption of a user on the basis of data acquired by the data acquisition unit 101. The EE estimation unit 103 supplies a result of the estimation of the energy consumption of a user to each unit of the client 12, and transmits a result of the estimation to the server 11 and each apparatus 13 via the communication unit 108 as necessary.

The information processing unit 104 performs various kinds of information processing. For example, the information processing unit 104 executes predetermined application software, thereby executing processing necessary for various services provided by the server 11.

The presentation control unit 105 controls the output of various kinds of data by the output unit 107, and controls the presentation of various kinds of information to a user.

The recording control unit 106 controls the recording of data in the client 12 or the server 11. For example, the recording control unit 106 controls the recording of a log indicating a result of the estimation of the energy consumption of a user.

The output unit 107 includes various output devices that output various kinds of data as images, sound, light, vibration, and the like. For example, the output unit 107 includes one or more of output devices such as a display, a speaker, a lamp, and a vibrator.

The communication unit 108 performs communication in accordance with a predetermined communication scheme. For example, the communication unit 108 communicates with the server 11, the other client 12, and each apparatus 13 via the network 14. It should be noted that it is possible to adopt any wireless or wired communication scheme as the communication scheme of the communication unit 108. In addition, the communication unit 108 is also compatible with a plurality of communication schemes.

The storage unit 109 stores various kinds of data necessary for the processing of the client 12.

It should be noted that not all the clients 12 necessarily have to include the components illustrated in FIG. 3, but may include only a portion thereof. In addition, as described above, the client 12 may include a plurality of devices.

<Configuration Example of Apparatus>

FIG. 4 is a block diagram illustrating a configuration example of the apparatus 13. The apparatus 13 includes a data acquisition unit 151, an input unit 152, a drive control unit 153, a presentation control unit 154, a driving unit 155, an output unit 156, a communication unit 157, and a storage unit 158. The data acquisition unit 151, the input unit 152, the drive control unit 153, the presentation control unit 154, the driving unit 155, the output unit 156, the communication unit 157, and the storage unit 158 are coupled to each other via a bus.

It should be noted that the following omits the description of the bus of the apparatus 13 as appropriate. For example, communication of the drive control unit 153 and the driving unit 155 with each other via the bus is referred to simply as communication of the drive control unit 153 and the driving unit 155 with each other.

The data acquisition unit 151 includes, for example, various sensors that acquire data regarding a user and the surroundings of the user. The data acquisition unit 151 supplies the acquired data to each unit of the apparatus 13 or transmits the acquired data to the server 11, each client 12, and the other apparatus 13 via the communication unit 157 as necessary.

The input unit 152 includes various input devices for inputting data to the apparatus 13. For example, the input unit 152 includes one or more of input devices such as a button, a switch, a keyboard, a touch panel, a mouse, and a microphone. The input unit 152 supplies the acquired data to each unit of the apparatus 13 or transmits the acquired data to the server 11, each client 12, and the other apparatus 13 via the communication unit 157 as necessary.

The drive control unit 153 controls the driving unit 155.

The presentation control unit 154 controls the output of various kinds of data by the output unit 156, and controls the presentation of various kinds of information to a user.

The driving unit 155 includes, for example, an actuator and the like, and drives a movable unit of the apparatus 13.

The output unit 156 includes various output devices that output various kinds of data as images, sound, light, vibration, and the like. For example, the output unit 156 includes one or more of output devices such as a display, a speaker, a lamp, and a vibrator.

The communication unit 157 performs communication in accordance with a predetermined communication scheme. For example, the communication unit 157 communicates with the server 11, each client 12, and the other apparatus 13 via the network 14. It should be noted that it is possible to adopt any wireless or wired communication scheme as the communication scheme of the communication unit 157. In addition, the communication unit 157 is also compatible with a plurality of communication schemes.

The storage unit 158 stores various kinds of data necessary for the processing of the apparatus 13.

It should be noted that not all the apparatuses 13 necessarily have to include the components illustrated in FIG. 4, but may include only a portion thereof.

<EE Estimation Model Learning Processing>

Next, EE (energy consumption) estimation model learning processing executed by the server 11 is described with reference to the flowchart of FIG. 5.

In step S1, the learning unit 52 acquires learning data. For example, the learning unit 52 acquires learning data including, in input data, at least one of data (that is referred to as condition data below) including at least one of the acceleration, heartbeat, body temperature, degree of perspiration, or the like of a plurality of users doing various activities, physical characteristics (e.g., height, weight, BMI (Body Mass Index), chest circumference, and the like) of each user, or attributes (e.g., age, sex, and the like) of each user, and using energy consumption per unit time (e.g., one minute) as a label.

It should be noted that the following refers to the energy consumption per unit time as unit time energy consumption. However, in a case where it is not necessary to determine whether or not energy consumption is energy consumption per unit time, it is sometimes referred to simply as energy consumption.

Unit time energy consumption EE is obtained, for example, in accordance with the Weir formula of the following expression (1).

$$EE \text{ (kcal/min)}=3.941 \times VO2 \text{ (l/min)}+1.106 \times VCO2 \text{ (l/min)} \quad (1)$$

Here, VO2 represents oxygen intake, and VCO2 represents a carbon dioxide emission amount, which are measured, for example, in the breath-by-breath method or the mixing chamber method.

In step S2, the learning unit 52 learns the EE estimation model. The method of learning the EE estimation model is not particularly limited, but, for example, DNN (deep learning) is used. It is also possible to use semi-teacher learning or the like that uses unlabeled data for recognition, for example. An EE estimation model is then generated including a time series model in which at least one of the condition data, the physical characteristics of a user, or the attributes of a user is used as input. This makes it possible to estimate energy consumption with high accuracy and low delay, and allows a user to accurately know energy consumption in any short section.

In addition, the EE estimation model allows energy consumption to be estimated without recognizing the type of an activity of a user, offering versatility. In other words, the EE estimation model allows the energy consumptions during various activities to be estimated that do not fall within existing types. For example, the EE estimation model allows the energy consumption during a daily activity to be estimated such as cleaning or going up and down stairs in addition to various sports.

It should be noted that the EE estimation model is learned at this time by taking into consideration the characteristics of oxygen intake during exercise illustrated in FIG. 6. The horizontal axis of FIG. 6 represents time, and the vertical axis represents oxygen intake (energy metabolic rate). This allows transient characteristics such as an oxygen deficit at the start of exercise and an oxygen debt after the end of exercise are to be taken into consideration. This increases the accuracy of estimating energy consumption especially at the start of exercise and after the end of exercise.

Afterwards, the EE estimation model learning processing is terminated.

It should be noted that the generated EE estimation model is provided, for example, from the server 11 to each client 12.

<Energy Consumption Presentation Processing>

Next, energy consumption presentation processing executed by each client 12 is described with reference to the flowchart of FIG. 7.

In step S101, the EE estimation unit 103 starts to estimate energy consumption. For example, the EE estimation unit 103 starts to acquire the condition data from the data acquisition unit 101. In addition, the EE estimation unit 103 acquires the attributes of a user from the storage unit 109. The attributes of a user are stored in advance. Using the EE estimation model generated by the server 11 in the processing of FIG. 5, the EE estimation unit 103 then starts processing of estimating the unit time energy consumption (e.g., in units of kcal/min) of a user at predetermined intervals (that are referred to as sampling intervals below) on the basis of at least one of the condition data, the physical characteristics of the user, or the attributes of the user. In addition, the recording control unit 106 starts processing of recording the estimated value of the unit time energy consumption in the storage unit 109 together with the time of the estimation.

In step S102, the presentation control unit 105 determines whether or not to present the energy consumption. For example, in a case where the presentation control unit 105 detects a trigger (that is referred to as presentation trigger below) that causes the energy consumption to be presented, on the basis of data from the data acquisition unit 151 or the input unit 152, the presentation control unit 105 determines that the energy consumption is presented, and the processing proceeds to step S103.

Here, it is possible to set any presentation trigger.

For example, a predetermined action of a user is used as a presentation trigger. Specifically, for example, a predetermined operation on the input unit 152 is used as a presentation trigger. For example, in a case where the client 12 includes a wristwatch type wearable device 201 as illustrated in FIG. 8, an action of swinging up the arm wearing the wearable device 201 is used as a presentation trigger. For example, in a case where the client 12 includes a glasses type or head mounted type wearable device, a user's action of pointing the line of sight in a predetermined direction is used as a presentation trigger. For example, the input of a predetermined voice command is used as a presentation trigger.

In addition, a trigger made by what is other than an action of a user may be set as a presentation trigger. For example, detecting by a perspiration sensor that the amount of perspiration of a user exceeds a threshold, or detecting by a breath sensor or a microphone that a user is panting may be set as a presentation trigger.

In step S103, the client 12 presents energy consumption. Specifically, the EE estimation unit 103 acquires, from the storage unit 109, the estimated values of the unit time energy consumptions in a period (that is referred to as presentation target period below) from the last presentation of energy consumption (or from the start of the estimation of energy consumption in a case where no energy consumption has been presented) to the current time. Then, the EE estimation unit 103 calculates the total energy consumption value (that is referred to as integrated energy consumption below) in the presentation target period by integrating the values obtained by multiplying the estimated values of the respective acquired unit time energy consumptions by the sampling intervals. The output unit 107 presents the integrated energy consumption to a user under the control of the presentation control unit 105.

It should be noted that a specific example of the method of presenting energy consumption is described below.

In step S104, the presentation control unit 105 determines whether or not to cancel the presentation of energy consumption. Specifically, in a case where the presentation control unit 105 does not detect a trigger (that is referred to as cancel trigger below) that causes the presentation of energy consumption to be cancelled after presenting energy consumption, the presentation control unit 105 determines that the presentation of energy consumption is not cancelled, and the processing proceeds to step S105.

In step S105, the recording control unit 106 transmits a presentation log to the server 11 via the communication unit 108. The presentation log includes integrated energy consumption presented to a user and the date and time of the presentation. In addition, for example, the presentation log may include the estimated values of the unit time energy consumptions in the presentation target period and the date and time of the estimation.

In addition, the recording control unit 106 transmits data (that is referred to as context data below) regarding contexts in the presentation target period to the server 11 together.

Here, the contexts include one or more factors that influences the energy consumption of a user, and includes, for example, the condition of the user or the surrounding situation in the presentation target period. For example, the contexts include one or more of the type of an activity, the place of an activity, climate, clothing, shoes worn, a person accompanying a user, and the like. The context data is data used to analyze those contexts, and is, for example, acquired by the data acquisition unit 101 or inputted via the input unit 102.

In step S106, the recording control unit 106 records a presentation log. Specifically, the recording control unit 106 causes the storage unit 109 to record the presentation log including the integrated energy consumption presented to a user. It should be noted that the presentation log includes, for example, the presence or absence of registration to a bookmark, a memo, a voice memo, and the like in addition to the presented integrated energy consumption and the date and time of the presentation. The bookmark, the memo, and the voice memo are described below. In addition, for example, a result of the analysis of the contexts within the presentation target period is received from the server 11, and the received result of the analysis of the contexts is included in the presentation log.

Afterwards, the processing proceeds to step S108.

In contrast, in a case where the recording control unit 106 detects, in step S104, a cancel trigger after presenting energy consumption on the basis of data from the data acquisition unit 151 or the input unit 152, the recording control unit 106 determines that the presentation of the energy consumption is cancelled, and the processing proceeds to step S107.

Here, it is possible to set any cancel trigger similarly to the presentation trigger.

For example, a user's action different from the presentation trigger is used as a cancel trigger. Specifically, for example, a predetermined operation on the input unit 152 that differs from the presentation trigger is used as a cancel trigger. For example, a user's action of shaking the head or breathing on the client 12 is used as a cancel trigger. For example, the input of a voice command different from the presentation trigger is used as a cancel trigger.

It should be noted that, for example, the period in which a cancel trigger is detected may be limited to a predetermined period after energy consumption is presented.

In step S107, the recording control unit 106 discards the presentation log. In other words, the recording control unit 106 discards the presentation log including integrated energy consumption presented to a user without recording the presentation log.

Afterwards, the processing proceeds to step S108.

In contrast, for example, in a case where the presentation control unit 105 does not detect, in step S102, a presentation trigger, the presentation control unit 105 determines that the energy consumption is not presented, skips the processing of steps S103 to S107, and processing proceeds to step S108.

In step S108, the presentation control unit 105 determines whether or not to present a result of the analysis of energy consumption. For example, in a case where the presentation control unit 105 detects a trigger that causes a result of the analysis of energy consumption to be presented, on the basis of data from the data acquisition unit 151 or the input unit 152, the presentation control unit 105 determines that the result of the analysis of energy consumption is presented, and the processing proceeds to step S109.

It should be noted that it is possible to set any trigger that causes a result of the analysis of energy consumption to be presented similarly to a trigger (presentation trigger) that causes energy consumption to be presented.

In step S109, the presentation control unit 105 request the analysis of energy consumption. Specifically, the presentation control unit 105 generates an energy consumption analysis request command for requesting energy consumption to be analyzed, and transmits the energy consumption analysis request command to the server 11 via the communication unit 108.

The energy consumption analysis request command includes an analysis condition used to analyze energy consumption. For example, in a case where energy consumptions are compared, the analysis condition includes a condition (that is referred to as comparison condition below) used for the comparison and a condition (that is referred to as common condition) that is common, but different from the comparison condition. The comparison condition and the common condition each include one or more factors that influence the energy consumption of a user.

The server 11 receives the energy consumption analysis request command in step S133 of FIG. 10 described below, and transmits UI control information used to present a result of the analysis of energy consumption to the client 12 in step S135.

In step S110, the presentation control unit 105 receives a result of the analysis of energy consumption. In other words, the presentation control unit 105 receives the UI control information used to present a result of the analysis of energy consumption from the server 11 via the communication unit 108.

In step S111, the output unit 107 presents a result of the analysis of the energy consumption on the basis of the UI control information under the control of the presentation control unit 105.

It should be noted that a specific example of the method of presenting a result of the analysis of energy consumption is described below.

Afterwards, the processing returns to step S102, and the processing of step S102 and subsequent steps is executed.

In this manner, a user is able to know accurate energy consumption substantially in real time. Thus, for example, the user confirms the energy consumption while subtly changing the activity of the user, and then is able to verify the effects substantially in real time while experiencing the change in the activity.

For example, while running up the stairs or going up the stairs two at a time, a user confirms the energy consumption each time as illustrated in FIG. 8. This allows the user to actively discover and learn the way of going up stairs that is effective for dieting, the way of going up stairs with favorable energy efficiency, and the like.

In addition, for example, a user confirms the energy consumption while gradually changing the way of walking such as walking fast and walking with wide steps. This allows the user to actively discover and learn the way of walking that is effective for dieting, the way of walking with favorable energy efficiency, and the like.

In this manner, a user is able to search for various activities while enjoying an execution method suited to the purpose of the user. In addition, a user is able to confirm the actual energy consumption, and it is thus possible to more reliably find an execution method suited to the purpose of the user. Then, a user is able to encourage energy to be consumed in the process of searching for an execution method suited to the purpose of the user or by doing an activity in an execution direction suited to the purpose of the user.

In addition, for example, a user is able to easily adjust the presentation target period as illustrated in FIG. 9 by canceling the presentation of energy consumption as described above.

The horizontal axis of the graph of FIG. 9 represents time, and the vertical axis represents an integrated value (in units of kcal) of energy consumption. It should be noted that this diagram illustrates an example in which an integrated value of energy consumption is linearly changed to make the description easier to understand.

For example, in a case where a presentation trigger is detected at time t1 after the estimation of energy consumption is started at time t0, the period from the time t0 to the time t1 is set as a presentation target period, and the integrated energy consumption in the presentation target period is presented.

Next, in a case where a presentation trigger is detected at time t2, the period from the time t1 at which energy consumption was presented the last time to the time t2 is set as a presentation target period, and the integrated energy consumption in the presentation target period is presented.

Afterwards, in a case where a presentation trigger is detected at time t4 after a cancel trigger is detected at time t3, not the period from the time t2 to the time t4, but the period from the time t1 to the time t4 is set as a presentation target period, and the integrated energy consumption in the presentation target period is presented. In other words, a user is able to change the presentation target period by having the integrated energy consumption once presented, and then canceling the presentation.

Then, in a case where a presentation trigger is detected at time t5, the period from the time t4 to the time t5 is set as a presentation target period, and the integrated energy consumption in the presentation target period is presented.

It should be noted that, for example, in a case where a predetermined condition is satisfied, the energy consumption may be automatically displayed regardless of an action of a user in step S102 of FIG. 7.

For example, in a case where a context satisfies a predetermined condition, energy consumption may be automatically presented. This context may include, for example, time, the place of a user, the type of an activity of a user, the clothing of a user, the shoes worn by a user, a person accompanying a user, or the like.

This allows a user to easily confirm energy consumption in a case where the context satisfies a predetermined condition. In addition, a user is able to easily and accurately compare the past energy consumption of the user and the current energy consumption of the user by constantly observing energy consumptions in the same context.

For example, in a case where a user does the same activity almost every day, it is possible to easily and accurately compare the past and current energy consumptions during the activity. Specifically, for example, it is possible to easily and accurately compare a user's past and current energy consumptions while commuting to work or going to school. For example, in a case where a user performs the same exercise (e.g., jogging or the like) almost every day, it is possible to easily and accurately compare the past and current energy consumptions during the exercise.

In addition, for example, in a case where a user passes by the same place almost every day, it is possible to easily and accurately compare the past and current energy consumptions in the place. Specifically, for example, it is possible to easily and accurately compare the past and current energy consumptions of a user in the walking section from the nearest station to the house on the way home. In addition, it is possible to easily and accurately compare the past and current energy consumptions, for example, for specific stairs of a company, a school, or the like.

Further, for example, it is possible to easily and accurately compare the past and current energy consumptions during an activity irregularly done by a user on a weekend or the like. Specifically, for example, in a case where a user climbs a mountain, it is possible to easily and accurately compare the energy consumptions for the respective mountains climbed by the user.

In addition, for example, a context (e.g., time, place, activity, and the like) in which a user frequently confirms energy consumption may be learned, and in a case where a context similar to that context is detected, energy consumption may be automatically presented.

Further, not only energy consumption is automatically presented, but information or advice for an activity of a user may also be presented together such as "energy consumption efficiency is decreasing."

<Energy Consumption Analysis Processing>

Next, with reference to the flowchart of FIG. 10, the energy consumption analysis processing executed by the server 11 in response to the energy consumption presentation processing by the client 12 of FIG. 7 is described.

In step S131, the analysis unit 51 determines whether or not a presentation log of energy consumption is received. In a case where the analysis unit 51 determines in step S105 of FIG. 7 that the presentation log transmitted from the client 12 is received via the communication unit 56, the processing proceeds to step S132.

In step S132, the analysis unit 51 analyzes a context. Specifically, the analysis unit 51 analyzes a context of the presentation target period corresponding to the presentation log on the basis of the context data transmitted from the client 12 together with the presentation log. The analysis unit 51 adds a result of the analysis of a context to the presentation log, and causes the storage unit 57 to record the presentation log including the result of the analysis of a context.

It should be noted that it is possible to use any method to analyze a context. For example, proximity determination technology using BT (Bluetooth (registered trademark))/ BLE (Bluetooth (registered trademark) Low Energy) is used to recognize a person accompanying a user. In addition, for example, image recognition or the like is used to recognize the clothing and shoes of a user. In this case, for example, an image of the user immediately before leaving the house or immediately after returning home is used. Alternatively, an IC tag may be installed on clothing or shoes, and the clothing or the shoes may be recognized on the basis of information acquired from the IC tag.

Afterwards, the processing proceeds to step S133.

In contrast, in a case where it is determined in step S131 that the presentation log of energy consumption is not received, the processing of step S132 is skipped, and the processing proceeds to step S133.

In step S133, the analysis unit 51 determines whether or not the analysis of energy consumption is requested. In a case where the analysis unit 51 receives the energy consumption analysis request command transmitted from the client 12 via the communication unit 56 in step S109 of FIG. 7, it is determined that the analysis of energy consumption is requested, and the processing proceeds to step S134.

In step S134, the analysis unit 51 analyzes energy consumption. The method of analyzing energy consumption is not particularly limited, but, for example, the following analysis processing is performed.

For example, the analysis unit 51 extracts presentation logs satisfying a common condition from presentation logs of a user whose energy consumption is to be analyzed. The analysis unit 51 then compares the energy consumptions indicated in the extracted presentation logs on the basis of a comparison condition.

For example, in a case where the shoes worn by a user are set as a comparison condition and the type and place of an activity of the user are set as common conditions, a presentation log when the user does a predetermined activity in a predetermined place is first extracted. Then, the energy consumptions indicated in the extracted presentation logs are compared on the basis of the shoes worn by the user in the presentation target periods corresponding to the respective presentation logs.

In step S135, the server 11 controls the presentation of a result of the analysis of energy consumption. Specifically, the UI control unit 55 generates UI control information including the result of analysis of energy consumption, and used for presenting the result of the analysis in the client 12 of a user. The UI control unit 55 then transmits the UI control information to the client 12 via the communication unit 56, thereby controlling the presentation of the result of the analysis of energy consumption in the client 12.

Afterwards, the processing returns to step S131, and the processing of step S131 and subsequent steps is executed.

In contrast, in a case where the analysis unit 51 does not receive the energy consumption analysis request command from the client 12 in step S133, it is determined that the analysis of energy consumption is not requested, and the processing returns to step S131.

Afterwards, the processing of step S131 and subsequent steps is executed.

Here, with reference to FIGS. 11A, 11B, 12A, 12B, 13, 14A, 14B, and 14C, a specific example of the method of presenting energy consumption in the client 12 is described.

FIGS. 11A, 11B, 12A, 12B, and 13 each illustrate a specific example of the method of presenting energy consumption in a case where the client 12 includes a smartphone 251.

FIGS. 11A and 11B illustrate an example in a case where energy consumptions are presented in chronological order.

For example, in step S103 of the energy consumption presentation processing of FIG. 7 described above, the screen FIG. 11A is first displayed. In this example, a title column 261, a menu column 262, an information presentation column 263, and an operation unit 264 are displayed on a display 251A of the smartphone 251 in order from the top.

In the title column 261, the summary or the like of the logs of energy consumptions displayed in the information presentation column 263 is displayed. In this example, the fact that the log of energy consumption based on the most recent presentation log of a user is displayed is displayed.

In the menu column 262, icons 271 to 274 for selecting conditions for displaying logs of energy consumptions in the information presentation column 263 are displayed.

For example, when the icon 271 is tapped, logs of energy consumptions are displayed in chronological order. When the icon 272 is tapped, a result obtained by analyzing energy consumption on the basis of the type of shoes worn by a user is displayed. When the icon 273 is tapped, a result obtained by analyzing energy consumption on the basis of the type of an activity of a user is displayed. When the icon 274 is tapped, a result obtained by analyzing energy consumption on the basis of the place of an activity of a user is displayed.

A window 275 for displaying logs of energy consumptions is displayed in the information presentation column 263. In this example, the logs of the integrated energy consumptions of a user on a day designated by the user are displayed in chronological order. Specifically, on the left portion of the window 275, the time at which the integrated energy consumptions are presented is displayed, and on the right side thereof, the integrated energy consumptions are displayed as bar graphs.

When the bar graph of each log is tapped, for example, the detailed information of the log or a menu 276 is displayed.

In the menu 276, the integrated energy consumption of a log selected by a user is displayed as a specific numerical value. In addition, icons 277 to 279 are displayed in the menu 276.

The icon 277 is used, for example, for registering a target log in a bookmark or deleting a target log from the bookmark. For example, when the icon 277 is tapped in a case where the target log is not registered in the bookmark, the log is registered in the bookmark, and the star in the icon 277 becomes black. In contrast, when the icon 277 is tapped in a case where the target log is registered in the bookmark, the log is deleted from the bookmark, and the star in the icon 277 becomes white.

The icon 278 is used, for example, for registering or editing a memo for a target log. For example, when the icon 278 is tapped, a memo screen for registering or editing a memo for a target log is displayed. Then, a user is able to register or edit a text memo for the target data in the memo screen and record the text memo.

The icon 279 is used, for example, for registering a voice memo for a target log. For example, when the icon 279 is tapped, a voice memo screen for registering a voice memo for a target log is displayed. Then, a user is able to input a voice memo for the target data in the voice memo screen and record the voice memo.

It should be noted that a memo and a voice memo may be recorded during an activity or may be recorded after an activity. In a case where a memo or a voice memo is recorded after an activity, for example, a log (presentation log) that causes the memo or the voice memo to be recorded is registered in the bookmark, the log registered in the bookmark is read after the activity, and the memo or the voice memo is recorded in the read log.

It should be noted that the contents of the recordable memo or voice memo are not particularly limited. For example, advice (e.g., "when going up stairs, you should pay attention to the calves and go up the stairs three at a time" or the like) for an activity of a user is recorded as a voice memo. This advice may be inputted by the user himself or herself, or may be inputted by a trainer or the like other than the user, for example. Alternatively, for example, audio data available on a website or the like may be inputted.

In addition, a voice memo may be automatically reproduced when a context is similar to the context of the presentation target period corresponding to a log in which the voice memo is registered. For example, a voice memo may be automatically reproduced when a user does the same activity in the same place as the place in which a log in which the voice memo is registered is recorded. It should be noted that all the contexts do not necessarily have to match each other, but reproduction may be performed in a case where a portion of the contexts match each other.

Further, it is also possible to share a memo and a voice memo between a plurality of users (e.g., family members and friends).

In addition, within a predetermined time range (e.g., day designated by a user), a log (e.g., log at 15:25) with the highest integrated energy consumption is displayed separately from the other logs. For example, as the color of the bar graph, a color different from the colors of the bar graphs of the other logs is set. Further, for example, an icon 280 of a question mark for encouraging a user to register the log in the bookmark is displayed.

In addition, the inside of the window 275 is flicked or swiped in the vertical direction, thereby changing the time slot of the logs displayed in the window 275.

Further, above the window 275, the date on which the logs displayed in the window 275 are recorded is displayed. Below the window 275, the average value of the integrated energy consumptions of a user on the date displayed above the window 275 is displayed.

A button or the like for operating the smartphone 251 is displayed on the operation unit 264.

Here, for example, when pinching in is performed in the window 275 of the screen of FIG. 11A, the screen illustrated as FIG. 11B is displayed on the display 251A of the smartphone 251.

Specifically, in the window 275 of the screen of FIG. 11B, for example, a log close to the date and time when a log displayed in the window 275 of FIG. 11A is recorded is extracted and displayed from among the logs registered in the bookmark and the logs in which memos or voice memos are registered. This allows a user to easily confirm a log registered in the bookmark and a log in which a memo or a voice memo is registered.

In addition, for example, when pinching out is performed in the window 275 of the screen of FIG. 11B, the screen illustrated as FIG. 11A is displayed on the display 251A of the smartphone 251.

FIGS. 12A and 12B illustrate an example of a screen displaying a result obtained by analyzing the energy consumption of a user on the basis of a designated condition. Specifically, an example is illustrated in which logs satisfying predetermined common conditions other than the shoes worn by a user are compared and displayed on the basis of the shoes worn by the user. As described above, it is possible to set any common condition. For example, the type of an activity, the place of an activity, the clothing at the time of an activity, and the like are set as common conditions.

For example, in the window 275 of the screen of FIG. 12A, logs having the same common conditions other than shoes are arranged and displayed from the top in descending order of unit time energy consumption. Specifically, at the left end of the window 275, a thumbnail corresponding to a log and indicating the type of shoes worn by a user in a presentation target period is displayed. In addition, on the right side thereof, the unit time energy consumption in each log is displayed as a bar graph.

In addition, similarly to the example of FIG. 11A, when the bar graph of each log is tapped, the detailed information of the log or the menu 276 is displayed.

Further, for example, the bar graph of a log set to be compared with the log (the uppermost log in the window 275) with the highest unit time energy consumption is set in a color different from the colors of the bar graphs of the other logs. For example, in the example of FIG. 12A, an example is illustrated in which the fourth log from the top is set as a log to be compared. In addition, below the window 275, the unit time energy consumption difference between the log with the highest unit time energy consumption and a log set to be compared therewith is displayed.

Here, for example, when pinching in is performed in the window 275 of the screen of FIG. 12A, the screen illustrated as FIG. 12B is displayed on the display 251A of the smartphone 251.

Specifically, in the window 275 of the screen of FIG. 12B, the average values of the unit time energy consumptions for the respective shoes in the logs satisfying the common conditions are displayed. For example, thumbnails representing respective shoes are displayed at the left end of the window 275 in descending order of the average values of unit time energy consumptions. In addition, the average values of the unit time energy consumptions while wearing the respective shoes are displayed on the right side thereof.

It should be noted that, for example, for shoes having a smaller amount of data less than a predetermined threshold, the average value of unit time energy consumptions is not displayed. For example, in the example of FIG. 12B, the log for the third shoes from the top is insufficient, and an icon 291 is thus displayed instead of the average value of unit time energy consumptions. In addition, a message 292 is displayed indicating the number of times a log has to be recorded to display the average value of unit time energy consumptions.

In addition, for example, when pinching out is performed in the window 275 of the screen of FIG. 12B, the screen illustrated as FIG. 12A is displayed on the display 251A of the smartphone 251.

This allows a user to easily compare the energy consumptions for the respective shoes. As a result, for example, a user is able to increase energy consumption by selecting shoes with higher unit time energy consumption without changing the way of walking in particular. Alternatively, a user is able to efficiently consume energy by selecting shoes with lower unit time energy consumption without changing the way of walking in particular.

It should be noted that, for example, performing a predetermined operation on the screen of FIG. 12A or FIG. 12B may make it possible to display the details of a common condition.

For example, FIG. 13 illustrates a display example of a common condition. Specifically, in this example, a window 301 is overlapped and displayed on the window 275. An image indicating a common condition is then displayed in the window 301. For example, in this example, it is indicated that going up the stairs in a predetermined place is set as a common condition.

FIGS. 14A, 14B, and 14C illustrate a specific example of the method of presenting energy consumption in a case where the client 12 includes a wristwatch type wearable device 351.

For example, in the example of FIG. 14A, the current time and the integrated energy consumption in the most recent presentation target period are displayed on a display 351A of the wearable device 351. For example, in step S103 of the energy consumption presentation processing of FIG. 7 described above, the screen FIG. 14A is first displayed.

Here, for example, when the area around the middle of the display 351A is held down in a case where the screen of FIG. 14A is displayed, the screen of FIG. 14B is displayed on the display 351A. The screen of FIG. 14B is different from the screen of FIG. 14A in that icons 361 to 364 are displayed at the four corners of the display 351A.

The icon 361 is an icon similar to the icon 271 of FIG. 11A. For example, when flickering is performed in the direction of the icon 361 on the display 351A, the logs of energy consumptions are displayed in chronological order.

The icon 362 is an icon similar to the icon 273 of FIG. 11A. For example, when flickering is performed in the direction of the icon 362 on the display 351A, a result obtained by analyzing energy consumption on the basis of the type of an activity of a user is displayed.

The icon 363 is an icon similar to the icon 272 of FIG. 11A. For example, when flickering is performed in the direction of the icon 363 on the display 351A, a result obtained by analyzing energy consumption on the basis of the type of shoes worn by a user is displayed as illustrated of FIG. 14C, for example.

It should be noted that, for example, performing a predetermined operation in a case where the screen of FIG. 14C is displayed on the display 351A makes it possible to return to the screen of FIG. 14B.

The icon 364 is an icon similar to the icon 279 of FIG. 11A. For example, when flickering is performed in the direction of the icon 364 on the display 351A, a voice memo screen for recording a voice memo for a target log is displayed. Then, a user is able to input a voice memo for the target log in the voice memo screen and record the voice memo.

In addition, for example, when the area around the middle of the display 351A is held down in a case where the screen of FIG. 14B is displayed, the screen of FIG. 14A is displayed on the display 351A.

It should be noted that the initial screen displayed first in the processing of step S103 of the energy consumption presentation processing of FIG. 7 may be changed in accordance with user settings, user preferences, and the like. For example, a display screen based on the comparison condition that the number of times the display screen is selected or the probability that the display screen is selected in a predetermined period is greater than or equal to a predetermined threshold may be set as the initial screen. Thus, for example, in a case where a user frequently checks the energy consumption for each pair of shoes, the screen of FIG. 14C is displayed as the initial screen.

In addition, a user may be notified of energy consumption in a method other than visual information as the intensity of sound, timbre, intensity of vibration, and the like.

Further, for example, in a case where the integrated energy consumption is presented, the integrated energy consumption may be expressed in a method other than a numerical value. For example, the integrated energy consumption may be expressed as the amount of exercise (e.g., the number of steps or the distance walked) corresponding to the integrated energy consumption or the amount of food (e.g., the number of rice balls). It should be noted that, in a case where the integrated energy consumption is expressed as the amount of food, the type of food may be switched in accordance with a user. For example, a staple food of the country in which a user resides may be used, a food other than meat may be used for a vegetarian, or the use of sweets may be avoided for a user on a diet.

In addition, emphasizing an energy consumption difference to some extent is effective for keeping a user motivated. For example, in a case where a user realizes that the user has actually gained physical strength, the user is motivated more for the activity or exercise that the user is currently engaged in, but it takes a little time before the user realizes it. Therefore, for example, slightly emphasizing and presenting the energy consumption difference allows the user to more reliably recognize a change in energy consumption, and be kept motivated.

In addition, in a case where the presentation target period of the integrated energy consumption is short, a small numerical value is presented. Accordingly, the impact received by the user is weak. Thus, for example, the integrated energy consumption may be converted into the energy consumption for a predetermined time (e.g., one hour or one day) for presentation. For example, in a case where the integrated energy consumption for 2 minutes is presented, the value obtained by multiplying the integrated energy consumption for 2 minutes by 30 may be presented as the integrated energy consumption in a case where the current activity is continued for one hour.

It should be noted that, in the example described above, unit time energy consumption may be presented instead of integrated energy consumption, integrated energy consumption may be presented instead of unit time energy consumption, or both integrated energy consumption and unit time energy consumption may be presented.

<User Guidance Processing>

Next, with reference to the flowchart of FIG. 15, the user guidance processing executed by the server 11 is described.

It should be noted that the following refers to a user to be guided in this processing as user of interest.

In step S201, the analysis unit 51 determines whether or not a predetermined activity is started. Specifically, the analysis unit 51 receives context data from the client 12 of a user of interest via the communication unit 56.

The analysis unit 51 estimates an activity of the user of interest on the basis of the acquired context data. Then, the analysis unit 51 repeatedly executes the determination processing of the step S201 until it is determined that a predetermined activity is started on the basis of a result of the estimation. In a case where it is determined in step S201 that a predetermined activity is started, the processing then proceeds to step S202.

Here, an activity of the user of interest is recognized, for example, on the basis of a large classification such as walking, running, going up stairs, and the like.

In step S202, the guidance unit 53 determines whether or not it is timing of guidance. For example, in a case where a predetermined condition is satisfied, the guidance unit 53 determines that it is timing of guidance, and the processing proceeds to step S203.

It should be noted that it is possible to set any condition as this predetermined condition. For example, in a case where the client 12 of a user of interest is set in a predetermined mode, it is determined that it is timing of guidance. Alternatively, for example, in a case where the current time is within a predetermined period (e.g., at the beginning of a month) or within a predetermined time slot, it is determined that it is timing of guidance.

In step S203, the server 11 starts guidance. Specifically, the UI control unit 55 generates UI control information for guiding the user of interest to do, in a predetermined execution method, an activity that the user of interest is currently doing. The UI control unit 55 then transmits the UI control information to the client 12 via the communication unit 56, thereby controlling the guidance of the user of interest in the client 12.

Here, with reference to FIGS. 16 and 17, a specific example of a guidance method of a user of interest is described.

FIG. 16 illustrates an example of a case where a user of interest is guided on the basis of the relationship between the duration of an activity and the heartbeat. The horizontal axis represents time, and the vertical axis represents the heartbeat (in units of BPM) of a user of interest.

In addition, FIG. 17 is a graph illustrating the distribution of execution methods of activities to be guided in terms of the two axes of a pace (pitch) and intensity. The horizontal axis represents a pace, and the vertical axis represents intensity. For example, in a case where an activity to be guided is walking, the horizontal axis represents the walking speed, and the vertical axis represents the intensity applied to the feet. Therefore, in this example, the walking method is classified in accordance with the walking speed and the intensity applied to the feet.

For example, the period from the start of an activity to the stabilization of the heartbeat is a search period, and a user of interest is guided in an unsearched direction. In other words, a user of interest is guided to do a target activity in an execution method that has not been performed at all in the past or an execution method that has not been frequently performed. For example, in the example of FIG. 17, a user of interest is guided to do an activity at the pace and intensity within a region 401.

Afterwards, when the heartbeat of the user of interest is stabilized, the user of interest is not guided as long as the user of interest stays in the stable condition. This implicitly encourages the user of interest to keep the current execution method.

In contrast, when the user of interest does an activity at over-pace and the heartbeat exceeds a target value, the user of interest is guided in a resting direction. In other words, the user of interest is guided to such an execution method that decreases the heartbeat to allow the heartbeat to fall below the target value. For example, in the example of FIG. 17, the user of interest is guided to do an activity within a region of very low pace and intensity. It should be noted that the target value of heartbeat is set at a level at which, for example, a user is able to safely do an activity.

Afterwards, when the pace of the activity of the user of interest decreases, support is provided to the user of interest. This guides the user of interest in a direction in which the user of interest is able to easily do an activity. For example, in the example of FIG. 17, the user of interest is guided to do an activity at the pace and intensity within the region 402 including preferred execution methods 411 to 413 of the user of interest.

In this manner, while a user of interest is energetic, the user of interest is guided to experience more types of execution methods. In contrast, when a user of interest becomes tired, the user of interest is guided to continue the activity as long as possible.

It should be noted that it is possible to adopt any method as the guidance method. For example, guidance is performed by using one or more of visual information such as an image, auditory information such as sound, or tactile information such as vibration.

In addition, any of specific or abstract information may be conveyed to a user for guidance. For example, in the former case, the numerical value of a specific pace or intensity is indicated, or a direction of changing the pace is indicated by a message such as "increase (or decrease) the pace (or the intensity)," "more powerful," or "keep it up." In the latter case, for example, a message is conveyed to inspire or support a user such as "you can do it" or "good luck."

In step S204, the guidance unit 53 determines whether or not the registration of a preferred execution method is requested.

For example, when a user of interest discovers a preferred execution method (e.g., preferred way of walking) in a case where the user of interest is doing an activity in a predetermined execution method in accordance with the guidance of the client 12, the user of interest performs a predetermined operation on the client 12. For example, in a case where the client 12 includes a wristwatch type wearable device 421 as illustrated in FIG. 18, a user of interest taps the wearable device 421 a predetermined number of times or swings an arm in a predetermined direction when the user of interest discovers a preferred execution method.

At this time, the recording control unit 106 of the client 12 generates an execution method registration command that includes the context data when the user of interest is doing an activity in the preferred execution method, and requests the execution method to be registered. The recording control unit 106 transmits the execution method registration command to the server 11 via the communication unit 108.

Then, in a case where the guidance unit 53 of the server 11 receives the execution method registration command from the client 12 of the user of interest via the communication unit 56, it is determined that the registration of a preferred execution method is requested, and the processing proceeds to step S205.

In step S205, the server 11 registers a preferred execution method. Specifically, the analysis unit 51 analyzes the preferred execution method of the user of interest on the basis of the context data included in the execution method registration command. Then, the analysis unit 51 causes the storage unit 57 to store information indicating the preferred execution method of the user of interest.

It should be noted that, in a case where the server 11 notifies the wearable device 421 of the completion of the registration of the preferred execution method in the example of FIG. 18, the wearable device 421 may notify the user of the completion of the registration, for example, by sound or vibration.

Afterwards, the processing proceeds to step S206.

In contrast, in a case where it is determined in step S204 that the registration of a preferred execution method is not requested, the processing of step S205 is skipped, and the processing proceeds to step S206.

In step S206, the analysis unit 51 determines whether or not the predetermined activity is finished. Specifically, the analysis unit 51 receives context data from the client 12 of a user of interest via the communication unit 56. The analysis unit 51 estimates an activity of the user of interest on the basis of the acquired context data. Then, in a case where the analysis unit 51 determines, on the basis of a result of the estimation, that the predetermined activity of the user of interest is not finished, the processing returns to step S204.

Afterwards, in step S206, the processing of step S204 to step S206 is repeatedly executed until it is determined that the predetermined activity is finished.

In contrast, in a case where it is determined in step S206 that the predetermined activity is finished, the processing returns to step S201, and the processing of step S201 and subsequent steps is then executed.

In this manner, a user of interest is able to use a wider variation of the execution method of various activities. As a result, the user of interest is able to discover a new preferred execution method. In addition, a virtuous cycle is expectable in which a user of interest is able to enjoy trying various execution methods and wants to try other execution methods.

In addition, for example, collecting learning data while widening the variation of the execution method of each activity of each user, and performing re-learning of the EE estimation model using the collected learning data make it possible to increase the estimation accuracy of the EE estimation model.

It should be noted that a user of interest may be guided to not only increase the variation of the execution method of an activity of the user of interest, but also increase the amount of exercise, for example. For example, in a case where a user of interest is about to take the elevator, the user of interest may be guided to go up the stairs. For example, when a user of interest arrives at the station just before the station nearest to the house, the user of interest may be guided to walk to the nearest station.

In addition, for example, a course to the destination may be selected on the basis of a context (e.g., the baggage, clothing, shoes, destination, weather, or the like of a user of interest) in accordance with the purpose of the user of interest, and the user of interest may be guided to the course. For example, in a case where a user of interest is wearing clothes suitable for exercise, the user of interest may be guided to the optimal course for the diet.

<Time Attack Execution Processing>

Next, with reference to the flowchart of FIG. 19, time attach execution processing executed by the server 11 is described.

Here, the time attack is, for example, a service that sets a target time or the like for a daily activity, and encourages a user to efficiently execute the activity in a shorter time.

The following refers to a user who executes a time attack in this processing as user of interest.

In step S231, similarly to step S201 of FIG. 15, it is determined whether or not a predetermined activity is started. This determination processing is repeatedly executed until it is determined that the predetermined activity is started, and in a case where it is determined that the predetermined activity is started, the processing proceeds to step S232.

In step S232, the server 11 controls a notification of the start of the time attack. Specifically, the UI control unit 55 generates UI control information for notifying a user of the start of the time attack in accordance with an instruction from the guidance unit 53, and transmits the UI control information to the client 12 of the user of interest via the communication unit 56.

In contrast, for example, under the control of the presentation control unit 105, the output unit 107 of the client 12 of the user of interest displays a window for issuing a notification of the start of the time attack on the basis of the UI control information.

FIGS. 20A, 20B, 20C, and 20D illustrate an example of a screen presented in the client 12 of a user of interest during the execution of the time attack.

For example, when a time attack is started, the screen of FIG. 20A is displayed. In this example, an example is illustrated in which a time attack is started when a user of interest starts cleaning, and the target time is set at fifteen minutes.

In step S233, the guidance unit 53 starts to measure time.

In step S234, the server 11 controls the presentation of the remaining time. Specifically, the UI control unit 55 generates UI control information for presenting the remaining time in accordance with an instruction from the guidance unit 53, and transmits the UI control information to the client 12 of the user of interest via the communication unit 56.

In contrast, for example, under the control of the presentation control unit 105, the output unit 107 of the client 12 of the user of interest displays a window for presenting the remaining time of the time attack on the basis of the UI control information.

FIG. 20B illustrates an example of a screen displayed at this time. In this example, it is illustrated that a user of interest is executing a time attack for cleaning and the remaining time is 11 minutes and 40 seconds.

In addition, for example, in a case where the client 12 includes a wearable device, the client 12 may vibrate the wearable device every predetermined time (e.g., three minutes) to inform the user of interest of the elapsed time.

In step S235, similarly to the processing of step S206 of FIG. 15, it is determined whether or not the predetermined activity is finished. In a case where it is determined that the predetermined activity has not yet been finished, the processing returns to step S234.

Afterwards, in step S235, the processing of step S234 and step S235 is repeatedly executed until it is determined that the predetermined activity is finished.

In contrast, in a case where it is determined in step S235 that the predetermined activity is finished, the processing proceeds to step S236.

In step S236, the server 11 controls the presentation of the record. Specifically, the UI control unit 55 generates UI control information for presenting the record in accordance with an instruction from the guidance unit 53, and transmits the UI control information to the client 12 of the user of interest via the communication unit 56.

In contrast, for example, under the control of the presentation control unit 105, the output unit 107 of the client 12 of the user of interest displays a window for presenting the record of the time attack on the basis of the UI control information.

FIGS. 20C and 20D illustrate examples of a screen displayed at this time.

In both the examples of FIG. 20C and FIG. 20D, the record of the time attack is 9 minutes and 12 seconds, indicating that a new record is achieved. In addition, in the example of FIG. 20C, a message indicating that an icon is added to the day of the calendar on which a new record is achieved is displayed. In the example of FIG. 20D, the energy consumption during the current time attack is presented.

Afterwards, the processing returns to step S231, and the processing of step S231 and subsequent steps is executed.

In this manner, setting the target time and presenting the record of the time taken for the activity motivate a user of interest to more quickly and efficiently execute a predetermined activity. As a result, for example, the user of interest does an activity in an execution method different from a usual execution method or eliminates an unnecessary motion. As a result, it is possible to widen the variation of the execution method.

FIGS. 21 and 22 each illustrate an example in which the history of time attacks is displayed on the calendar in the client 12.

FIG. 21 illustrates an example in which the history of time attacks is displayed on a daily basis.

In the upper portion of the screen of FIG. 21, it is displayed what date it is today, and an icon 451 is displayed on the right side of the date. The icon 451 indicates a target achievement rate of a predetermined activity in a month displayed by a calendar in the lower portion of the screen. Specifically, the icon 451 is a figure of a running person, and indicates, for example, the target achievement rate of jogging challenged as a time attack. The hatched lower portion of the icon 451 is displayed in color on the actual screen, and the upper portion is displayed in monochrome. The target achievement rate is indicated by the area displayed in color. In other words, as the target achievement rate increases, the area of the icon 451 displayed in color increases in the upward direction. As the target achievement rate decreases, the area of the icon 451 displayed in color decreases in the downward direction.

Note that the type of an icon to be displayed or the type of an activity for which the target achievement rate is displayed is switchable by a predetermined operation.

A calendar for one month is displayed in the lower portion of the screen of FIG. 21. In addition, in the column of each day on the calendar, an icon corresponding to the activity whose target is achieved on that day is displayed. For example, a foot icon is displayed on the day on which the time necessary for a walking section on the way to work or school is less than or equal to the target time. An icon of the same design as the icon 451 is displayed on the day on which the time necessary for jogging is less than or equal to the target time. A broom icon is displayed on the day when the time necessary for cleaning is less than or equal to the target time.

In addition, in a case where targets are achieved for two or more activities on the same day, icons corresponding to those activities are overlapped and displayed. In addition, a week in which targets are achieved for one consecutive week is displayed to be conspicuous. In this example, the background color of the week from Apr. 9, 2017 to Apr. 15, 2017 is changed.

It should be noted that a month of the calendar to be displayed is switchable by a predetermined operation.

FIG. 22 illustrates an example in which the history of time attacks is displayed on a monthly basis.

Specifically, years are displayed at the left end of the screen, and twelve icons corresponding to the respective months are displayed at the right of each year. The leftmost icons correspond to January, and the rightmost icons correspond to December. Similarly to the icon 451 of FIG. 21, each icon indicates the target achievement rate of a predetermined activity in the corresponding month. In this example, the icons of the same design as the icon 451 are displayed, and the target achievement rates of a user for jogging in the respective months are illustrated.

It should be noted that the type of an icon to be displayed or the type of an activity for which the target achievement rate is displayed is switchable by a predetermined operation.

In addition, a predetermined operation, for example, such as flicking or swiping the screen in the vertical direction makes it possible to change the period for which the history is displayed.

It should be noted that, in a time attack, not only the target time, but also the execution method of an activity may be set. For example, in a case where a user goes up the stairs, 10 seconds may be set as the target time, and going up the stairs three at a time may be set as a target.

<Content Presentation Control Processing Based on Energy Consumption>

Next, content presentation control processing based on energy consumption executed by the server 11 is described with reference to the flowchart of FIG. 23.

In step S261, the learning unit 52 learns a preference of a user. It should be noted that it is possible to use any method as the method of learning a preference of a user.

In step S262, the information processing unit 54 acquires the energy consumption of the user. For example, the information processing unit 54 receives a result of the estimation of the energy consumption of the user transmitted from the client 12 via the communication unit 56.

In step S263, the server 11 controls the presentation of content on the basis of the energy consumption of the user. For example, the information processing unit 54 selects content closer to the preference of the user as the energy consumption of the user is higher. In contrast, the information processing unit 54 selects content farther away from the preference of the user, or selects content regardless of the preference of the user as the energy consumption of the user is lower. Then, the UI control unit 55 transmits the content selected by the information processing unit 54 to the client 12 of the user via the communication unit 56.

Then, the output unit 107 of the client 12 of the user presents the received content under the control of the presentation control unit 105.

Afterwards, the content presentation control processing based on energy consumption is terminated.

Here, a specific example of the processing of FIG. 23 is described with reference to FIGS. 24A, 24B, 24C, 25A, and 25B. Here, a case where the server 11 provides a music distribution service, and selects a song on the basis of the energy consumption of a user is described as an example.

Examples of screens are illustrated as A of FIGS. 24A, 24B, 24C, 25A, and 25B. Each of the screen are displayed on the output unit 107 of the client 12 using the music distribution service under the control of the UI control unit 55 of the server 11.

FIG. 24A illustrates an example of a screen in which a preference of a user is inputted. For example, a user selects a preferred artist from among the artists displayed on the screen. Then, a result of the selection is transmitted from the client 12 to the server 11, and the learning unit 52 of the server 11 learns the preference of the user.

FIGS. 24B and 24C illustrate examples of screens that describe the overview of the service.

On the screen of FIG. 24B, a message is displayed indicating that a larger amount of exercise (energy consumption) increases the probability that a song preferred by a user is selected as the next track. In addition, an example of the amount of exercise that serves as a criterion for increasing the probability that a preferred song is selected is illustrated. Here, going up the stairs for ten floors, walking for 30 minutes, and running for 10 minutes are illustrated as examples.

On the screen of FIG. 24C, a message is displayed indicating that a smaller amount of exercise (energy consumption) causes a song recommended by the music distribution service to be selected regardless of the preference of the user.

FIGS. 25A and 25B illustrate examples of content reproduction screens.

The screen of FIG. 25A displays the title and artist name of the song being reproduced. In addition, a message is displayed together with a scale bar 501 indicating the amount of exercise (energy consumption) of a user. The message indicates that the favorite song of the user is being reproduced because of a large amount of exercise.

The screen of FIG. 25B displays the title and artist name of the song being reproduced. In addition, a message is displayed together with a scale bar 501 indicating the amount of exercise (energy consumption) of a user. The message indicates that the song recommended by the music distribution service is being reproduced because of a small amount of exercise. Further, a purchase button 502 is displayed. The user is able to purchase the data of the song being reproduced by pressing the purchase button 502.

It should be noted that a user is able to use this service at any timing during or after exercise. Using the service at any timing, a user is motivated to exercise harder.

For example, in a case where a user uses the service while exercising such as jogging, the user exercises harder and is able to exercise in a pleasant manner while listening to a preferred song. In addition, in a case where a user uses the service after exercise, the user exercises harder and is able to listen to a preferred song as recompense for the exercise.

It should be noted that the type of content is not limited to a song, but may be other content such as a video, an electronic book, or a game.

For example, in a case of a series of content such as movies, dramas, or novels, the energy consumption of a user exceeding a predetermined threshold may allow the user to acquire the next part of the series of content.

For example, in a case of a game, the energy consumption of a user exceeding a predetermined threshold may allow the user to play a continuation of the game.

In addition, for example, the quality and quantity of content to be presented may be controlled on the basis of energy consumption.

For example, as energy consumption increases, the content to be presented may have higher image quality and sound quality. As energy consumption decreases, the content to be presented may have lower image quality and sound quality.

Alternatively, as energy consumption increases, a larger amount of content may be presented. As energy consumption decreases, a smaller amount of content may be presented. For example, in a case where a user listens to a sample song, higher energy consumption may allow the user to listen to more of the sample.

In addition, for example, in a case where content accumulated in the storage unit 109 of the client 12 is presented, it is also possible to control the content to be presented on the basis of the energy consumption of a user. For example, when songs accumulated in the client 12 are to be reproduced, a song may be selected on the basis of the energy consumption of the user.

<Reward Challenge Execution Processing>

Next, with reference to the flowchart of FIG. 26, reward challenge execution processing executed by the server 11 is described.

The reward challenge is a service in which a reward is automatically ordered and delivered to a user, for example, in a case where the user sets a desired object (reward) and an acquisition condition and achieves the acquisition condition.

In step S291, the server 11 acquires setting information of a reward and an acquisition condition. For example, first, the UI control unit 55 transmits UI control information for displaying a setting screen of a reward and an acquisition condition to the client 12 of a user via the communication unit 56 in accordance with an instruction from the information processing unit 54.

Under the control of the presentation control unit 105, the output unit 107 of the client 12 displays a setting screen of a reward and an acquisition condition on the basis of the UI control information.

FIG. 27A illustrates a specific example of a setting screen of a reward. For example, a user inputs the name of a product to be set as a reward into a search box 551, and searches for the product. This displays a search result of the product. In this example, the maker, model name, and price of the found product are displayed. Then, the user selects a desired product as a reward from the products presented as a search result.

FIG. 27B illustrates a specific example of a setting screen of an acquisition condition of a reward. In this example, the amount of exercise is set to acquire a point for one dollar. For example, inputting a desired numerical value in a box 552 causes the number of floors of the stairs to be set that corresponds to a point for one dollar. Inputting a desired numerical value in a box 553 causes the walking time to be set that corresponds to a point for one dollar. Inputting a desired numerical value in a box 554 causes the running time to be set that corresponds to a point for one dollar.

Then, when the reward and the acquisition condition of the reward are set, a confirmation screen of FIG. 27C is displayed. This screen indicates the contents of the set reward and the set acquisition condition of the reward. For example, it is indicated that the camera of Model B from Maker 2 priced at 200 dollars is set as a reward. In addition, it is indicated that going up the stairs for ten floors, walking for 30 minutes, or running for 10 minutes is converted into a point for one dollar as a reward acquisition condition. Further, it is indicated that the total energy consumption value for achieving the reward acquisition condition or performing the exercise corresponding to points for 200 dollars is 22,000 kcal. In addition, a button 555 is displayed for determining a reward and an acquisition condition and starting a reward challenge.

When a user presses the button 555, the reward and the acquisition condition are determined, and the information processing unit 104 of the client 12 transmits the setting information of the reward and the acquisition condition to the server 11 via the communication unit 108.

The information processing unit 54 of the server 11 receives the setting information of the reward and the acquisition condition via the communication unit 56.

In step S292, the analysis unit 51 starts to analyze an activity of a user. Specifically, the analysis unit 51 starts to receive context data from the client 12 of a user via the communication unit 56. In addition, the analysis unit 51 starts to analyze an activity of the user on the basis of the received context data. Then, the analysis unit 51 starts to detect an activity of the user set as the acquisition condition of the reward, and causes the storage unit 57 to store a result of the detection as appropriate.

In step S293, the server 11 causes the presentation of interim progress to be started. Specifically, the UI control unit 55 starts processing of transmitting, to the client 12 of the user, UI control information for presenting interim progress of the reward challenge via the communication unit 56 in accordance with an instruction from the information processing unit 54.

Under the control of the presentation control unit 105, the output unit 107 of the client 12 starts processing of displaying the interim progress of the reward challenge on the basis of the UI control information.

FIG. 28A illustrates an example of a screen of interim progress of a reward challenge. At the upper end of the screen, a message is displayed indicating that a reward challenge is in progress, and the contents of the reward are displayed below the message. Below that, a progress bar 556 is displayed indicating the achievement rate of the acquisition condition. Below that, a hint for achieving the acquisition condition is displayed. The contents of this hint are changed as appropriate. Below that, the total energy consumption value after the start of the reward challenge is displayed together with the total energy consumption value for achieving the acquisition condition. Below that, the number of remaining days of the reward challenge and a button 557 are displayed. The button 557 is a button for stopping the reward challenge.

In step S294, the information processing unit 54 determines whether or not the acquisition condition is achieved on the basis of a result of the detection of an activity of the user stored in the storage unit 57. In a case where it is determined that the acquisition condition is not still achieved, the processing proceeds to step S295.

In step S295, the information processing unit 54 determines whether or not a prescribed time elapses. In a case where it is determined that the prescribed time does not still elapse, the processing proceeds to step S296.

In step S296, the information processing unit 54 determines whether or not to stop the reward challenge. In a case where it is determined that the reward challenge is not stopped, the processing returns to step S294.

Afterwards, the processing of steps S294 to S296 is repeatedly executed until it is determined in step S294 that the acquisition condition is achieved, it is determined in step S295 that the prescribed time elapses, or it is determined in step S296 that the reward challenge is stopped.

In contrast, for example, in a case where the user presses the button 557 of the screen of FIG. 28A, the information processing unit 104 of the client 12 transmits a command to stop the reward challenge to the server 11 via the communication unit 108 in the step S296. Then, in a case where the information processing unit 54 of the server 11 receives the command to stop the reward challenge via the communication unit 56, it is determined that the reward challenge is stopped, and the processing proceeds to step S297.

In addition, in a case where it is determined in step S295 that the prescribed time elapses from the start of the reward challenge, the processing proceeds to step S297. This is a case where the user fails to achieve the acquisition condition within the prescribed time.

In step S297, the information processing unit 54 stops the reward challenge, and the reward challenge execution processing is terminated.

In contrast, in a case where it is determined in step S294 that the acquisition condition is achieved, the processing proceeds to step S298.

In step S298, the server 11 makes arrangements to send the reward. For example, the information processing unit 54 transmits, via the communication unit 56, processing of ordering a product set as the reward to the server of the seller of the product. This determines the order of the reward and the reward is sent to the user.

FIG. 28B illustrates an example of a screen displayed on the client 12 of the user at this time. In this example, the contents of the reward are displayed, and a message is displayed indicating that the reward challenge has resulted in success and the reward has been sent.

It should be noted that the reward is not automatically ordered, but the user may be asked to confirm before ordering, for example.

Afterwards, the reward challenge processing is terminated.

In this manner, the user is motivated more to exercise in daily life by tackling the reward challenge, resulting in higher energy consumption. In addition, in a case where the activity amount in a predetermined period reaches a target value, the user is able to acquire a reward as remuneration therefor, and have a feeling of great satisfaction.

It should be noted that it is assumed that the user basically pays for the reward. In other words, the reward challenge is a service in which a user sets a target value for the amount of exercise and sets and obtains recompense for the user achieving the target.

However, a third person such as a service provider of the reward challenge may provide a reward to a user.

In addition, the reward is not limited to an object, but may be, for example, a service, a user experience, or the like other than an object. Further, for example, what a user of interest gives up to tackle a reward challenge may be set as a reward. For example, in a case where a user of interest tackles a reward challenge for diet, sweets may be set as a reward.

In addition, for example, a plurality of users may cooperate to tackle a reward challenge. For example, a reward may be acquirable with the points obtained by adding points acquired by family members.

<Calorie Budget Execution Processing>

Next, with reference to the flowchart of FIG. 29, calorie budget execution processing executed by the server 11 is described.

The calorie budget is, for example, a service that converts the energy consumption of a user into a virtual currency called calorie coins, and uses the calorie coins in conjunction with a smart home or the like to allow for the use of the various apparatuses 13 at home. It should be noted that calorie coins are transferable (tradable) between users by using money or the like.

It should be noted that the following defines the unit of calorie coins as c.

In step S401, the information processing unit 54 starts to acquire a result of the estimation of energy consumption. Specifically, the information processing unit 54 starts processing of receiving a result of the estimation of the energy consumption of a user from the client 12 via the communication unit 56.

In step S402, the information processing unit 54 starts processing of converting the energy consumption into calorie coins.

For example, energy consumption (kcal) is converted into calorie coins in accordance with the following expression (2) by using a conversion factor w.

$$\text{calorie coins} = \text{energy consumption (kcal)} \times w \quad (2)$$

As the initial value of the conversion factor w, for example, 1 is set. In other words, when a user consumes an energy of 1 kcal, the user is able to acquire calorie coins for 1 c. Afterwards, the conversion factor w is updated as appropriate in accordance with a situation. For example, the conversion factor w is updated in accordance with the following expression (3).

$$w = w \times ((\beta - \alpha \times (BMI - 22)^2)) \quad (3)$$

Here, α and β are predetermined coefficients, and BMI is the BMI (Body Mass Index) of a user. Thus, as the BMI is closer to 22 (the weight of a user is closer to the standard weight), the conversion factor w increases and the user is able to acquire more calorie coins.

In addition, for example, the conversion factor w at the time of doing an activity that the service side desired to encourage may be increased. For example, in a case where it is desired to encourage an activity of parents and children, the conversion factor w is set in accordance with the following expression (4), for example, in a case where a user is with a child.

$$w = w \times 1.5 \quad (4)$$

In addition, just like an increase in savings increases interest rates, an increase in remaining calorie coins may increase the conversion factor w. For example, the conversion factor w is calculated in accordance with the following expression (5) in a case where there remain calorie coins more than 1000 c. The conversion factor w is calculated in accordance with the following expression (6) in a case where there remain calorie coins less than or equal to 1000 c and more than 50 c.

$$w = w \times 1.5 \quad (5)$$

$$w = w \times 1.2 \quad (6)$$

In addition, for example, the conversion factor w may be made variable on the basis of unit time energy consumption. For example, in a case where the unit time energy consumption is within the range corresponding to the fat-burning heart rate zone, then conversion factor w may be increased. This motivates a user to perform exercise that burns fat effectively.

Alternatively, the conversion factor w may be increased with an increase in unit time energy consumption. This motivates a user to perform high-intensity exercise. In addition, in view of the danger during exercise, the conversion factor w may be set at 0 in a case where exercise of predetermined intensity or higher continues for a predetermined time or longer.

It should be noted that a user consumes energy at least by basal metabolism without exercising in particular, and the user is thus able to regularly acquire calorie coins. It is possible to regard this as a counterpart to the basic income in the real world.

In addition, a user may be given calorie coins as remuneration on the basis of a predetermined condition regardless of energy consumption.

For example, in a case where the total value of calorie coins acquired in one day exceeds a threshold th obtained in accordance with the following expression (7), a user may be given calorie coins for 500 c as remuneration.

$$th = \max \text{ (calorie coins acquired on previous day or 3000 c)} \quad (7)$$

In other words, in a case where the total value of calorie coins acquired in a day is greater than larger one of the total value of calorie coins acquired on the previous day and 3000 c, a user may acquire additional caloric points for 500 c as a bonus.

In addition, for example, to retain users who have just started using a service or to give favorable treatment to the sponsor of the service, calorie coins may be provided to a user as remuneration when the user first purchases a product (e.g., sweets) provided by the sponsor.

In addition, the UI control unit 55 generates UI control information for issuing notifications of various kinds of information related to the calorie budget service in accordance with an instruction from the information processing unit 54, and transmits the UI control information to the client 12 of a user via the communication unit 56.

Meanwhile, the output unit 107 of the client 12 of the user displays a window for issuing notifications of the various kinds of information related to the calorie budget service on the basis of the UI control information under the control of the presentation control unit 105. FIGS. 30 and 31 each illustrate an example of a screen displayed in the client 12.

FIG. 30 illustrates an example of a screen displayed mainly in the calorie budget service.

A pig-shaped savings box 601 is displayed in the middle of this main screen. FIG. 30 does not illustrate the facial expression of the pig of the savings box 601, but the facial expression of the pig changes, for example, in accordance with the remaining calorie coins. For example, in a case where the remaining calorie coins are less than 50 c, the facial expression of the pig becomes pale one. In a case where the remaining calorie coins are less than 1000 c, the facial expression of the pig becomes serious one. In a case where the remaining calorie coins are more than or equal to 1000 c, the facial expression of the pig becomes smiling one.

In addition, for example, in a case where calorie coins are newly acquired, an image 602 is displayed indicating the state in which coins are inserted into the savings box 601. In contrast, in a case where calorie coins are spent, an image 603 is displayed indicating the state in which coins leave the savings box 601.

Further, a button 604 is displayed below the savings box 601. For example, as described below, the button 604 is pressed in a case where a user desires to receive calorie coins from another user in a case where the user runs short of calorie coins.

In addition, for example, a user tapping the savings box 601 with a finger displays a screen illustrated in FIG. 31 and indicating in detail the transition of the remaining calorie coins.

For example, at the upper end of the screen of FIG. 31, the current remaining calorie coins are displayed.

In the middle, a graph illustrating the transition of the remaining calorie coins for today is displayed. The horizontal axis of the graph represents time, and the vertical axis represents the remaining calorie coins.

Below the graph, activities recommended to a user are displayed. Specifically, the contents of a specific activity and the approximate value of calorie coins offered by the activity are illustrated.

It should be noted that it is possible to change the period for displaying the transition of the remaining calorie coins to any period by a predetermined operation.

In addition, for example, the savings box 601 may be a software agent whose behavior changes in accordance with the remaining calorie coins. For example, in a case where the remaining calorie coins are more than or equal to 1000 c, the savings box 601 operates as a normal software agent. In contrast, when the remaining calorie coins fall below 1000 c, a portion of the functions of the savings box 601 serving as a software agent is restricted. Then, when the remaining calorie coins are less than or equal to 50 c, most of the functions of the savings box 601 serving as a software agent are disabled.

In step S403, the information processing unit 54 determines whether or not the use of the apparatus 13 for which calorie coins are necessary is requested. For example, in a case where a user is about to use the apparatus 13 for which calorie coins are necessary, the data acquisition unit 101 of the apparatus 13, for example, reads the user ID from the client 12 of the user. It should be noted that the method of reading a user ID is not particularly limited, but, for example, the apparatus 13 may automatically read a user ID from the client 12, or a user may hold the client 12 over a predetermined position on the apparatus 13.

The data acquisition unit 101 of the apparatus 13 transmits apparatus use information including the acquired user ID to the server 11 via the communication unit 108.

In a case where the information processing unit 54 of the server 11 receives the apparatus use information via the communication unit 56, it is determined that the use of the apparatus 13 for which calorie coins are necessary is requested, and the processing proceeds to step S404.

In step S404, the information processing unit 54 determines whether or not calorie coins are sufficient. Specifically, the information processing unit 54 confirms the remaining calorie coins of the user corresponding to the user ID included in the apparatus use information. Then, in a case where the remaining calorie coins of the user are more than or equal to the calorie coins (that are referred to as usage fee below) necessary for the use of the apparatus 13 that the user is about to use, the information processing unit 54 determines that the calorie coins are sufficient, and the processing proceeds to step S405.

It should be noted that the usage fee of each apparatus 13 is determined in advance. For example, a usage fee of 100 c is set to open and close a door of the house, a usage fee of 300 c is set to log in to a PC, and a usage fee of 200 c is set to unlock a door of a car.

In contrast, a low usage fee may be set for the apparatus 13 that encourages exercise, or conversely a user may be given remuneration by using it. For example, the usage fee of a bicycle may be set at 0 c or a user may be given calorie coins for 100 c as remuneration by entering a training room.

In addition, the usage fee of each apparatus 13 may be fixed or variable. In a case of a variable usage fee, the usage fee may vary, for example, on the basis of a context (e.g., time slot, day of week, season, weather, or the like). Alternatively, the usage fee of each apparatus 13 may be varied depending on a user who uses it.

In step S405, the information processing unit 54 permits the use of the apparatus 13. Specifically, the information processing unit 54 generates use permission information for issuing a notification of the use permission of the apparatus 13, and transmits, via the communication unit 56, the use permission information to the apparatus 13 from which the apparatus use information is transmitted. In addition, the information processing unit 54 subtracts the usage fee of the apparatus 13 from the remaining calorie coins of the user who uses the apparatus 13.

This allows the user to use the apparatus 13.

It should be noted that the remaining calorie coins of the user may be decreased after the user confirms the use of the apparatus 13.

In addition, the permission/non-permission of the use of each apparatus 13 may be achieved, for example, by hardware including a smart lock or the like, or software through authentication processing or the like.

Afterwards, the processing proceeds to step S407.

In contrast, in a case where the remaining calorie coins of the user are less than the usage fee of the apparatus 13 that the user is about to use, the information processing unit 54 determines in step S404 that the calorie coins are insufficient, and the processing proceeds to step S406.

In step S406, the information processing unit 54 refuses the use of the apparatus 13. Specifically, the information processing unit 54 generates use refusal information for issuing a notification of the use refusal of the apparatus 13, and transmits, via the communication unit 56, the use refusal information to the apparatus 13 from which the apparatus use information is transmitted.

This disables the user from using the apparatus 13. In addition, the user does not use the apparatus 13, and the remaining calorie coins of the user thus do not change.

Afterwards, the processing proceeds to step S407.

In contrast, if it is determined in step S403 that the use of the apparatus 13 for which calorie coins are necessary is not requested, the processing of steps S404 to S406 is skipped, and the processing proceeds to step S407.

In step S407, the information processing unit 54 determines whether or not the transfer of calorie coins is requested.

For example, in a case where a user desires to receive calorie coins from another user, the user presses the button 604 in the screen of FIG. 30, and then inputs information such as the value of the calorie coins to be received and the user from whom calorie coins are received to the client 12 via the input unit 102. The information processing unit 104 of the client 12 generates calorie coin transfer request information on the basis of the information inputted by the user, and transmits the calorie coin transfer request information to the server 11 via the communication unit 108.

In a case where the information processing unit 54 receives the calorie coin transfer request information from the client 12 via the communication unit 56, it is determined that the transfer of calorie coins is requested, and the processing proceeds to step S408.

In step S408, the information processing unit 54 transfers calorie coins. Specifically, the information processing unit 54 determines whether or not the contents of the calorie coin transfer included in the calorie coin transfer request information is valid. For example, the information processing unit 54 confirms whether a user who transfers calorie coins is a valid user, whether the remaining calorie coins of a user who gives calorie coins are more than or equal to calorie coins to be given, and the like.

Then, in a case where it is determined that the contents of the calorie coin transfer are valid, the information processing unit 54 subtracts the set amount of calorie coins from the remaining calorie coins of the user who gives calorie coins, and adds the set amount of calorie coins to the remaining calorie coins of the user who receives calorie coins.

In this manner, calorie coins are transferred between users. For example, calorie coins are given from a child who is constantly active and has a lot of calorie coins to a father who has limited time for exercise and is running short of calorie coins.

It should be noted that the range of users between whom calorie coins are transferable may be limited to a predetermined range, for example, like between family members.

In addition, for example, cash or an item in the real world is used as a return from the receiver of calorie coins to the giver of calorie coins. For example, the father who has received calorie coins from the child gives pocket money to the child as a return.

Afterwards, the processing returns to step S403, and the processing of step S403 and subsequent steps is executed.

In contrast, in a case where it is determined in step S407 that the transfer of calorie coins is not requested, the processing returns to step S403, and the processing of step S403 and subsequent steps is executed.

In this manner, each user is able to acquire calorie coins in accordance with the energy consumption, and the use of the acquire calorie coins allows the user to use the various apparatuses 13. This motivates each user more to exercise to acquire more calorie coins.

For example, in a case where the calorie budget service is used in a family, for example, a mother who is worried about a father and a child insufficiently exercising buys the father and the child the clients 12 that allow for the use of the calorie budget. This offers the effects of improving the health of the father in the long term while practically forcing the father to exercise to use the various apparatuses 13 in the house. In addition, the child is able to earn money by accumulating calorie coins by exercising and giving calorie coins to the father as necessary. Therefore, it is expectable that the child actively plays outside. Further, the transfer of the calorie budget between the father and the child is expected to encourage communication.

It should be noted that, for example, freely determining the rate of exchange between the calorie budget and money is expected to bring about even the secondary effects of allowing the child to study economic principles.

In addition, in this case, the remuneration received by the father and the child is closed within the family and imposes no burden on the sponsor that provides the calorie budget service.

It should be noted that, for example, energy intake from a meal or the like may be converted into calorie coins, and subtracted from the accumulated calorie coins. However, it is desirable to keep the conversion factor for the energy intake lower than the conversion factor for the energy consumption.

In addition, for example, this calorie budget is also applicable, for example, to a smart hotel and a smart event other than the house.

Further, for example, when a user is short of calorie coins in a case where the user comes closer to the apparatus 13, the client 12 may convey to the user in advance that the apparatus 13 is not usable.

For example, in a case where the remaining calorie coins of a user is less than the usage fee necessary to open the door of a house 611 when the client 12 enters an area 612 having a radius of x meters around the house 611 of the user as illustrated in FIG. 32, the client 12 may notify the user that it is not possible to open the door of the house 611 because the remaining calorie coins are insufficient. This motivates the user to exercise, for example, before returning to the house 611, and prevents the user from being at a loss because it is not possible to open the door when the user returns to the house 611.

In addition, for example, it is desirable to use technology such as personal identification to prevent a user using the calorie budget from acquiring calorie coins from the energy consumption of a third person or a pet other than the user by having the third person or the pet wear the client 12.

<Purchase Control Service Execution Processing>

Next, with reference to the flowchart of FIG. 33, purchase control service execution processing executed by the server 11 is described.

The purchase control service is, for example, a service that restricts a user's purchase of a product or service or varies the price or contents of a product or service on the basis of the energy intake and energy consumption of the user.

In step S501, the information processing unit 54 starts to acquire a result of the estimation of energy intake and energy consumption. Specifically, the information processing unit 54 starts processing of receiving a result of the estimation of the energy intake and energy consumption of a user from the client 12 via the communication unit 56.

It should be noted that it is possible to adopt any method as the method of estimating energy intake.

In step S502, the server 11 starts to perform purchase control based on energy intake and energy consumption. For example, in a case where at least one of the energy intake or energy consumption of a user satisfies a predetermined condition, the information processing unit 54 controls another server or the like that provides an online shopping site and prevents products (e.g., liquor, sweets, and the like) with great energy content from being purchased.

Here, the predetermined condition is, for example, a case where the energy intake in the immediately preceding predetermined period (e.g., one day) is greater than or equal to a predetermined threshold, a case where the energy consumption is less than a predetermined threshold, a case where the energy intake exceeds the energy consumption by a predetermined threshold or more, or the like.

In addition, for example, in a case where the client 12 has an AR (augmented reality) function, the UI control unit 55 transmits, to the client 12 via the communication unit 56, purchase restriction information for restricting a user's purchase of a product in accordance with an instruction from the information processing unit 54.

For example, under the control of the presentation control unit 105, the output unit 107 of the client 12 performs visual effects on the basis of the purchase restriction information to prevent a user from ordering a dish (that is referred to as high-calorie menu below) with energy content greater than or equal to a predetermined threshold among the dishes in the menu in a case where the user looks at the menu via the client 12 in the restaurant. For example, as illustrated in FIG. 34, in a user's field of view, an image or the like indicating that the order is forbidden is superimposed on the column of a high-calorie menu in a menu 651. In addition, for example, as illustrated in FIG. 35, in a user's field of view, an image of a dish (that is referred to as low-calorie menu below) with energy content less than a predetermined threshold is superimposed on the column of a high-calorie menu in the menu 651.

In step S503, the server 11 starts price setting based on energy intake and energy consumption. For example, in a case where at least one of the energy intake or energy consumption of a user satisfies a condition similar to that of the processing of the step S502, the information processing unit 54 controls another server or the like that provides an online shopping site, and controls the selling price of a product in accordance with the energy content and the like.

For example, the selling price of a product is set in accordance with the following expression (8).

$$\text{selling price} = \text{standard price} \times (\alpha + \beta 1 \times \text{energy content}/\text{energy restriction value}) \times (\beta 2 / \text{energy consumption achievement degree}) \quad (8)$$

It should be noted that α represents a coefficient for a product having zero energy content (zero-calorie product), and β1 and β2 each represent a coefficient for setting a premium rate or a discount rate of a selling price.

The energy restriction value is, for example, energy content serving as a criterion for determining whether the selling price is to be increased or discounted. In other words, in a case where the energy consumption achievement degree is not taken into consideration, the selling price of a product with energy content less than the energy restriction value is discounted and the selling price of a product with energy content greater than the energy restriction value is increased. This motivates a user to purchase a product with energy content less than or equal to the energy restriction value.

The energy consumption achievement degree indicates the proportion of the energy consumption in a predetermined period to a target value.

Therefore, the premium rate is higher (or the discount rate is lower) for a product with greater energy content, and the premium rate is lower (or the discount rate is higher) for a product with less energy content. In addition, the premium rate of a product is lower (or the discount rate is higher) with an increase in the energy consumption achievement degree of a user, and the premium rate of a product is higher (or the discount rate is lower) with a decrease in the energy consumption achievement degree of a user.

In addition, for example, the server 11 may cooperate with a signage type vending machine 661 illustrated in FIG. 36 that is one of the apparatuses 13 of FIG. 1. For example, a user bringing the client 12 closer to the vending machine 661 causes the vending machine 661 to recognize the user having the client 12. Then, the vending machine 661 presents a selling price calculated in accordance with expression (8) or the like described above in accordance with the recognized user.

In addition, for example, in a case where the client 12 has an AR function, the information processing unit 54 acquires information of the client 12 regarding the products in the field of view from the client 12 via the communication unit 56. Then, the information processing unit 54 calculates the selling price, discount rate, premium rate, or the like of each product in accordance with expression (8) or the like described above. Then, the UI control unit 55 transmits selling-price information including a result of the calculation or the like to the client 12 via the communication unit 56 in accordance with an instruction from the information processing unit 54.

Under the control of the presentation control unit 105, the output unit 107 of the client 12 superimposes and displays a selling price, a discount rate, a premium rate, or the like on a product in a user's field of view, for example. For example, as illustrated in FIG. 37, in a case where a user looks at a showcase of dishes in the cafeteria via the client 12, a discount rate or a premium rate is superimposed and displayed on each dish.

It should be noted that, for example, a user may actually pay the money corresponding to the selling price calculated in the processing of step S502 or S503, or virtually pay the money.

In the former case, for example, the purchase control service is applied to an event of a seller of a product, a welfare benefit of a company, or the like. For example, it is possible to promote the health of an employee by varying the price of each menu on the basis of the energy intake and energy consumption of the employee in the company's employee cafeteria.

In addition, in the former case, the difference between the selling price and the standard price may be settled by using a coupon or the like other than cash. For example, in a case where the selling price is lower than the standard price, a coupon corresponding to the difference may be given from the seller to a user. In a case where the selling price is higher than the standard price, a coupon corresponding to the difference may be paid from a user to the seller.

In the latter case, for example, a payment is actually made at the standard price, and the price is paid to the seller. In contrast, in a case where the selling price is higher than the standard price, the difference (overpayment) is accumulated as pool money in a bank account or the like of a user. In a case where the selling price is lower than the standard price, the difference (compensation money) is subtracted from the pool money.

It should be noted that, in a case where AR is used to superimpose and display a selling price or the like on a product as illustrated in FIGS. 34, 35, and 37, it is possible to use any method to recognize the product. For example, general object recognition may be used, or a product name may be recognized.

In addition, although the above describes an example in which the purchase and price of a product are controlled on the basis of the energy intake and energy consumption of a user, for example, the use of the apparatus 13 by the user and the use and prices of various services may be controlled.

For example, in a case where at least one of the energy intake or energy consumption of a user satisfies a condition similar to that of the processing of step S502 of FIG. 33 described above, the use of the predetermined apparatus 13 or service by the user may be restricted. For example, even if a user is about to drive a vehicle that is one of the apparatuses 13, the vehicle may be locked to prevent the user from driving the vehicle.

Further, for example, at least one of the energy intake or energy consumption of a user may control the contents (e.g., quality or quantity) of a product or service provided to the user.

<Support Service Execution Processing>

Next, with reference to the flowchart of FIG. 38, support service execution processing executed by the server 11 is described.

One of the motivations for a user to do some activities or work hard is support of another person. For example, a parent with a child works harder than usual or demonstrates more favorable performance than usual when receiving support of the child.

The support service is a service that transmits, substantially in real time, the state of an activity of a user (that is referred to as activity-doer) to a supporter who supports the activity-doer, and transmits (feeds back) the support of the supporter for the activity-doer, thereby motivating the activity-doer more.

It should be noted that the following describes the support service execution processing by using, as a specific example, a case where the activity-doer is a father and the supporter is a child of the activity-doer.

In step S601, the analysis unit 51 determines whether or not the activity-doer starts an activity to be supported, on the basis of context data received from the client 12 of the activity-doer via the communication unit 56. This determination processing is repeatedly executed until it is determined that the activity-doer starts an activity to be supported. In a case where it is determined that the activity-doer starts an activity to be supported, the processing proceeds to step S602.

In step S602, the server 11 starts to transmit the state of the activity-doer to the supporter. For example, the server 11 starts the following processing.

On the basis of the context data received from the client 12 of the activity-doer, the analysis unit 51 analyzes the status (e.g., progress or the like) of the activity of the activity-doer. The UI control unit 55 generates UI control information for conveying the state of the activity-doer in the client 12 of the supporter in accordance with an instruction from the information processing unit 54, and transmits the UI control information to the client 12 of the supporter via the communication unit 56.

In response to this, the output unit 107 of the client 12 of the supporter starts to transmit the state of the activity-doer under the control of the presentation control unit 105.

FIG. 39 illustrates an example of a screen for conveying the state of the activity-doer to the supporter in a case where the client 12 of the supporter includes a TV 701.

In this example, an information column 711, a progress bar 712, an animation 713, and an icon 714 are superimposed and displayed on an image (not illustrated) of a television program and displayed at the upper right corner of the screen of the television set 701.

In the information column 711, information indicating the state or the like of the activity-doer is displayed. In this example, a message is displayed indicating that a father who is the activity-doer is working hard. It should be noted that, for example, it may be displayed in the information column 711 in real time by using a word, an icon, and the like how hard the activity-doer is working, which is calculated on the basis of the energy consumption, heartbeat, or the like of the activity-doer.

In addition, in the information column 711, such a message may be displayed that encourages the supporter to provide support. For example, when a father who is the activity-doer starts to come back home, a message such as "Your father is arriving at Station A soon. Do you request your father to walk to the next station from Station A?" may be displayed to a child who is the supporter.

Further, for example, a notification of more detailed information may be issued as the activity of the activity-doer comes closer to the end. For example, in a case where an activity of the activity-doer is to come back home from work, the expected time of return or the like may be displayed after the activity-doer enters a predetermined area from the house.

The progress bar 712 indicates the progress of an activity of the activity-doer and the elapsed time. For example, in a case where the activity-doer is coming back home from work, it is displayed as the progress bar 712 to what extent the activity-doer has arrived on the way home. It should be noted that it may be expressed as the color or the like of the progress bar 712 how hard the activity-doer is working.

The animation 713 simulates the state of the activity-doer doing an activity. In this example, the state in which a father who is the activity-doer is running is displayed as the animation 713.

The icon 714 is displayed in a case where there is more detailed information regarding the state or the like of the activity-doer. Refraining from displaying the contents of the detailed information soon, and issuing a notification with the icon 714 make it possible to prevent the screen of the TV 701 from being untidy. For example, when the supporter clicks the icon 714, the detailed information is popped up on the screen of the TV 701.

For example, the summary of an activity of the activity-doer is displayed as the detailed information. This detailed information includes, for example, a difference from the usual activity, a point of the activity-doer to be praised, and the like. For example, information is displayed such as "You were 30 seconds faster than usual today," "You stopped for about 10 minutes in front of the fountain," "Your heartbeat did not increase much during running," and "You worked hard though it was cold at 4° C." This detailed information allows the supporter to know the status of an activity of the activity-doer and smoothly communicate with the activity-doer later, for example, even if the supporter does not check the state of the activity-doer in real time or does not provide support.

It should be noted that the state of the activity-doer does not necessarily have to be displayed on the client 12 at all times during the activity of the activity-doer. For example, the state of the activity-doer may be displayed only during commercial messages of a TV program. In addition, for example, the state of the activity-doer may be displayed at the timing at which the status of the activity changes or the activity-doer passes by a predetermined checkpoint.

In step S603, the server 11 starts to feed back support from the supporter to the activity-doer. For example, the server 11 starts the following processing.

For example, the supporter inputs support for the activity-doer via the input unit 102 of the client 12 of the supporter as an image or sound, or through a predetermined user operation (e.g., pressing a button, inputting a message, or the like). In addition, for example, an image and sound indicating the state of the supporter doing an activity with the activity-doer may be inputted as support for the activity-doer. In this case, the activity of the activity-doer and the activity of the supporter do not necessarily have to match each other. For example, while a father who is the activity-doer is running, a child who is the supporter may support the father by jumping rope. The information processing unit 104 of the client 12 of the supporter transmits support information to the server 11 via the communication unit 108. The support information is inputted by the supporter and indicates support.

The information processing unit 54 of the server 11 receives the support information from the client 12 of the supporter via the communication unit 56. The UI control unit 55 generates UI control information for notifying the activity-doer of the support of the supporter in accordance with an instruction from the information processing unit 54, and transmits the UI control information to the client 12 of the activity-doer via the communication unit 56.

In contrast, the output unit 107 of the client 12 of the activity-doer notifies the activity-doer of the support of the supporter under the control of the presentation control unit 105. For example, the output unit 107 outputs the support of the supporter as an image or sound. Alternatively, for example, the output unit 107 uses haptics technology to convey the support of the supporter to the activity-doer.

In step S604, the analysis unit 51 determines whether or not the activity of the activity-doer is finished, on the basis of context data received from the client 12 of the activity-doer via the communication unit 56. The determination processing of step S604 is repeatedly executed until it is determined that the activity of the activity-doer is finished. In a case where it is determined that the activity of the activity-doer is finished, the processing proceeds to step S605.

In step S605, the information processing unit 54 terminates transmitting the state of the activity-doer and feeding back the support of the supporter.

Afterwards, the processing returns to step S601, and the processing of step S601 and subsequent steps is then executed.

In this manner, it is possible to convey the state of an activity of the activity-doer to the supporter and convey support of the supporter to the activity-doer. As a result, the activity-doer is motivated more, the activity-doer does an activity harder, and the energy consumption is expected to increase.

It should be noted that, for example, in cooperation with the calorie budget described above with reference to FIG. 29, for example, calorie coins corresponding to the frequency, time, or the like of support may be given to the supporter as remuneration.

In addition, for example, in a case where there is no support of the supporter, a software agent controlled by the server 11 may provide pseudo support instead of the supporter.

2. Modification

The following describes a modification of the embodiment of the technology according to the present disclosure described above.

<Modification Regarding EE Estimation Model>

The type of input data of the EE estimation model described above is an example thereof, and another type of data other than the exemplified type of data may be used. For example, pressure or the like on the sole of a foot of a user may be used. In addition, for example, angular velocity may be used instead of the acceleration of a user, or the components of exhalation may be used instead of heartbeat. In addition, for example, data indicating the condition of the surroundings of a user such as atmospheric pressure, air temperature, humidity, and the like, may be used.

In addition, the number of sensors for detecting the acceleration, heartbeat, and the like of a user is not particularly limited, but sensors may be attached to a plurality of portions of a user.

Further, for example, the EE estimation model may be personalized and generated individually for each user.

<Modification Regarding System Configuration>

The configuration example of the information processing system 10 of FIG. 1 is an example thereof, and is changeable as necessary.

For example, it is possible to transfer a portion of the functions of the server 11 to the client 12 or transfer a portion of the functions of the client 12 to the server 11.

For example, the server 11 may estimate the energy consumption of each user. In addition, for example, the client 12 may analyze the energy consumption of each user.

In addition, for example, it is also possible for the client 12 to perform all the processing. For example, the client 12 may learn the EE estimation model of a user and use the generated EE estimation model to estimate and present the energy consumption of the user.

3. Others

<Configuration Example of Computer>

It is possible to execute the series of processing described above by hardware or software. In a case where the series of processing is executed by software, a program included in the software is installed in a computer. Here, the computer includes a computer that is incorporated in dedicated hardware, a general-purpose personal computer that is able to execute various functions by having various programs installed therein, and the like, for example.

FIG. 40 is a block diagram illustrating a configuration example of the hardware of a computer that executes the series of processing described above with a program.

In a computer 900, a CPU (Central Processing Unit) 901, a ROM (Read Only Memory) 902, and a RAM (Random Access Memory) 903 are coupled to each other by a bus 904.

An input/output interface 905 is further coupled to the bus 904. An input unit 906, an output unit 907, a recording unit 908, a communication unit 909, and a drive 910 are coupled to the input/output interface 905.

The input unit 906 includes an input switch, a button, a microphone, an imaging element, and the like. The output unit 907 includes a display, a speaker, and the like. The recording unit 908 includes a hard disk, a nonvolatile memory, and the like. The communication unit 909 includes a network interface, and the like. The drive 910 drives a removable recording medium 911 such as a magnetic disk, an optical disc, a magneto-optical disk, or a semiconductor memory.

In the computer configured as described above, the CPU 901 loads a program that is recorded, for example, in the recording unit 908 onto the RAM 903 via the input/output interface 905 and the bus 904, and executes the program, thereby performing the series of processing described above.

For example, it is possible to record and provide a program to be executed by the computer (CPU 901) in the removable recording medium 911 that is a packaged medium or the like. In addition, it is possible to provide a program via a wired or wireless transmission medium such as a local area network, the Internet, or digital satellite broadcasting.

In the computer, mounting the removable recording medium 911 onto the drive 910 makes it possible to install a program in the recording unit 908 via the input/output interface 905. In addition, it is possible to receive the program with the communication unit 909 via a wired or wireless transmission medium, and install the program in the recording unit 908. In addition, it is possible to install the program in advance in the ROM 902 or the recording unit 908.

It should be noted that a program executed by the computer may be a program in which processing is chronologically performed in the order described herein or may be a program in which processing is performed in parallel or at necessary timing, such as when the processing is invoked.

In addition, in the present specification, a system is meant to be a set of a plurality of components (such as an apparatus and a module (part)), and it does not matter whether or not all the components are in the same housing. Therefore, the system may include both a plurality of apparatuses stored in separate housings and coupled to each other via a network, and one apparatus having a plurality of modules stored in one housing.

Further, an embodiment of the present technology is not limited to the embodiment described above, but it is possible to make various modifications insofar as they do not depart from the gist of the present technology.

For example, it is possible for the present technology to adopt the configuration of cloud computing in which one function is distributed to a plurality of apparatuses via a network and processed in cooperation.

In addition, it is possible execute the respective steps described in the flowcharts described above with one apparatus and it is also possible to distribute the respective steps to a plurality of apparatuses for execution.

Further, in a case where a plurality of processing is included in one step, it is possible to execute the plurality of processing included in the one step with one apparatus and it is also possible to distribute the plurality of processing to a plurality of apparatuses for execution.

<Example of Configuration Combination>

It is also possible to configure the present technology as follows.

(1)

An information processing apparatus including
a presentation control unit that controls presentation of energy consumption of a user in a first time period from detection of a first trigger to detection of a second trigger, the first trigger causing energy consumption to be presented, the second trigger causing energy consumption to be presented.

(2)

The information processing apparatus according to (1), in which, in a case where a fourth trigger is detected after a third trigger is detected after the presentation of the energy consumption of the user, the presentation control unit performs control to present the energy consumption of the user in a second time period from the detection of the first trigger to detection of the fourth trigger, the third trigger causing presentation of energy consumption to be cancelled, the fourth trigger causing energy consumption to be presented.

(3)

The information processing apparatus according to (1) or (2), in which the presentation control unit performs control to present at least one of a total energy consumption value or energy consumption per unit time of the user in the first period.

(4)

The information processing apparatus according to any of (1) to (3), in which the first trigger and the second trigger are predetermined actions by the user.

(5)

The information processing apparatus according to any of (1) to (4), in which the presentation control unit performs control to present a result obtained by comparing energy consumptions of the user on the basis of a designated condition.

(6)

The information processing apparatus according to (5), in which the condition includes one or more factors that influence energy consumption.

(7)

The information processing apparatus according to any of (1) to (6), in which the presentation control unit performs control to present the energy consumption of the user in a case where a context satisfies a predetermined condition.

(8)

The information processing apparatus according to any of (1) to (7), further including an estimation unit that estimates the energy consumption of the user on the basis of at least one of acceleration, heartbeat, body temperature, a degree of perspiration, a physical characteristic, or an attribute of the user.

(9)

The information processing apparatus according to (8), further including a learning unit that learns a model for estimating energy consumption.

(10)

The information processing apparatus according to any of (1) to (9), further including a guidance unit that guides, in a case where the user executes a predetermined activity, an execution method of the activity.

(11)

The information processing apparatus according to (10), in which the guidance unit changes an execution method of guidance on the basis of heartbeat of the user.

(12)

The information processing apparatus according to any of (1) to (11), in which, in a case where the user executes a predetermined activity, the presentation control unit performs control to present a target time and a remaining time of the activity.

(13)

The information processing apparatus according to any of (1) to (12), in which the presentation control unit controls presentation of content on the basis of the energy consumption of the user.

(14)

The information processing apparatus according to (13), in which the presentation control unit brings content to be presented closer to a preference of the user or increases at least one of quality or quantity of the content to be presented with an increase in the energy consumption of the user.

(15)

The information processing apparatus according to any of (1) to (14), further including an information processing unit that performs control to give remuneration to the user in a case where an activity amount of the user in a predetermined period reaches a target value.

(16)

The information processing apparatus according to any of (1) to (14), further including an information processing unit that controls use of a predetermined apparatus by the user on the basis of a virtual currency corresponding to the energy consumption of the user.

(17)

The information processing apparatus according to any of (1) to (14), further including an information processing unit that varies a price or a content of a product or a service to be presented to the user on the basis of at least one of the energy consumption or energy intake of the user.

(18)

The information processing apparatus according to any of (1) to (14), further including an information processing unit that controls transmission of a state of an activity of a first user to a second user and transmission of support of the second user for the first user.

(19)

An information processing method including
a presentation control step of controlling presentation of energy consumption of a user in a time period from detection of a first trigger to detection of a second trigger, the first trigger causing energy consumption to be presented, the second trigger causing energy consumption to be presented.

(20) A program for causing a computer to execute processing including a presentation control step of controlling presentation of energy consumption of a user in a time period from detection of a first trigger to detection of a second trigger, the first trigger causing energy consumption to be presented, the second trigger causing energy consumption to be presented.

REFERENCE SIGNS LIST

10: Information processing system
11: Server
12-1 to 12-m: Client
13-1 to 13-n: Apparatus
51: Analysis unit
52: Learning unit
53: Guidance unit
54: Information processing unit
55: UI control unit
101: Data acquisition unit
102: Input unit
103: EE estimation unit
104: Information processing unit
105: Presentation control unit
106: Recording control unit
107: Output unit
151: Data acquisition unit
152: Input unit
153: Drive control unit
154: Presentation control unit
155: Driving unit
156: Output unit
201: Wearable device
251: Smartphone
351, 421: Wearable device
701: TV

The invention claimed is:

1. An information processing apparatus comprising
one or more sensors configured to detect a first trigger, a second trigger, a third trigger, and a fourth trigger associated with actions of a user; and
a processor configured to:
control a presentation of energy consumption of the user in a first time period from the detection of the first trigger to the detection of the second trigger, wherein the first trigger causes the energy consumption to be presented at a time of the detection of the first trigger and the second trigger causes the energy consumption to be presented at a time of the detection of the second trigger, and
wherein the third trigger is detected after the detection of the second trigger; and
control the presentation, based on the detection of the fourth trigger after the third trigger, of the energy consumption of the user in a second time period from the detection of the first trigger to the detection of the fourth trigger,
wherein the third trigger causes the presentation of the energy consumption to be cancelled and the fourth trigger causes the energy consumption to be presented.

2. The information processing apparatus according to claim 1, wherein the processor is further configured to perform control to present at least one of a total energy consumption value and an energy consumption per unit time of the user in the first time period.

3. The information processing apparatus according to claim 1, wherein the first trigger and the second trigger are predetermined actions by the user.

4. The information processing apparatus according to claim 1, wherein the processor is further configured to perform control to present a result obtained by a comparison of the energy consumption of the user based on a designated condition.

5. The information processing apparatus according to claim 4, wherein the designated condition includes one or more factors that influence the energy consumption.

6. The information processing apparatus according to claim 1, wherein the processor is further configured to perform control to present the energy consumption of the user based on on satisfaction of a predetermined condition by a context.

7. The information processing apparatus according to claim 1, wherein the processor is further configured to estimate the energy consumption of the user based on at least one of acceleration, heartbeat, body temperature, a degree of perspiration, a physical characteristic, and an attribute of the user.

8. The information processing apparatus according to claim 7, wherein the processor is further configured to learn a model for the estimation of the energy consumption.

9. The information processing apparatus according to claim 1, wherein the processor is further configured to guide, based on a predetermined activity executed by the user, an execution method of the predetermined activity.

10. The information processing apparatus according to claim 9, wherein the processor is further configured to change the execution method of guidance based on heartbeat of the user.

11. The information processing apparatus according to claim 1, wherein, based on a predetermined activity executed by the user, the processor is further configured to perform control to present a target time and a remaining time of the predetermined activity.

12. The information processing apparatus according to claim 1, wherein the processor is further configured to control presentation of content based on the energy consumption of the user.

13. The information processing apparatus according to claim 12, wherein the processor is further configured to bring the content to be presented closer to a preference of the user or increase at least one of quality and quantity of the content to be presented with an increase in the energy consumption of the user.

14. The information processing apparatus according to claim 1, wherein the processor is further configured to perform the control to give remuneration to the user when an activity amount of the user in a predetermined period reaches a target value.

15. The information processing apparatus according to claim 1, wherein the processor is further configured to control use of a predetermined apparatus based on a virtual currency corresponding to the energy consumption of the user.

16. The information processing apparatus according to claim 1, wherein the processor is further configured to vary a price or a content of a product or a service to be presented to the user based on at least one of the energy consumption and an energy intake of the user.

17. The information processing apparatus according to claim 1, wherein the processor is further configured to control transmission of a state of an activity of a first user to a second user and transmission of support of the second user for the first user.

18. An information processing method, comprising:
  detecting, by one or more sensors, a first trigger, a second trigger, a third trigger, and a fourth trigger associated with actions of a user;
  controlling, by a processor, presentation of energy consumption of the user in a first time period from the detection of the first trigger to the detection of the second trigger,
    wherein the first trigger causes the energy consumption to be presented at a time of the detection of the first trigger and the second trigger causes the energy consumption to be presented at a time of the detection of the second trigger, and
    wherein the third trigger is detected after the detection of the second trigger; and
  controlling, by the processor, the presentation, of the energy consumption of the user in a second time period from the detection of the first trigger to the detection of the fourth trigger based on the detection of the fourth trigger after the third trigger,
    wherein the third trigger causes the presentation of the energy consumption to be cancelled and the fourth trigger causes the energy consumption to be presented.

19. A non-transitory computer-readable medium having stored thereon, computer-executable instructions that, when executed by a computer, cause the computer to execute operations, the operations comprising:
  detecting a first trigger, a second trigger, a third trigger, and a fourth trigger associated with actions of a user;
  controlling presentation of energy consumption of the user in a first time period from the detection of the first trigger to the detection of the second trigger,
    wherein the first trigger causes the energy consumption to be presented at a time of the detection of the first trigger and the second trigger causes the energy consumption to be presented at a time of the detection of the second trigger, and
    wherein the third trigger is detected after the detection of the second trigger; and
  controlling the presentation, based on the detection of the fourth trigger after the third trigger, of the energy consumption of the user in a second time period from the detection of the first trigger to the detection of the fourth trigger,
    wherein the third trigger causes presentation of the energy consumption to be cancelled and the fourth trigger causes the energy consumption to be presented.

* * * * *